United States Patent [19]
Izuka

[11] Patent Number: 5,666,235
[45] Date of Patent: Sep. 9, 1997

[54] OBJECTIVE LENS DRIVING DEVICE AND OPTICAL PICKUP UNIT EMPLOYING THIS OBJECTIVE LENS DRIVING DEVICE

[75] Inventor: Takashi Izuka, Kanagawa, Japan

[73] Assignee: Sony Corporation, Tokyo, Japan

[21] Appl. No.: 618,497

[22] Filed: Mar. 19, 1996

[30] Foreign Application Priority Data

Mar. 20, 1995 [JP] Japan ................. 7-061416

[51] Int. Cl.$^6$ ..................................... G02B 7/02
[52] U.S. Cl. ................................. 359/814; 359/824
[58] Field of Search ........................ 359/813, 814, 359/824; 369/44.14, 44.15, 44.16

[56] References Cited

U.S. PATENT DOCUMENTS

| | | | |
|---|---|---|---|
| 5,285,434 | 2/1994 | Kim | 369/44.14 |
| 5,523,891 | 6/1996 | Fujisawa | 359/813 |
| 5,541,899 | 7/1996 | Kume | 369/44.14 |
| 5,555,228 | 9/1996 | Izuka | 369/44.15 |
| 5,566,149 | 10/1996 | Song | 369/44.15 |

*Primary Examiner*—Georgia Y. Epps
*Assistant Examiner*—Ricky Mack
*Attorney, Agent, or Firm*—Limbach & Limbach L.L.P.

[57] ABSTRACT

An objective lens driving device employed for a recording and/or reproducing apparatus for an optical recording medium includes a bobbin on which an objective lens is mounted, a supporting mechanism, first and second coils and a magnetic circuit. The supporting mechanism supports the bobbin in at least one of a first direction parallel to the optical axis of the objective lens and a second direction perpendicular to the optical axis. The first coil is provided on the bobbin and is mounted so that at least its one coil side is substantially perpendicular to the first direction. The second coil is provided on the bobbin and is mounted so that at least its one coil side is substantially parallel to the first direction. The magnetic circuit has a pair of magnets facing each other with a pre-set gap in-between. The first and second coils are arranged in the gap and plane-symmetrically with respect to the centerline of the gap.

28 Claims, 35 Drawing Sheets

OBJECTIVE LENS DRIVING DEVICE AND OPTICAL PICKUP UNIT EMPLOYING THIS OBJECTIVE LENS DRIVING DEVICE

BACKGROUND

1. Field of the Invention

This invention relates to an objective lens driving device and an optical pickup unit. More particularly, it relates to an objective lens driving device for shifting an objective lens in a direction parallel to its optical axis and/or in a direction normal to the optical axis.

2. Background of the Invention

In a conventional optical disc recording and/or reproducing apparatus, employing an optical disc as a recording medium, an objective lens driving device is provided for moving an objective lens, designed for converging the outgoing light from a light source, such as a semiconductor laser, on the optical disc, in a direction parallel to its optical axis and in a direction normal to the optical axis.

With the objective lens driving device, the objective lens is moved, in dependence upon focusing error and tracking error signals, in a direction parallel to the objective lens, that is in a focusing direction, and in a direction normal to the focusing direction, that is in a tracking direction, for focusing the light beam from the light source by the objective lens to the signal recording surface of the optical disc run in rotation by a disc rotating driving device, and for allowing the light beam to follow a recording track on the signal recording surface of the optical disc.

As an objective lens driving device, employed for the optical disc recording and/or reproducing apparatus, one shown in FIGS. 1 and 2 is in use extensively.

The objective lens driving device has on its one end a bobbin 2 carrying an objective lens 1. The bobbin 2 is supported in a cantilevered fashion on a fixed supporting member 6 mounted on a yoke 5 of a magnetic circuit section 4, using four linear supporting members 3, such as wires.

The bobbin 2, carrying the objective lens 1, has a center through-hole 7 traversing the bobbin 2 in a direction parallel to the optical axis of the objective lens 1. A prismatically-shaped focusing coil 8, with a hollow inside portion, is arranged in the through-hole 7. On an outer lateral side of the focusing coil 8 is arranged a tracking coil 9, consisting of a pair of flat rectangular-shaped coils 9a, 9b, in a side-by-side relation to each other.

On each of the opposing lateral sides of the bobbin 2 is mounted a printed wiring board for relaying to which are electrically connected coil terminals 8a, 9a led out from the focusing coil 8 and the tracking coil 9, respectively. On the printed wiring board 10, an elastic supporting member 3 of an electrically conductive material, functioning as a feed line, has its one end 3a electrically and mechanically connected to a connection pattern 10a provided on the printed wiring board 10 using an electrically conductive adhesive, such as a solder.

A pair of such elastic supporting members 3, supporting the bobbin 2 by respective one ends 3a, are formed on each lateral side of the bobbin 2 parallel to each other and have opposite ends 3b thereof passed through through-holes 11 formed in respective corners of the fixed supporting member 6 mounted on the yoke 5 so as to be supported by the fixed supporting member 6. The ends 3b of the elastic supporting member 3 projected via the through-holes 11 of the elastic supporting member 3 operate as connecting ends electrically connected to a driving control circuit configured for moving the objective lens 1.

The objective lens 1, thus mounted on the bobbin 2, supported in a cantilevered fashion on the fixed supporting member 6 via two elastic supporting members 3 on each side thereof by the fixed supporting member 6, is moved in a direction parallel to the optical axis and in a direction normal to the optical axis, as indicated by arrows F and T in FIG. 1, respectively, with the elastic supporting member 3 operating as deflection portions.

On the yoke 5 carrying the fixed supporting member 6 are formed a pair of upstanding pieces 12, 13 facing each other. On the inner surface of the upstanding piece 12 is mounted a magnet 14 constituting the magnetic circuit section 4.

A fixed supporting member 6, carrying the bobbin 2 via plural elastic supporting members 3, is mounted on the upper surface of the opposite end of the yoke 5 for constituting the objective lens driving device. At this time, the upstanding pieces 12, 13 are introduced into the through-hole 7 in the bobbin 2 on either sides of the focusing coil 8 and the tracking coil 9, as shown in FIG. 1. The focusing coil 8 and the tracking coil 9 are arranged at a position of interlinkage with the magnetic flux emanating from the magnet 14 to the upstanding piece 13.

With the above-described arrangement of the objective lens driving device, if the driving current derived from the focusing error signal is supplied from the driving control circuit via the electrically conductive elastic supporting member 3 to the focusing coil 8, there is produced a driving force which, in conjunction with the magnetic flux of the magnetic circuit section 4, operates to move the bobbin 2 in a direction parallel to the optical axis of the objective lens 1. The bobbin 2 is moved in the focusing direction, indicated by arrow F in FIG. 1, that is in a direction parallel to the optical axis of the objective lens 1, as the elastic supporting members 3 are flexed elastically. With the bobbin 2 shifted in this manner, the objective lens 1 mounted on the bobbin 2 is moved in the same direction for focusing adjustment.

If the driving current derived from the tracking error signal is supplied from the driving control circuit via the electrically conductive elastic supporting member 3 to the tracking coil 9, there is produced a driving force which, in conjunction with the magnetic flux of the magnetic circuit section 4, operates to move the bobbin 2 in a direction normal to the optical axis of the objective lens 1. The bobbin 2 is moved in the tracking direction, indicated by arrow T in FIG. 1, that is in a direction normal to the optical axis of the objective lens 1, as the elastic supporting members 3 are flexed elastically. With the bobbin 2 thus shifted, the objective lens 1 mounted on the bobbin 2 is moved in the same-direction for tracking adjustment.

With the above-described objective lens driving device, the printed wiring board for relaying 10 is provided on each lateral side of the bobbin 2, and the coil ends 8a, 9a of the focusing coil 8 and the tracking coil 9 and one ends of the elastic supporting members 3 are connected to the printed wiring board 10. The driving current is supplied via the elastic supporting member 3 to the focusing coil 8 and the tracking coil 9. Instead of using the arrangement shown in FIGS. 1 and 2, the control current may also be supplied to the focusing coil 8 and the tracking coil 9 via a flexible printed circuit board 16.

With this objective lens driving device, one end of the flexible printed circuit board 18, connected to the upper surface of the bobbin 2, is connected to the upper end face of the bobbin 2, and the coil ends 8a, 9a of the focusing coil 8 and the tracking coil 9 are connected to a connection pattern 16a formed at an end of the printed circuit board 16, as shown in FIG. 3. By using the flexible printed circuit board 16, the flexible supporting member 3 need not be formed of an electrically conductive material, such that the flexible supporting members 3 may be formed of materials exhibiting desired properties, such as elasticity.

If the flexible printed circuit board 18 is used, there is no necessity of providing the printed wiring board for relaying 10 on the bobbin 2, so that the end 3a of the elastic supporting member 3 may be directly mounted via fitting supporting members 17 provided on both sides of the bobbin 2, as shown in FIG. 3.

Meanwhile, the focusing coil 8 and the tracking coil 9, employed in the above-described objective lens driving device, are formed by winding a linear material. The focusing coil 8 is formed by winding a sole linear material into a hollow prismatic shape and connection coil ends 8a are led out at upper and lower ends, as shown in FIG. 2. The tracking coil 9 is formed by winding a sole linear material for providing two rectangular-shaped coils 9b, 9c side-by-side and leading out connection coil ends 9a from one lateral sides of the coils 9b, 9c, as shown in FIG. 2. The tracking coil 9 is connected and unified to a lateral surface of the focusing coil 8 in the form of a hollow prism, as shown in FIG. 2. The focusing coil 8, thus carrying the tracking coil 9, is directly mounted on the bobbin 2 by connecting the side of the focusing coil opposite to its side connected to the tracking coil 9 attached to the inner wall of the through-hole 7, as shown in FIG. 7.

The coil ends 8a, 9a, drawn from the focusing coil 8 and the tracking coil 9, are electrically connected via an electrically conductive adhesive, such as a solder, to the printed wiring board for relaying 10 or to the flexible printed circuit board 16. Thus an operation of electrically connecting the coil ends 8a, 9a becomes necessary in the course of assembling the objective lens driving device, thus lowering the assembling efficiency.

During connection of the coil ends 8a, 9a, the coil ends 8a, 9a should not be slacked on the bobbin 2. If there is any slack on the coil ends 8a, 9a, the coil ends 8a, 9a tend to be inadvertently vibrated or shifted during movement of the objective lens 1 thus disabling the objective lens 1 to be correctly driven responsive to the control current.

In order for the objective lens 1 to be moved in a direction parallel to its optical axis and in a direction normal thereto with good response to the driving current supplied to the focusing coil 8 and the tracking coil 9, the center of gravity P of the bobbin 2 carrying the objective lens 1 as the movable part needs to be correctly in coincidence with the center of generation of the driving power for driving the bobbin 2.

In the above-described objective lens driving device, the driving force of driving the objective lens i in the focusing direction, that is in a direction parallel to the optical axis of the objective lens 1, is generated by the control current flowing in the coil portion 8b and a magnetic flux emanated by the magnet 14 from the upstanding piece 12 towards the opposite upstanding piece 13 so as to be interlinked with the coil portion 8b. The coil portion 8b is the portion of the focusing coil 8 wound in a direction normal to the optical axis of the objective lens 1. The driving force of driving the objective lens 1 in the tracking direction, that is in a direction normal to the optical axis of the objective lens 1, is generated by the control current flowing in linear 19a, 19b and a magnetic flux emanated by the magnet 14 from the upstanding piece 12 towards the opposite upstanding piece 13 so as to be interlinked with the linear portion 19b, 19b, as shown in FIGS. 1 and 4. These linear porions 19a, 19b are those portions of the coils 9b, 9c of the tracking coil 9 mounted on the lateral side of the focusing coil 8 inserted between the upstanding pieces 12, 13 extending parallel to the optical axis of the objective lens 1.

The coil portions 9b, 9c of the tracking coil 9 are connected so that the current will flow in the same direction in the linear portions 19a, 19b inserted into the upstanding pieces 12, 13.

For correctly generating the driving power for the objective lens 1 in a direction parallel to its optical axis, it is necessary for the coil portion 8b inserted between the upstanding pieces 12, 13 of the focusing coil 8 to be coincident with a line Y—Y' at the center of the magnetic gap defined between the upstanding pieces 12, 13, as shown in FIG. 4, while it is necessary for the control current flowing in the coil portion 8b to be interlinked highly correctly at right angles with the magnetic flux emanated into a space between the upstanding pieces 12, 13. For correctly generating the driving force in a direction normal to the optical axis, it is necessary for the center between the linear portions 19a, 19b of the rectangular-shaped coils 9b, 9c of the tracking coil 9 to be coincident with a line X—X' in FIG. 4 lying at the center in the width-wise direction of the upstanding pieces 12, 13, while it is necessary for the control current flowing in the linear portions 19a, 19b of the coil portions 9b, 9c to be interlinked with high precision with the magnetic flux radiated between the upstanding pieces 12, 13. For uniformly generating a driving force in each of the direction parallel to its optical axis and the direction normal thereto, it is necessary for the center of a line Z—Z' in FIG. 5 parallel to the optical axis of the objective lens 1, or the direction of the height of the coil portion 8b of the focusing coil 8 and the linear portions 19a, 19b of the tracking coil 9, to be coincident with the center of the height-wise direction of the magnet 14.

By arranging the focusing coil 8 and the tracking coil 9 with respect to the magnetic circuit section 4, the center of generation of a driving force generated by the control current supplied to the focusing coil 8 and the tracking coil 9 and the magnetic flux radiated from the magnet 14 for moving the objective lens 1 in a direction parallel to the optical axis and in a direction normal to the optical axis is positioned at a point of intersection of the line Y—Y' in FIG. 4, line X—X' in FIG. 4 and the line Z—Z' in FIG. 5.

The center of gravity P of the bobbin 2, as a movable part carrying the objective lens 1, is brought into coincidence with the point of intersection of the line Y—Y' in FIG. 4, line X—X' in FIG. 4 and the line Z—Z' in FIG. 5. The result is that the bobbin 2 may be moved with good response in a direction parallel to the optical axis of the objective lens 1 and in a direction normal to the optical axis of the objective lens 1 without producing any force of deflection, for example, distortion, against the driving force in the directions parallel and normal to the optical axis of the objective lens 1. Thus the objective lens 1, mounted on the bobbin 2, is responsive to the control current supplied to the focusing coil 8 and the tracking coil 9 to be moved correctly in the directions normal and parallel to the optical axis of the objective lens 1.

The objective lens 1 is mounted on the bobbin 2 so that its optical axis is located on the line X—X' in. FIG. 4 and parallel to the line Z—Z' in FIG. 5.

Meanwhile, the focusing coil 8 and the tracking coil 9, employed in the objective lens driving device, are of a three-dimensional configuration which is obtained by winding a linear material into a tube shape or a hollow prismatic shape, as explained previously. Thus it is extremely difficult for the focusing coils 8 and the tracking coils 9 used in the different objective driving devices to be of uniform constant size. If the focusing coil 8 and the tracking coil 9, thus differing in size, are mounted on the bobbin 2, the center of gravity P of the bobbin 2 inclusive of the objective lens 1 cannot be rendered constant. In particular, if the focusing coil 8 and the tracking coil 9, mounted at points spaced apart from the center of gravity P, suffer from variations in shape and size, the position of the center of gravity P of the bobbin 2 inclusive of the objective lens 1 is affected seriously.

Since the focusing coil 8, carrying the tracking coil 9 on its lateral surface, is directly bonded within the through-hole 7 in the bobbin 2, such as with an adhesive, it cannot be assembled in the bobbin 2 without difficulties, while the focusing coil also cannot be mounted at correct mounting position without difficulties. Consequently, the position of the center of gravity P of the bobbin 2 inclusive of the objective lens 1 differs from one objective lens driving device to another. That is, the center of gravity P cannot be set with high precision without difficulties.

The bobbin 2 is molded from synthetic resin, while the focusing coil 8 and the tracking coil 9 are formed by copper wires. The specific gravity of the synthetic resin of the bobbin 2 is approximately 1.5, while that of the copper wire of the focusing coil 8 and the tracking coil 9 is 8.9. Thus, if the focusing coil 8 and the tracking coil 9 undergo variations in shape and size and in mounting positions to the bobbin 2, it becomes impossible to accurately set the position of the center of gravity P of the bobbin 2 as a movable part inclusive of the objective lens 1 from one objective lens driving device to another.

If the position of the center of gravity P of the movable part is not constant from one objective lens driving device to another, the center of generation of the driving power generated by the interaction between the focusing coil 8 and the tracking coil 9 on one hand and the magnetic circuit section 4 on the other hand is not coincident with the center of gravity P of the movable part, such that the objective lens 1 cannot be moved in directions parallel and normal to its optical axis without producing the force of deviation, such as distortion. The result is that the light beam radiated on the signal recording surface of the optical disc cannot be controlled precisely as to focusing and tracking so that information signals cannot be recorded/reproduced with good recording and/or reproducing characteristics.

The objective lens driving device is arranged so that the coil portion 8b on one side of the focusing coil 8 wound in the shape of a hollow prism is inserted into a space defined between the upstanding pieces 12, 13 making up the yoke 5, as shown in FIGS. 1 and 8. Thus the coil portion 8c on the opposite side of the coil portion 8b of the focusing coil 8 also faces the upstanding piece 12 carrying the magnet 14. If the control current flows through the focusing coil 8, not only is a driving force $f_1$ produced by the interlinkage between the effective magnetic flux Bg radiated into a space between the upstanding pieces 12, 13 and the coil portion 8b, but a driving force $f_2$ is generated by the interlinkage between the stray magnetic flux Bg' radiated from the magnet 14 towards the rear side of the upstanding piece 12 and the coil portion 8b. The driving force $f_2$, generated by the interaction with the coil portion 8b interlinked with the stray magnetic flux Bg', is a force opposite to the driving force $f_1$ generated by the interaction of the opposite side coil portion 8b interlinked with the stray magnetic flux Bg, and operates for canceling the driving force of driving the objective lens 1 along the optical axis. Thus it becomes impossible to exploit the driving force of driving the objective lens 1 along the optical axis.

With the objective lens driving device, shielding means, such as a shielding plate, is provided for shielding the stray magnetic flux for eliminating the stray magnetic flux. Alternatively, the focusing coil 8 is increased in size. If such shielding means are provided or the size of the focusing coil 8 is increased, the objective lens driving device itself is increased in size.

The portion of the focusing coil 8 of the objective lens driving device operating in conjunction with the magnetic flux emanated from the magnet 14 for generating a driving force of driving the objective lens 1 along the optical axis is only a fractional portion, shown shaded in FIG. 7, that is a portion of the coil portion 8b which is inserted into the space between the upstanding pieces 12, 13 and which faces the magnet 14. The portion of the tracking coil 9 of the objective lens driving device operating in conjunction with the magnetic flux emanated from the magnet 14 for generating a driving force of driving the objective lens 1 in a direction normal to the optical axis is only a fractional portion, shown shaded in FIG. 8, that is a part of the linear portions 19a, 19b of the coil portions 9b, 9c which faces the magnet 14. That is, the portions of the focusing coil 8 and the tracking coil 9 operating for generating the driving force of driving the objective lens 1 account for only one quarter of the entire portions of the coils 8 and 9, that is the utilization efficiency of the coils 8, 9 is extremely low. Since the utilization efficiency of the focusing coil 8 and the tracking coil 9 is low, the current required for driving the objective lens 1 increased, so that heat evolution from the objective lens driving device is also increased. This heat evolution tends to affect the operation of the semiconductor laser as a light source constituting the optical pickup device, thus obstructing stable light beam excitation.

Since the focusing coil 8 employed in the objective lens driving device is wound in the shape of a hollow prism shape, its self-inductance tends to be increased. Besides, since the upstanding piece 12 of the yoke 5 constituting the magnetic circuit section 4 is adapted for being inserted into the focusing coil 8 in the shape of the hollow prism, the upstanding piece 12 operates as an iron core for further increasing the self-inductance of the focusing coil 8. With the self-inductance of the focusing coil 8 increased in this manner, phase rotation is rapidly increased beyond 180° in a high frequency range of the focusing error signals if the driving current corresponding to the focusing error signal is supplied to the focusing coil 8 via the driving control circuit for moving the objective lens 1, such that focusing control responsive to the focusing error signals cannot be achieved. For enabling the focusing control, the control circuit for detecting the focusing error signal for supplying the control current to the focusing coil 8 is designed for effecting electrical phase correction. If the amount of this phase correction is increased, the harmonics of the driving current supplied to the focusing coil 8 is increased in proportion to the amount of phase correction, thus increasing power consumption. If the power consumption is increased, the operation of the semiconductor laser constituting the optical pickup device becomes unstable due to heat evolution.

SUMMARY OF THE INVENTION

It is therefore an object of the present invention to provide an objective lens driving device which resolves the above drawbacks.

It is another object of the present invention to provide an optical pickup unit which resolves the above drawbacks.

According to the present invention, there is provided an objective lens driving device including an objective lens, a bobbin, a supporting mechanism, at least one coil and a magnetic circuit. The objective lens is mounted on the bobbin. The supporting mechanism supports the bobbin in at least one of a first direction parallel to the optical axis of the objective lens and a second direction perpendicular to the optical axis. The coil is mounted on the bobbin so that at least its one coil side is parallel to the first or second direction. The magnetic circuit moves the coil and the objective lens in the first direction or in the second direction. The magnetic circuit has a pair of magnets facing each other with a pre-set gap therebetween. The coil is arranged on substantially the centerline of the gap and the center of gravity of a movable portion at least including the objective lens and the bobbin is coincident with the point of operation of a driving force generated by the coil and the magnetic circuit.

According to the present invention, there is also provided an objective lens driving device including an objective lens, a bobbin for mounting the objective lens, a supporting mechanism, first and second coils, and a magnetic circuit. The supporting mechanism supports the bobbin in at least one of the first direction parallel to the optical axis of the objective lens and the second direction normal to the optical axis. The first coil is mounted on the bobbin so that at least one of the coil sides is perpendicular to the first direction. The second coil is mounted on the bobbin so that at least one of the coil sides is substantially parallel to the first direction. The magnetic circuit moves the first and second coils and the objective lens in the first direction or in the second direction. The magnetic circuit has a pair of magnets facing each other with a pre-set gap therebetween. The first and second coils are arranged in the gap and plane-symmetrically with respect to the centerline of the gap.

According to the present invention, there is also provided an objective lens driving device including an objective lens, a bobbin, a supporting mechanism, first and second coils and a magnetic circuit. The bobbin has the objective lens mounted on its one end and has an opening at its mid portion. The supporting mechanism supports the bobbin in a first direction parallel to the optical axis of the objective lens and in a second direction perpendicular to the optical axis. The first coil has at least one flat square-plate-shaped coil portion provided on the bobbin. The first coil is mounted so that at least one coil side of the second coil is substantially parallel to the first direction. The second coil has at least one flat square-plate-shaped coil portion provided on the bobbin. The second coil is mounted so that at least one coil side of the second coil is substantially parallel to the first direction. The magnetic circuit moves the first and second coils and the objective lens in the first direction or in the second direction. The magnetic circuit has a pair of magnets facing each other with a pre-set gap therebetween. The magnets are inserted in said opening in the bobbin. The first and second coils are arranged in the gap with the coil portions facing the magnets and extending substantially parallel to the first direction. The first and second coils are arranged plane-symmetrically with respect to the centerline of the gap.

According to the present invention, there is also provided an optical pickup apparatus including a light source, an objective lens, an objective lens driving device, an optical system and a photodetector. The objective lens condenses a light beam radiated from the light source on a sole point on the optical axis. The objective lens driving device moves the objective lens in at least one of a direction parallel to its optical axis and a direction perpendicular to the optical axis. The optical system guides the light beam radiated by the light source to the objective lens and for separating the light beam radiated from the light source and a light beam incident via the objective lens. The photodetector receives the light beams separated by the optical system. The objective lens driving device includes a bobbin on which the objective lens is mounted, a supporting mechanism, first and second coils and a magnetic circuit. The supporting mechanism supports the bobbin in at least one of the first direction parallel to the optical axis of the objective lens and the second direction normal to the optical axis of the objective lens. The first coil is mounted on the bobbin so that at least one of the coil sides is perpendicular to the first direction. The second coil is mounted on the bobbin so that at least one of the coil sides is substantially parallel to the first direction. The magnetic circuit moves the first and second coils and the objective lens in the first direction or in the second direction. The magnetic circuit has a pair of magnets facing each other with a pre-set gap therebetween. The first and second coils are arranged in the gap plane-symmetrically with respect to the centerline of the gap.

BRIEF DESCRIPTION OF THE DRAWINGS

FIG. 18 is a side view showing the relation of disposition between the coil mounting substrate and a modified magnetic circuit section constituting the objective lens driving device shown in FIG. 9.

FIG. 48 is a front view showing a further example of a coil mounting substrate constituting the objective lens driving device according to the embodiment of FIG. 9 and elastic supporting members employed for the coil mounting substrate.

DESCRIPTION OF THE INVENTION

Figure 1:
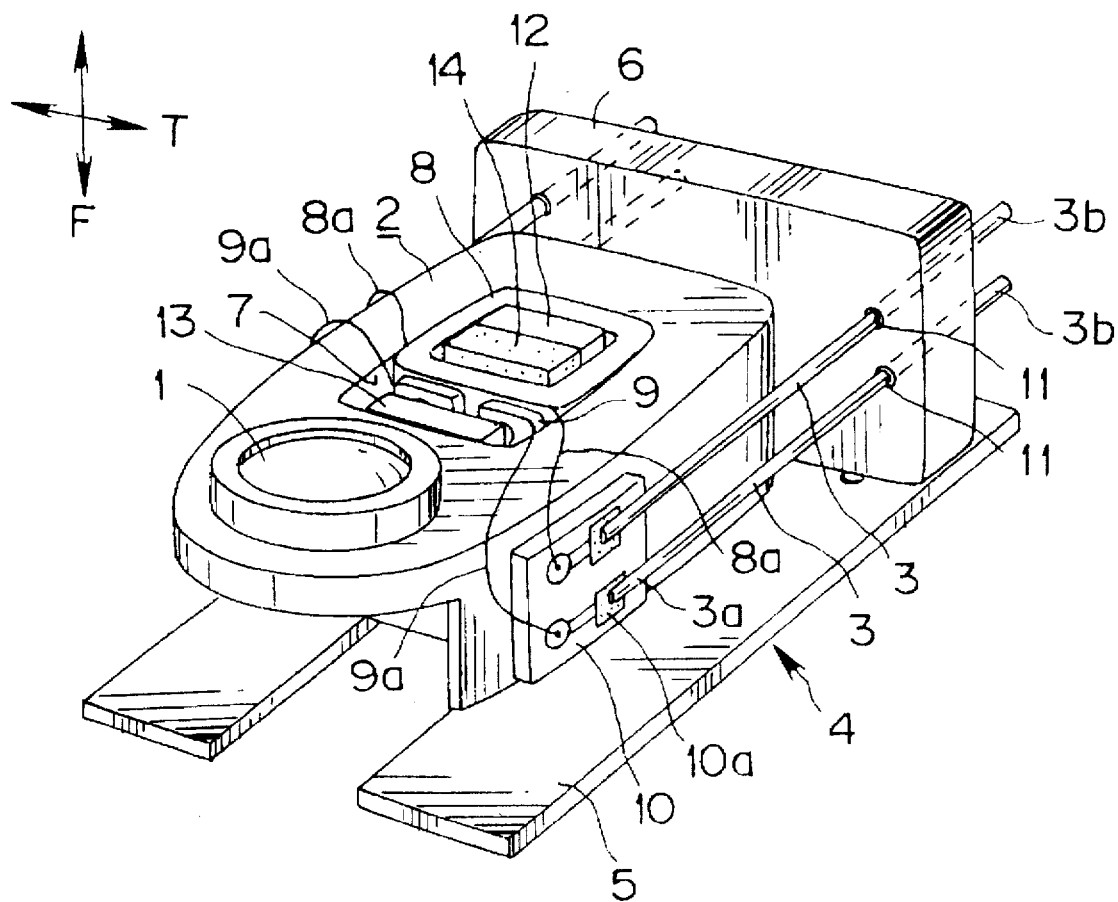
FIG. 1 is a perspective view showing a conventional objective lens driving device.
Figure 2:
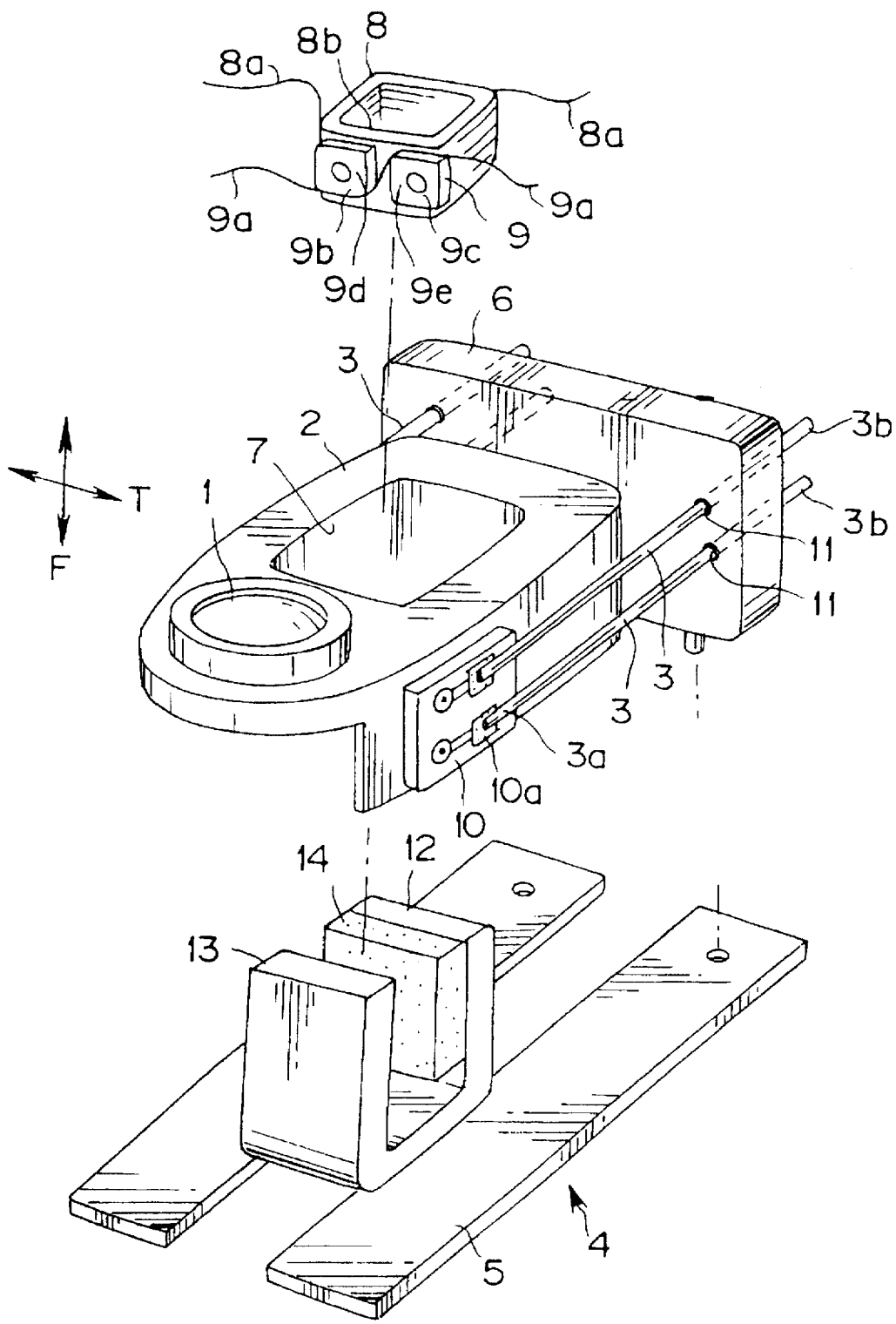
FIG. 2 is an exploded perspective view of the conventional objective lens driving device.
Figure 3:
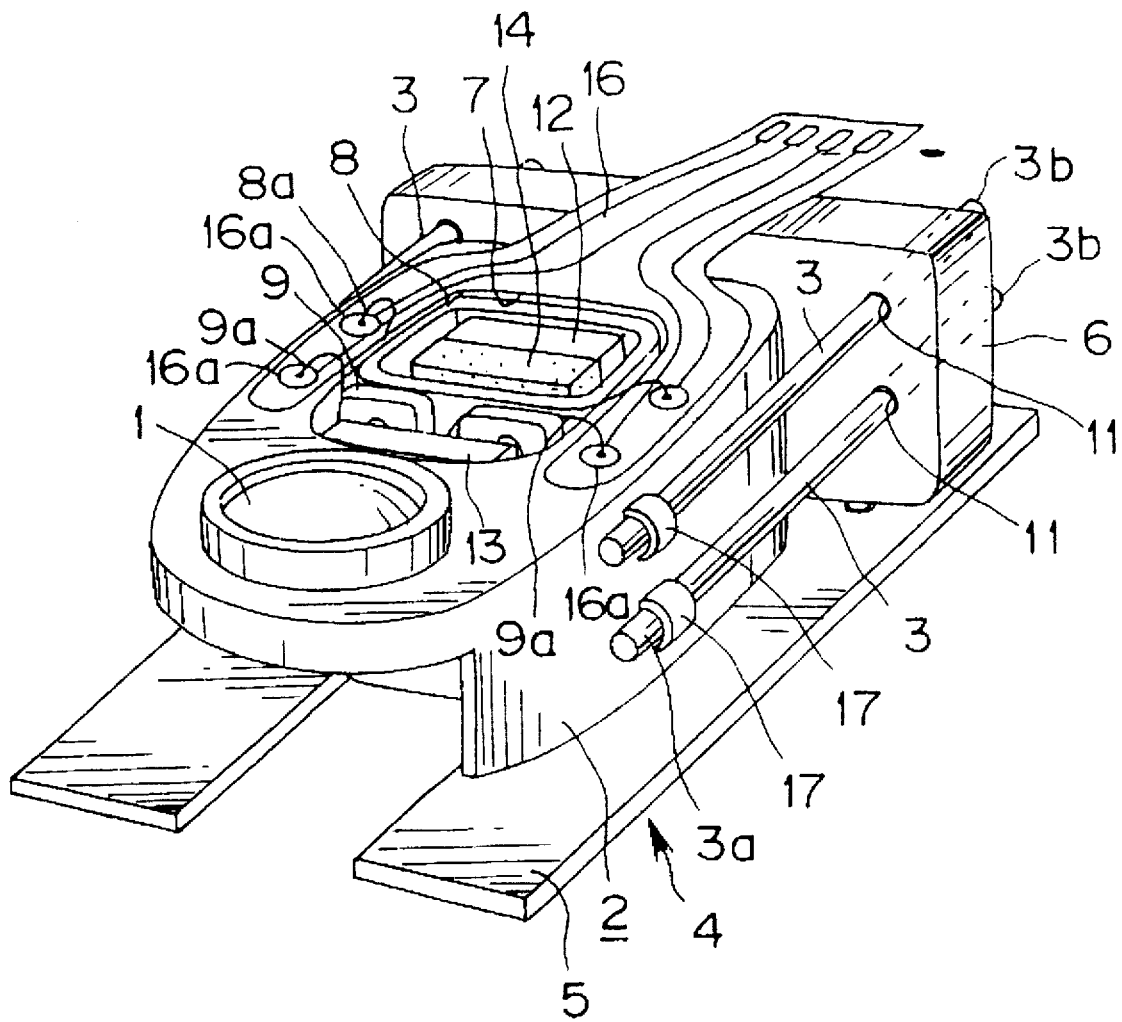
FIG. 3 is a perspective view showing another example of a conventional objective lens driving device.
Figure 4:
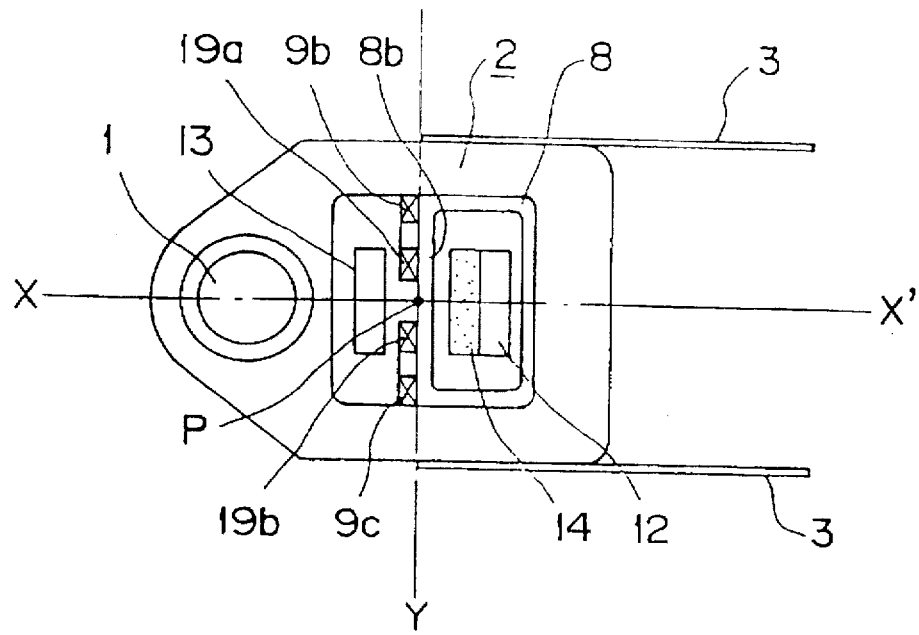
FIG. 4 is a plan view showing a relative arrangement of a focusing coil and a tracking coil in the conventional objective ends driving devices.
Figure 5:
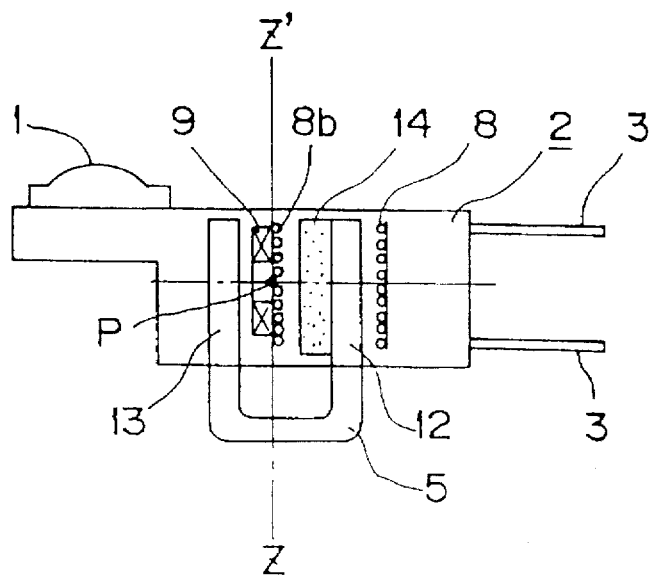
FIG. 5 is a cross-sectional view showing a relative arrangement of a focusing coil and a tracking coil in the conventional objective ends driving devices.
Figure 6:
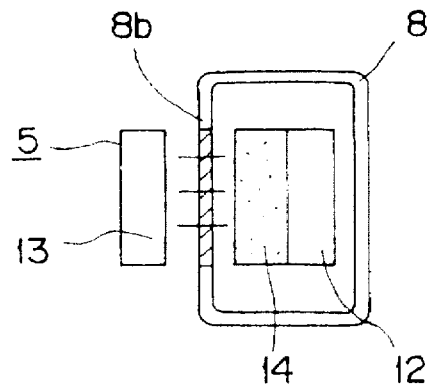
FIG. 6 is a plan view showing the state of the magnetic flux in the magnetic circuit section and the focusing coil in the conventional objective lens driving device.
Figure 7:
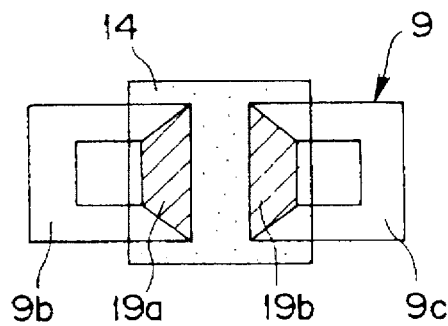
FIG. 7 is a front view showing the state of facing of the magnet and the focusing coil in the conventional objective lens driving device.

Referring to the drawings, an objective lens driving device and an optical pickup unit according to the present invention will be explained in detail.

Figure 9:
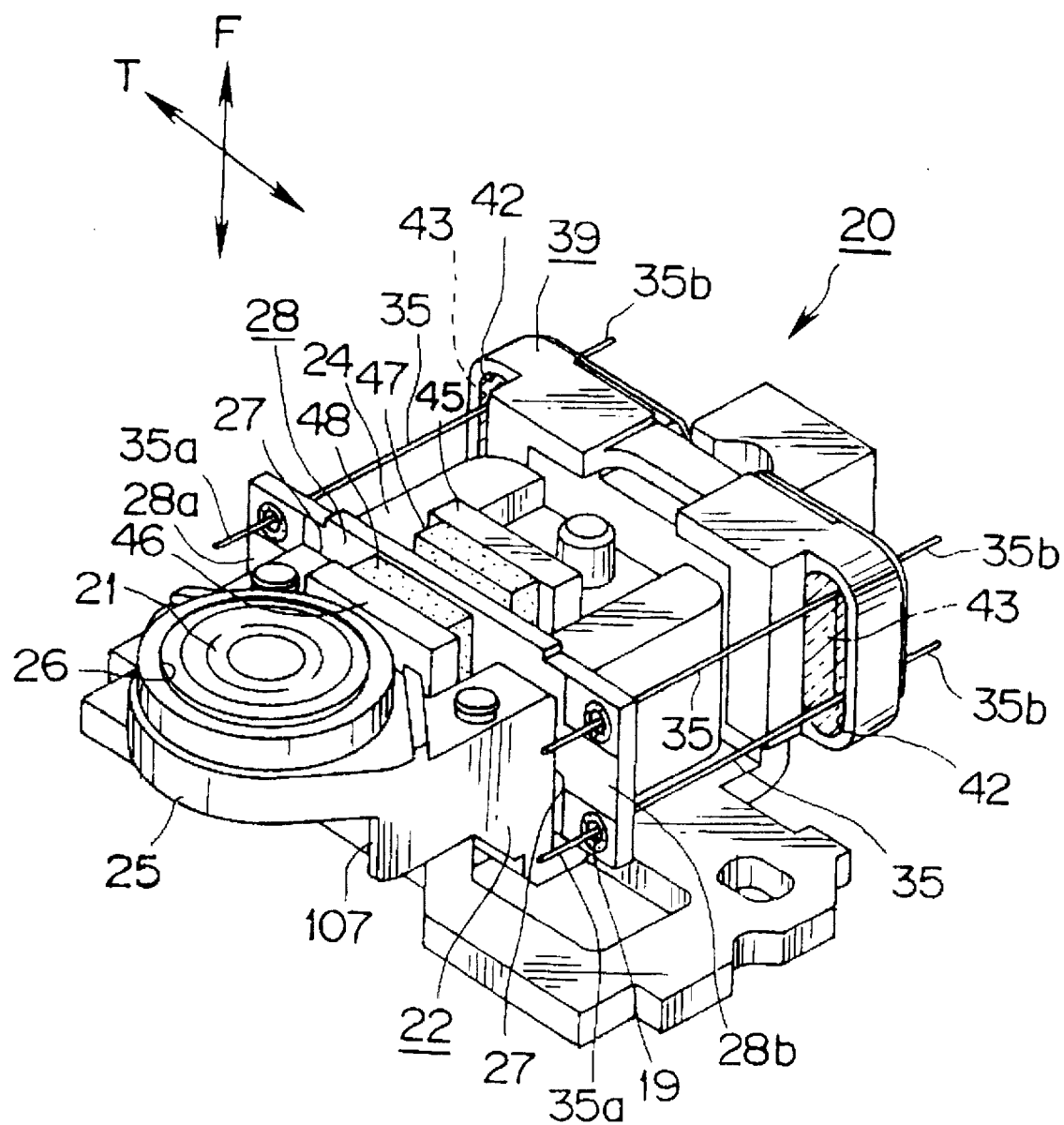
FIG. 9 is a perspective view showing a moving coil type objective lens driving device according to an embodiment of the present invention.

An objective lens driving device 20 is explained. The objective lens driving device 20 includes an objective lens 21 and a bobbin 22, as shown in FIG. 9. The objective lens 21 condenses the light beam radiated from the semiconductor laser as a light source on a signal recording surface of an optical disc and receives the return light reflected back from the optical disc. The objective lens 21 is mounted at one end of the bobbin 22. This objective lens 21 and the bobbin 22 make up a movable part.

Figure 10:
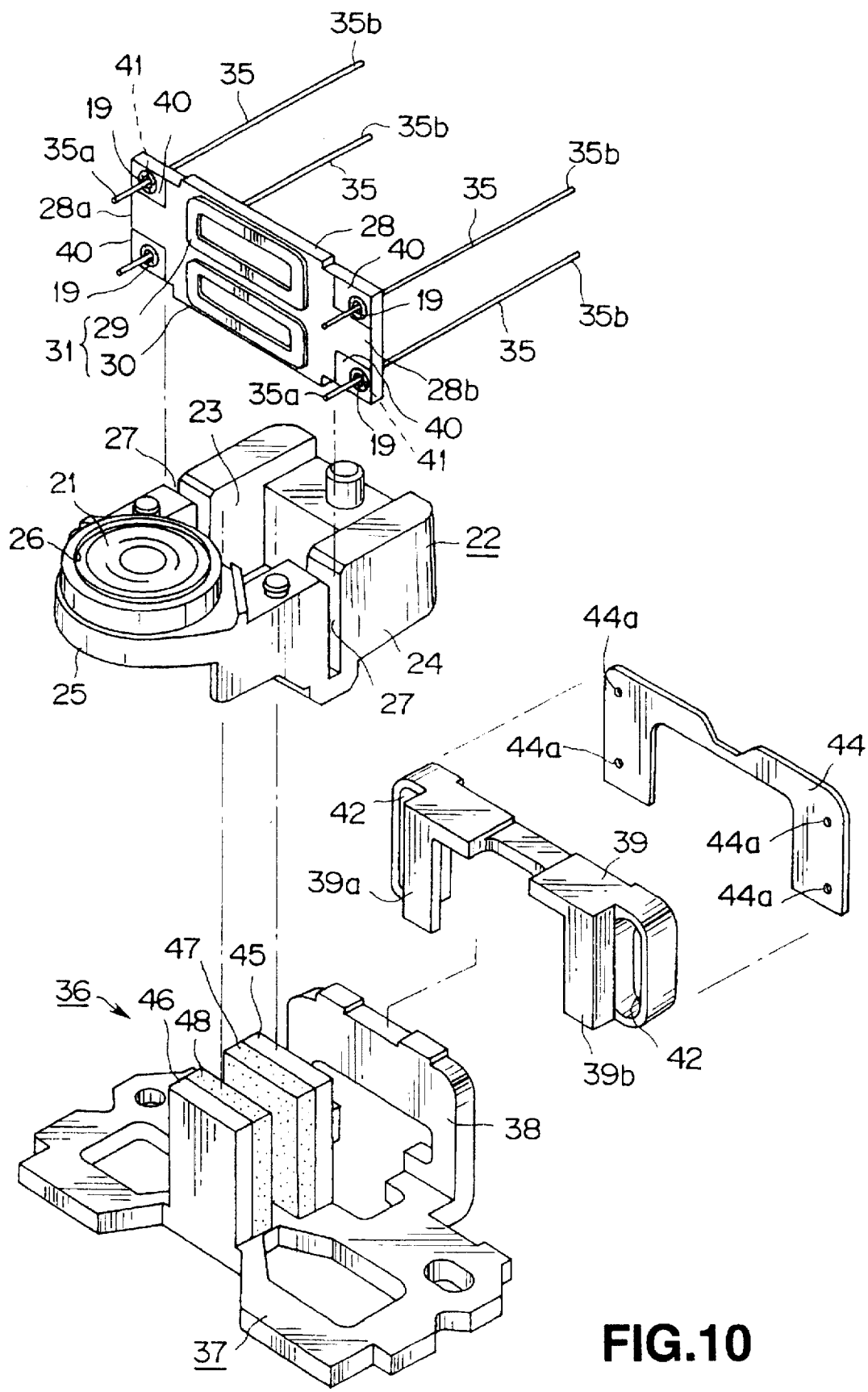
FIG. 10 is an exploded perspective view of the object lens driving device shown in FIG. 9.

The bobbin 22 is formed by molding a synthetic resin, such as polystyrene. The bobbin 21 has a main bobbin member 24, having a square-shaped opening 23 at its mid portion, and an objective lens mounting portion 25 provided for being protruded laterally from an upper edge portion of the main bobbin member 24 as shown in FIGS. 9 and 10. The objective lens 21 is mounted in a mounting recess 28 formed at a mid portion of the objective lens mounting portion 25. The bottom surface of the mounting recess 28 is formed with a light transmitting through-hole for transmitting the light beam from the semiconductor laser incident on the objective lens 21 and the return light from the optical disc transmitted via the objective lens 21.

At a mid portion on both opposite sides of the main bobbin member 24 are formed coil mounting plate inserting grooves 27 traversing the opening 23. These coil mounting plate inserting grooves 227, 27 are formed as recessed grooves extending parallel to the optical axis of the objective lens 21 mounted on the objective lens mounting plate 225 for extending from the upper end face towards the lower end face of the main bobbin member 24, as shown in FIG. 10.

Via these coil mounting plate inserting grooves 27, 27, a rectangular-shaped coil mounting plate 28 formed as a flat-plate-shaped member is mounted on the bobbin 22. This coil mounting plate 28 is a plate formed of glass epoxy resin or synthetic resin. The coil mounting plate 28 is formed as an elongated rectangular plate which is dimensioned to be protruded from both sides of the main body member 24 on both sides 28a, 28b when the plate 28 is mounted on the bobbin 22 by being inserted in the coil mounting plate inserting grooves 27, 27, as shown in FIG. 9.

Figure 12:
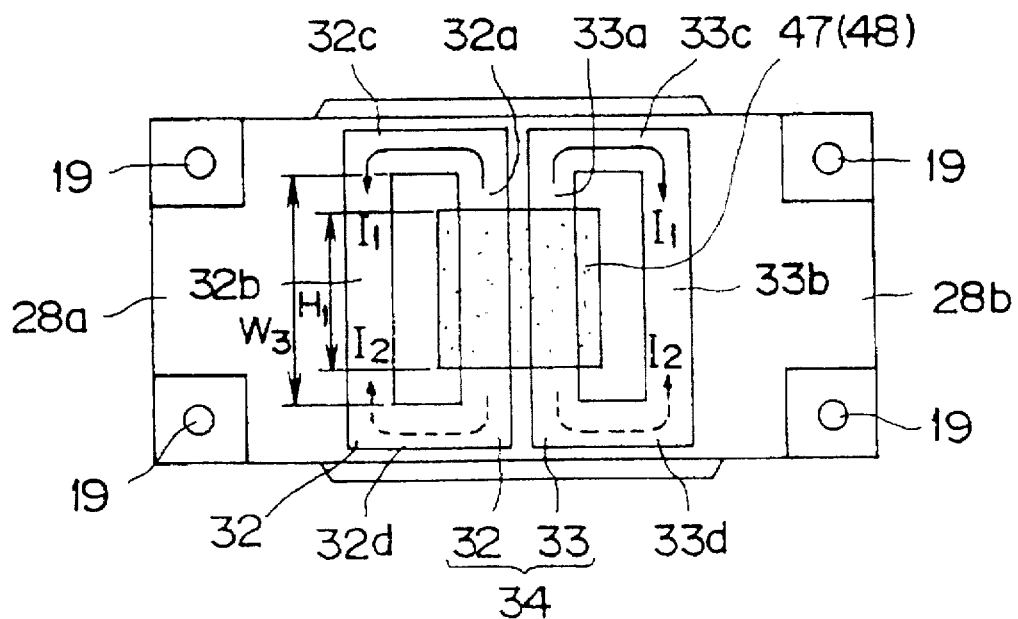
FIG. 12 is a front view showing a disposition of a tracking coil and a magnet making up the objective lens driving device shown in FIG. 9.

On a lateral side of the coil mounting plate 28, there is mounted a focusing coil 31 formed by a pair of flat rectangular-shaped coil portions 29, 30, whereas, on the opposite side of the plate 28, there is mounted a tracking coil 34 made up of a pair of flat rectangular-shaped coil portions 32, 33, as shown in FIG. 12. That is, the coil portions 29, 30 making up the focusing coil 31 and the coil portions 32, 33 making up the tracking coil 34 are formed on the coil mounting plate 28 of glass epoxy resin as a rectangular-shaped coil pattern by etching a copper foil deposited on the coil mounting plate 28. The focusing coil 31 made up of the coil portions 29, 30 and the tracking coil 34 made up of the coil portions 32, 33 are mounted as flat-plate-shaped coils on the coil mounting plate 28.

Instead of being formed as coils formed by etching, the coil portions 29, 30 making up the focusing coil 31 and the coil portions 32, 33 making up the tracking coil 34 need only be rectangular flat-plate-shaped and hence may be formed by winding a linear material for coils into a rectangular shape. The coil portions 29, 30, 32, 33, if formed by winding the linear material for coils, are connected to one and the opposite sides of the coil mounting plate 28 using an adhesive.

The coil mounting plate 28, thus provided with the focusing coil 31 and the tracking coil 34, is inserted in the coil mounting plate insertion grooves 27, 27. The coil mounting plate 28 is mounted in position as one with the bobbin 22 with the surface thereof carrying the focusing coil 31 and the tracking coil 34 running parallel to the optical axis of the objective lens 21 mounted on the bobbin 22. For mounting the coil mounting plate 28 on the bobbin 22, an adhesive is pre-coated in the coil mounting plate insertion grooves 27, 27.

Instead of being mounted with the aid of the adhesive, the mounting plate 28 may be mounted simultaneously with the molding of the bobbin 22 by previously arranging the mounting plate 28 of a synthetic resin material in a metal mold for molding the bobbin 22 by insert molding.

After mounting the coil mounting plate 28 on the bobbin 22, the objective lens 21 is mounted on the objective lens mounting portion 25, for preventing the objective lens 21 from being damaged at the time of mounting the coil mounting plate 28 on the bobbin 22.

The bobbin 22, thus carrying the coil mounting plate 28 and the objective lens 21, is supported in a cantilevered fashion from a supporting holder 39 by plural linear elastic supporting members 35, such as wires. The supporting holder 39 is mounted on a holder mounting portion 38 formed on a yoke 37 constituting a magnetic circuit section 36. At this time, the bobbin 22 has its both sides supported in a cantilevered fashion by a pair of elastic supporting members 35 on the supporting holder 39. The result is that the bobbin 22 may be moved, with the elastic supporting members 35 as elastic deflectable portions, in a direction parallel to the optical axis of the objective lens 21, as indicated by arrow F in FIG. 9, that is in the so-called focusing direction, and in a direction normal to the optical axis of the objective lens 21, as indicated by arrow T in FIG. 9, that is in the so-called tracking direction.

The elastic supporting members 35 are formed of an elongated metal wire or an electrically conductive material, such as metal plate spring.

For supporting the bobbin 22 by the four elastic supporting members 35, both end lugs 28a, 28b from both lateral sides of the main bobbin member 24 of the coil mounting plate 28 integrally mounted on the bobbin 22 are formed with four elastic supporting member insertion openings 19 into which are inserted one ends of the four elastic supporting members 35. Two of the elastic supporting member insertion grooves 19 are formed parallel to each other near the corners of both end lugs 28a, 28b of the coil mounting plate 28. Connection terminal portions 40 extended from the coil ends of the focusing coil 31 and the tracking coil 34 are formed around the elastic supporting member inserting openings 19. The one ends 35a of the elastic supporting members 35 are inserted into the elastic supporting member insertion openings 19 and secured by a solder 41 on the connection terminals 40 on the coil mounting plate 28. This solder 41 assures electrical connection between the connection terminals 40 and the elastic supporting members 35 formed of the electrically conductive material.

Since it is sufficient if the elastic supporting members 35 are secured to the coil mounting plate 28 as the elastic supporting members are electrically connected to the connection terminals 40, an electrically conductive adhesive mat be used in place of the solder 41.

The opposite sides 35b of the four elastic supporting members 35, carrying the bobbin 22 on one ends via the coil mounting plate 28 as described above, are securely supported by the supporting holder 39. The supporting holder 39 has on both ends fitting holes 42, 42 in each of which is disposed a damper 43 formed of a visco-elastic material fop damping or absorbing vibrations, as shown in FIG. 9. The opposite ends 35b of the elastic supporting members 35 are inserted through the dampers 45 so as to be securely supported by the supporting holder 39. Thus the opposite ends 35b of the elastic supporting members are secured and supported by the supporting holder 39 via the dampers 43. The result is that, when the objective lens 21 is moved, unneeded vibrations of the elastically deflected supporting members 35 may be rapidly attenuated for suppressing resonant vibrations, while the objective lens 21 mat be moved with good response to focusing and tracking error signals.

The opposite ends 35b of the elastic supporting members 35, fixedly supported via the dampers 43 by the supporting holder 39, are electrically connected to the flexible printed circuit board 44 connected in turn to an objective lens driving control circuit not shown, mounted on the back side of the supporting holder 39 opposite to the side thereof carrying the bobbin 22. For establishing electrical connection of the elastic supporting members 35 to the flexible printed circuit board 44, the opposite ends of the elastic supporting members 85 are inserted into through-holes formed in a connection pattern portion of the flexible printed circuit board 44, and the opposite ends of the elastic supporting members 35 are electrically connected to the connection pattern portion of the printed wiring board 44 by a solder or similar electrically conductive adhesive.

The ends 35a and 35b of the elastic supporting members 35 are inserted through an elastic supporting member insertion opening 19 bored in the coil mounting plate 28 and through a through-hole 44a bored in the flexible printed wiring board 44 so as to be then electrically connected to the printed wiring board 44, as a result of which electrical connection and mechanical linkage of the elastic supporting members 35 with the elastic supporting members 35 and the printed wiring board 44 may be improved in reliability.

The through-holes 19 in the coil mounting plate 28 and the through-holes 44a in the flexible printed wiring board 44 are circular in profile. When the elastic supporting members 35 are mounted in the printed wiring board 44 by the solder 41 or the electrically conductive adhesive, there is produced a gap which does not permit intrusion of the solder 41 or the electrically conductive adhesive between the elastic supporting members 35 and the elastic supporting member inserting opening 19 and between the through-hole 44a and the elastic supporting members After the ends 35a, 35b of the elastic supporting members 35 are inserted through the elastic supporting member insertion opening 19 bored in the coil mounting substrate 28 and through the through-hole 44a bored in the flexible printed circuit board 44, the solder 41 or the electrically conductive adhesive is provided so that the ends 35a, 35b of the elastic supporting members 35 are electrically connected to the connecting pattern portion of the wiring circuit board 44. By mounting the ends 35a, 35b of the elastic supporting members 35 on the flexible printed circuit board 44 and the coil supporting plate 28 as supporting means, using the solder 41 or the electrically conductive adhesive, it becomes possible to set a length $L_1$ of each elastic supporting member 35 correctly since the length $L_1$ of each elastic supporting member 35 can be correctly set with the outer surfaces of the coil mounting substrate 28 and the flexible printed wiring board 44 as references.

The yoke 37 constitutes the magnetic circuit section 36 having the holder mounting portion 38 carrying the supporting holder 39 supporting the bobbin 22 via plural elastic supporting members 35. The yoke 37 has a pair of upstanding pieces 45, 46 at its mid portion, as shown in FIG. 10. The opposite surfaces of these upstanding pieces 45, 46 are fitted with magnets 47, 48, respectively. These magnets 47, 48 cooperate with the focusing coil 31 and the tracking coil 34 provided on the coil mounting substrate 26 for generating the driving power for driving the objective lens 21 in a direction parallel to the optical axis of the objective lens 21 and in a direction normal thereto.

Figure 13:
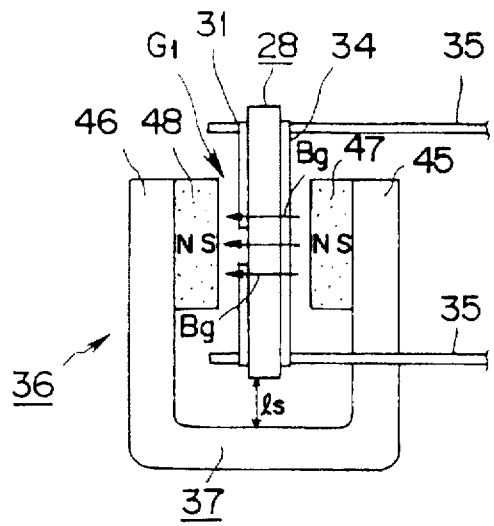
FIG. 13 is a side view showing a magnetic circuit section and a coil mounting substrate fitted with a focusing coil and a tracking coil.

The holder mounting portion 38 is formed upright on the back side of the yoke 37 parallel to the upstanding pieces 45, 46 designed for mounting the magnets 47, 48. The supporting holder 39 is mounted on the yoke 37 by fitting both fitting supporting portions 39a, 39b formed on both sides thereof on both lateral sides of the holder mounting portion 38. When the supporting holder 39 is mounted in this manner on the yoke 35, the upstanding pieces 45, 46 carrying the magnets 47, 48 are introduced into the opening 23 formed in the bobbin 37. The coil mounting plate 28 is positioned between the upstanding pieces 45, 46 and the focusing coil 31 and the tracking coil 34 are positioned in a magnetic gap $G_1$ between the magnets 47 and 48, as shown in FIG. 13. This completes the objective lens driving device as shown in FIG. 9.

The arrangement of the focusing coil 31 and the tracking coil 34 provided on the coil mounting plate 28 and the arrangement of the yoke 37 carrying the magnets 47, 48 facing the focusing coil 31 and the tracking coil 34 and the upstanding pieces 45, 46 carrying the magnets 47, 48, are explained.

Figure 11:
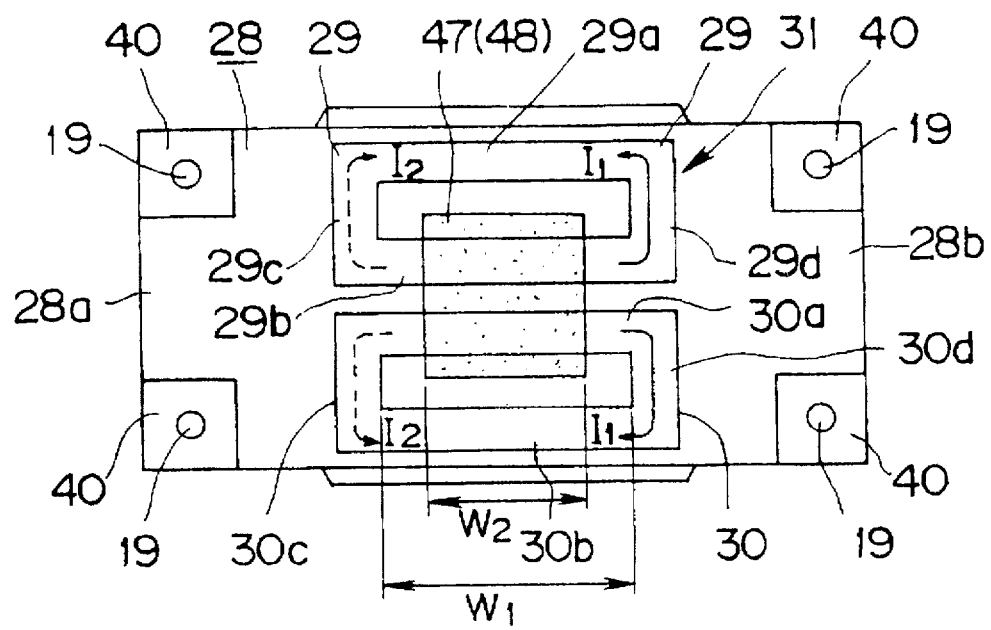
FIG. 11 is a front view showing a disposition of a focusing coil and a magnet making up the objective lens driving device shown in FIG. 9.

Each of the coil portions 29, 30 making up the focusing coil 31 is formed as a rectangular-shaped flat plate, as shown in FIG. 11. The rectangular-shaped flat plate has its long side constituted by horizontal sections 29a, 29b or 30a, 30b extending parallel to the longitudinal direction of the coil mounting plate 28 which is the direction normal to the optical axis of the objective lens 21 mounted on the bobbin 22, and has its short side constituted by vertical sections 29c, 29d, 30c, 30d extending parallel to the optical axis of the objective lens 21 and parallel to the short sides of the coil mounting substrate 28 extending parallel to the optical axis of the objective lens 21. These coil portions 29, 30 are formed such that the respective winding directions are reversed relative to each other. The coil portions 29, 30 are mounted side-by-side on the lateral side of the coil mounting plate 28 with a small spacing between the horizontal sections 29a and 30a neighboring to each other. The coil portions 29, 30 are in the form of rectangles each having a length such that, when the objective lens 21 is moved in the tracking direction normal to the optical axis, the vertical sections 29c, 29d, 30c, 30d are not facing the inside of the magnetic gap $G_1$ constituted by the magnets 47, 48. That is, the distance $W_1$ between the vertical sections 29c, 29d and the vertical sections 30c, 30d of the coil portions 29, 30 is set to a length at least equal to the width $W_2$ of the magnets 47, 48 plus the amount of movement of the objective lens 1 in the tracking direction. The Peason is that, if the vertical sections 29c, 29d, 30c, 30d are positioned within the magnetic gap $G_1$ defined between the magnets 47, 48, an unneeded driving force other than the driving fore required for driving the objective lens 21 in a direction parallel to the optical axis is generated by the driving current supplied to the focusing coils 29, 30.

The coil portion 32, 33 making up the tracking coil 34 are formed as rectangular flat plates having vertical sections 32a, 32b, 33a, 33b as long sides and also having horizontal sections 32c, 32d, 33c, 33d as short sides, as shown in FIG. 12. The vertical sections 32a, 32b, 33a, 33b are parallel to the short sides of the coil mounting plate 28 parallel to the optical axis of the objective lens 21 mounted on the bobbin 22, while the horizontal sections 32c, 32d, 33c, 33d are parallel to the long sides of the coil mounting substrate 28 running normal to the optical axis of the objective lens 21. The coil portions 32, 33 are formed by winding in the mutually opposite winding directions. The coil portions 32, 33 are mounted side-by-side on the opposite lateral side of the coil mounting substrate 28 with a small interval between the neighboring vertical sections 32a and 33a, as shown in FIG. 12. The coil portions 32, 33 are formed as rectangular portions of such a length that, when the objective lens 21 is moved in the focusing direction parallel to its optical axis, the horizontal sections 32c, 32d, 33c, 33d are not facing the inside of the magnetic gap $G_1$ defined by the magnets 47, 48. That is, the coil portions 32, 33 making up the tracking coil 34 are set so that the distance $W_3$ between the horizontal sections 32c, 32d and the horizontal sections 33c, 33d is at least equal to the height $H_1$ of the magnet 47 or 48 plus the amount of movement of the objective lens 1 in the focusing direction. The coil portions 32, 33 are mounted on the coil mounting substrate 28 so that the vertical sections 32a, 33a thereof neighboring to each other will be layered at the mid portions of the horizontal sections 29a, 30a of the coil portions 29, 30 of the focusing coil 31 neighboring to each other.

The coil mounting substrate 28, carrying the focusing coil 31 and the tracking coil 34 as described above, is mounted on the bobbin 22 as described above, while the bobbin 22 is mounted on the magnetic circuit section 38 via the supporting holder 39. The horizontal sections 29a, 30a of the coil portions 29, 30 of the focusing coil 31 neighboring to each other and the vertical sections 32a, 33a of the coil portions 32, 33 of the tracking coil 34 neighboring to each other are disposed within the common magnetic flux Bg within the magnetic gap $G_1$ defined by the magnets 47, 48, as shown in FIGS. 11 and 12.

The magnets 47, 48 are each magnetized to a single magnetic polarity along the thicknesses. The magnets 47, 48 are magnetized so that the sides thereof facing each other are magnetized to opposite polarities, as shown for example in FIG. 13.

The control current corresponding to the focusing error signal is supplied from the objective lens driving control circuit via the electrically conductive elastic supporting member 33 to the coil portions 29, 30 making up the focusing coil 31. By the interaction between the current $I_1$ or $I_2$ flowing through the horizontal sections 29a, 30a of the coil portions 29, 30, neighboring to each other, and the magnetic flux Bg radiated by the magnets 47, 48 into the magnetic gap $G_1$, there is generated a driving force moving the bobbin 22 in a direction parallel to the optical axis of the objective lens 21. This driving force operates for moving the bobbin 22 in a direction parallel to the optical axis of the objective lens 21 with the elastic supporting member 35 as the elastic deflecting portion. This shifts the objective lens 21 in a direction parallel to its optical axis, as indicated by arrow F in FIG. 9, for focusing control of the light beam from the light source by the objective lens 21.

The coil portions 29, 30 making up the focusing coil 31 are formed by winding in mutually opposite winding directions. If the driving current $I_1$ or $I_2$ flowing in the same direction is supplied to these coil portions 29, 30, the currents flow in the horizontal sections 29a, 30a in the same direction.

The control current corresponding to the tracking error signal is supplied from the objective lens driving control circuit via the electrically conductive elastic supporting member 35 to the coil portions 32, 33 making up the tracking coil 34. By the interaction between the current $I_1$ or $I_2$ flowing through the vertical sections 32a, 33a of the coil portions 32, 33, neighboring each other, and the magnetic flux Bg radiated by the magnets 47, 48 into the magnetic gap $G_1$, there is generated a driving force for moving the bobbin 22 in a direction normal to the optical axis of the objective lens 21. This moves the bobbin 22 in a direction normal to the optical axis of the objective lens 21. Thus the objective lens 21 is moved in a planar direction as indicated by T in FIG. 9, that is in a direction normal to its optical axis, for tracking control of the light beam from the light source by the objective lens 21.

Similarly to the coil portions 29, 30 making up the focusing coil 31, the coil portions 32, 33 making up the tracking coil 34 are formed by winding in mutually opposite winding directions. If the driving current $I_1$ or $I_2$ flowing in the same direction is supplied to these coil portions 32, 33, the currents flow in the horizontal sections 32a, 33a in the same direction.

Between the lower edge of the coil mounting plate 28 and the upper surface of the yoke 37, there is provided a spacing equal to the maximum stroke ls, as shown in FIG. 13. The stroke ls is such a stroke by which the focusing coil 31 is moved in a direction indicated by arrow F in FIG. 9 so as not to obstruct movement of the objective lens 21 in the direction indicated by arrow F in FIG. 9.

The focusing coil 31 made up of the flat-plate-shaped coil portions 29, 30 and the tracking coil 34 made up of the flat-plate-shaped coil portions 32, 33 are mounted on the flat-plate-shaped coil mounting substrate 28, which in turn is mounted on the bobbin 22. The result is that the focusing coil 31 and the tracking coil 34 in their entirety may be located on the side of the magnetic circuit section 38 facing the magnets 47, 48, so that there is no risk of an unneeded driving force being produced by the stray magnetic flux of the magnetic circuit section 36. The focusing coil 31 and the tracking coil 34 may be easily positioned precisely with respect to the bobbin 22 such that the variable center of gravity of the bobbin 22 may be accurately set for realizing stable driving movement of the objective lens 21.

With the above-described magnetic circuit section 36, the upstanding pieces 45, 46 are mounted on the yoke 37 so as to be parallel to each other, and the magnets 47, 48 magnetized to single direction of polarization are mounted on the facing sides of the open ends of the upstanding pieces 45, 46. Thus the effective magnetic flux Bg generating the driving force in cooperation with the focusing coil 31 and the tracking coil 34 is only the magnetic flux radiated into the magnetic gap $G_1$ made up by the magnets 47, 48. The single portions of the focusing coil 31 and the tracking coil 34 generating the driving force in cooperation with the effective magnetic flux Bg are only one side of the vertical sections 32a, 33a of the coil portions 32, 33 and the horizontal sections 29a, 30a of neighboring coil portions 32, 33 positioned within the magnetic gap $G_1$.

Figure 14:
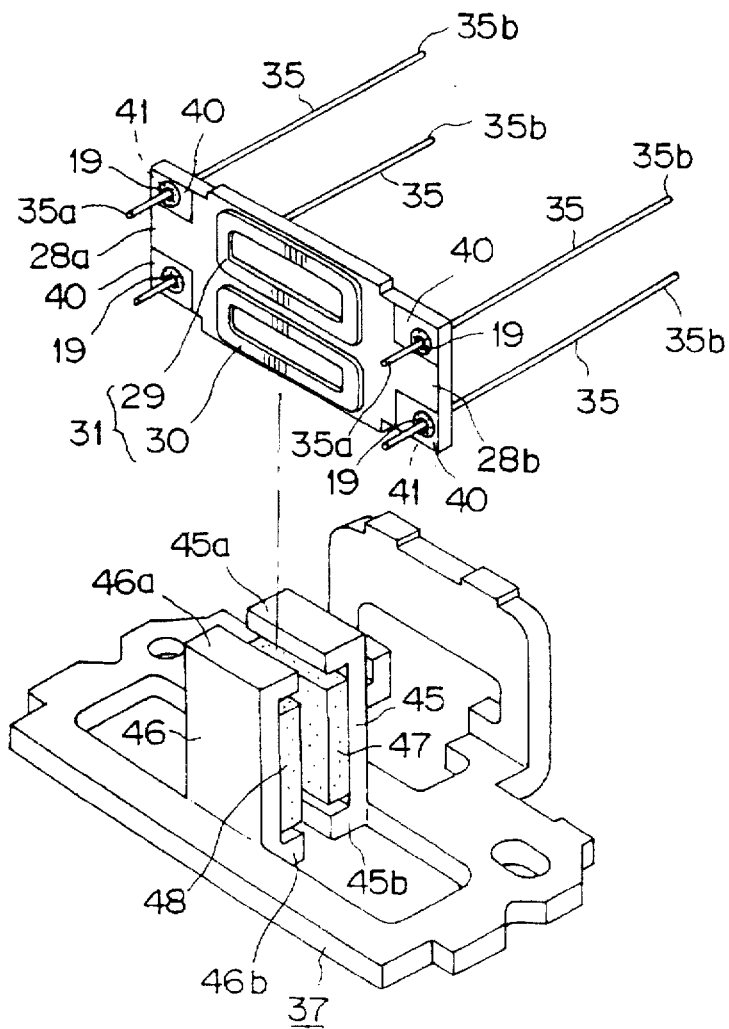
FIG. 14 is a perspective view showing a modification of the magnetic circuit section constituting the objective lens driving device shown in FIG. 9.
Figure 15:
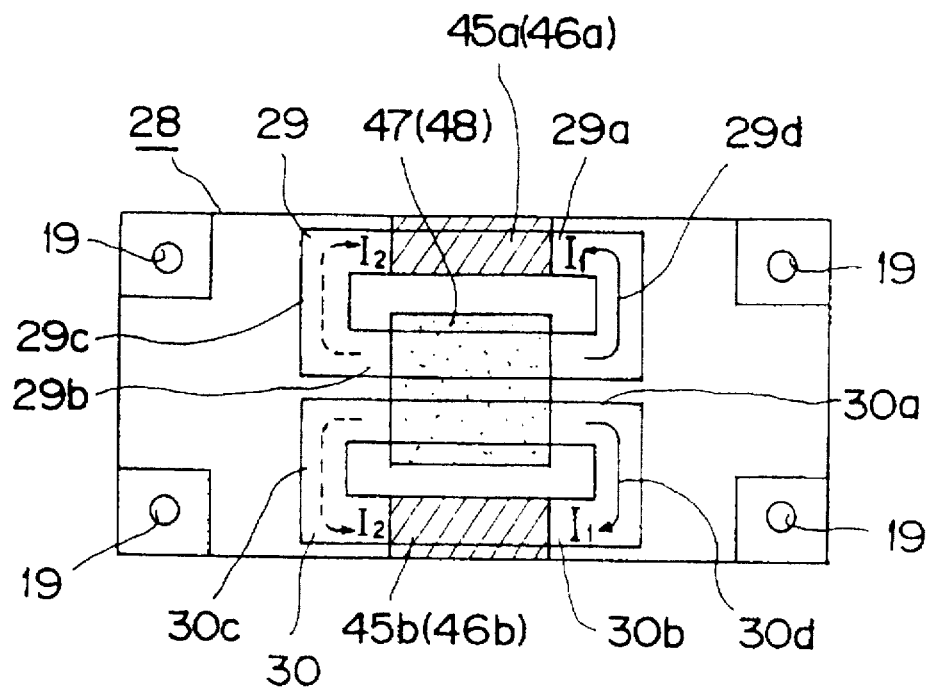
FIG. 15 is a front view showing the relation of disposition between the focusing coil and the magnetic circuit section shown in FIG. 14.
Figure 17:
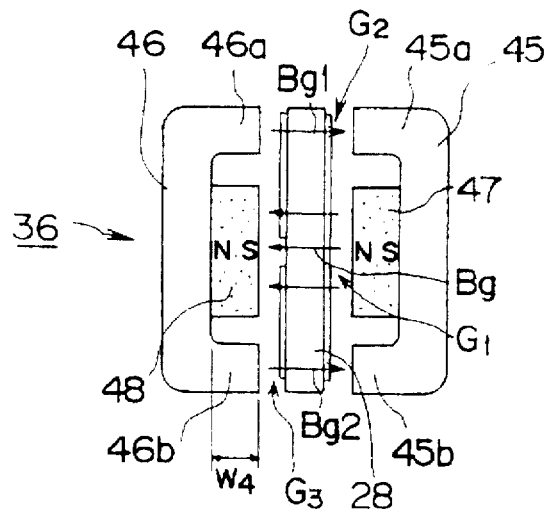
FIG. 17 is a side view showing the relation of disposition between the coil mounting substrate and a modified magnetic circuit section constituting the objective lens driving device shown in FIG. 9.
Figure 18:
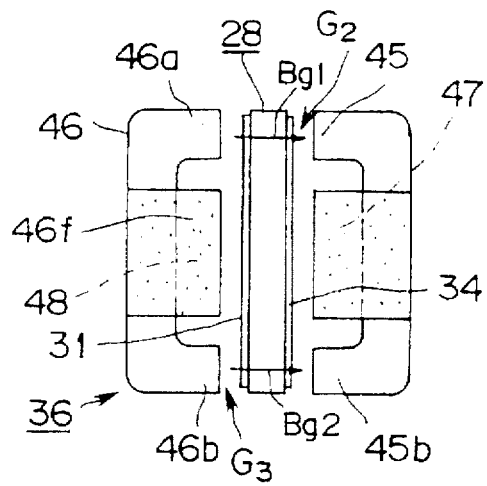
FIG. 18 is a front view showing the relation of disposition between the tracking coil and the magnetic circuit section shown in FIG. 14.

For improving the utilization efficiency of the focusing coil 31 employed for generating at least the driving force, protrusions 45a, 45b and protrusions 46a, 46b are formed on the upper and lower ends of the surfaces of the upstanding pieces 45, 46 of the yoke 37 carrying the magnets 47, 48, so that these protrusions face the opposite horizontal sections 29b, 30b of the coil portions 29, 30 of the focusing coil 31 not facing the magnets 47, 48, as shown in FIGS. 14 and 15. These protrusions 45a, 45b and protrusions 46a, 46b are bent with a width substantially equal to the thickness $W_4$ of the magnets 47, 48. The spacing between the protrusions 45a, 46a and that between the protrusions 45b, 46b delimit magnetic gaps $G_2$, $G_3$ in the region of the opposite horizontal sections 29a, 30a of the coil portions 29, 30, as shown in FIGS. 17 and 18. These magnetic gaps $G_2$, $G_3$ are substantially equal to the magnetic gap $G_1$ defined between the magnets 47 and 48. The magnetic flux from the magnets 47, 48 is concentrated between these magnetic gaps $G_2$, $G_3$, so that the effective magnetic flux $Bg_1$ and $Bg_2$, operating on the opposite horizontal sections 29b, 30b of the coil portions 29, 30 are produced. By the interaction between the magnetic flux $Bg_1$ and $Bg_2$ between the magnetic gaps $G_2$, $G_3$ delimited by the protrusions 45a, 45b and by the protrusions 46a, 46b and the current flowing in the opposite horizontal sections 29b, 30b of the coil portions 29, 30 disposed within the magnetic gaps $G_2$, $G_3$, a driving force moving the bobbin 22 in a direction parallel to the optical axis of the objective lens 21 is produced, thereby improving the utilization efficiency of the focusing coil 31 used for generating the driving force.

The magnetic fluxes $Bg_1$ and $Bg_2$ radiated into the magnetic gaps $G_2$, $G_3$ constituted by the protrusions 45a, 45b and by the protrusions 46a, 46b and the magnetic flux Bg radiated into a spacing between the magnets 47, 48 are opposite in direction to each other, as shown in FIG. 15. However, when the unidirectional driving current is supplied to the coil sections 29, 30 making up the focusing coil 31, the current flowing in the opposite horizontal sections 29b, 30b of the rectangular-shaped coil portions 29, 30 and the current flowing in the horizontal sections 29a, 30a are also opposite in direction to each other, as shown in FIG. 15. The driving force generated by the interaction between the magnetic flux $Bg_1$ and $Bg_2$ of the magnetic gaps $G_2$, $G_3$ and the current flowing in the opposite horizontal sections 29b, 30b located in the magnetic gaps $G_2$, $G_3$, and the driving force generated by the interaction between the current flowing in the horizonal sections 29a, 30a and the magnetic flux Bg radiated into a space between the magnets 47, 48 are in the same direction. Thus the ratio of the generated driving force relative to the driving current supplied to the focusing coil 31 is increased for realizing the power saving as the objective lens driving device.

Figure 16:
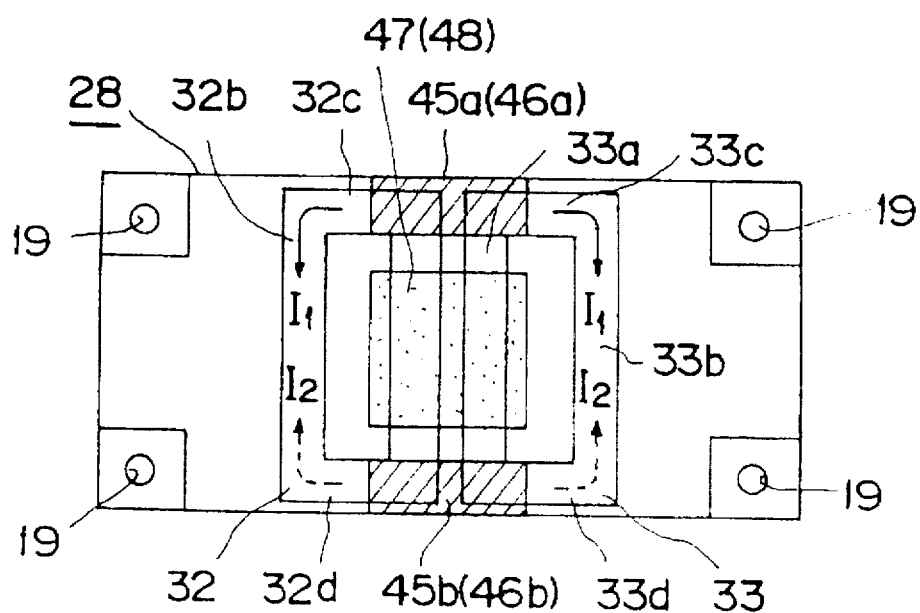

If the yoke 37 is designed so that the protrusions 45a, 45b and the protrusions 46a, 46b facing the opposite horizontal sections 29b, 30b of the coil portions 29, 30 making up the focusing coil 31 are provided on the upstanding pieces 45, 46 for delimiting the magnetic gaps $G_2$, $G_3$ for generating the magnetic flux $Bg_1$ and $Bg_2$ operating on the opposite horizontal sections 29b, 30b, part of the horizontal sections 32c, 32d and the horizontal sections 33c, 33d of the coil portions 32, 33 making up the tracking coil 34 mounted on the coil mounting substrate 28 for being layered on the coil portions 29, 30 of the focusing coil 31 is positioned within the magnetic gaps $G_2$, $G_3$. By the interaction between the driving current flowing in the horizontal sections 33c, 33d and the horizontal sections 32c, 32d of the coil portions 32, 33, a driving force moving the bobbin 22 in direction parallel to the optical axis of the objective lens 21 is generated. However, since the coil portions 32, 33 making up the tracking coil 34 are formed by winding in the opposite directions to each other, the currents flowing in the horizontal sections 32c, 32d and the horizontal sections 33c, 33d when the unidirectional current is supplied to the coil portions 32, 33 are opposite in direction, as shown in FIG. 16. Thus the driving forces generated by the interaction between the driving current flowing in the horizontal sections 32c, 32d and the horizontal sections 33c, 33d of the coil portions 32, 33 and the magnetic flux $Bg_1$ and $Bg_2$ within the magnetic gaps $G_2$, $G_3$ act in opposite directions and hence cancel each other. Thus the driving force generated by the interaction between the driving current flowing in the coil portions 29, 30 of the focusing coil 31 and the magnetic fluxes Bg, $Bg_1$ and $Bg_2$ of the magnetic circuit section 36 is not affected significantly.

Figure 19:
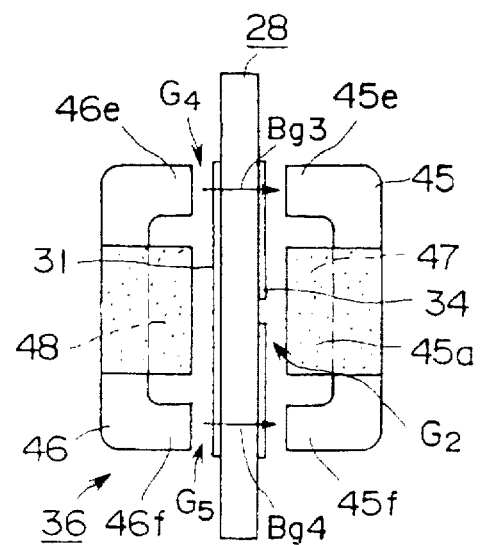
FIG. 19 is a plan view showing the relation of disposition between the coil mounting pate and a modification of the magnetic circuit section constituting the objective lens driving device shown in FIG. 9.
Figure 20:
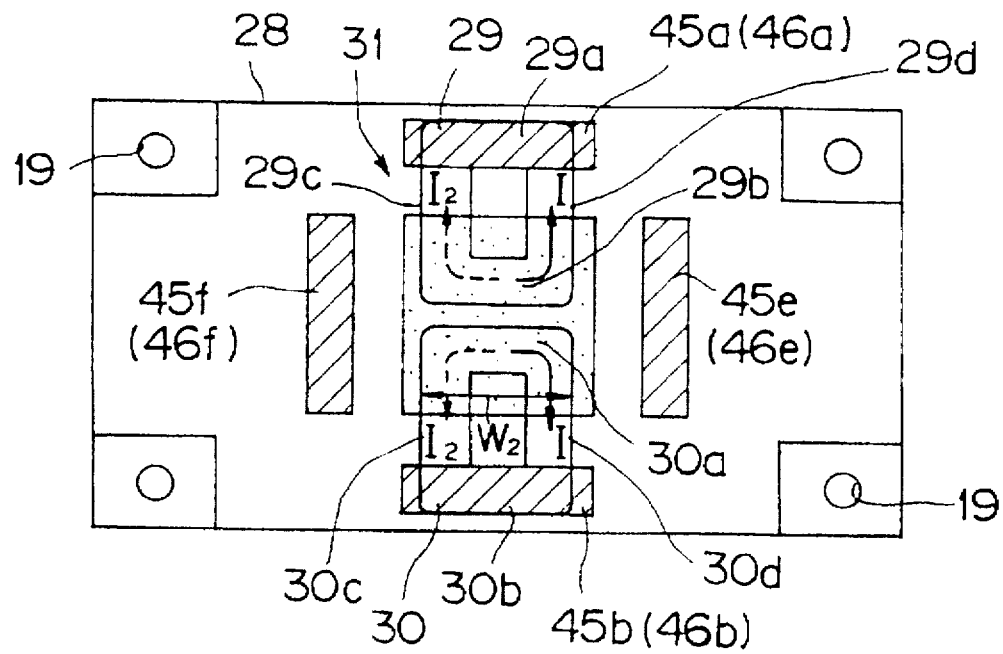
FIG. 20 is a front view showing the relation of disposition between the focusing coil provided on the coil mounting substrate and a magnetic circuit section shown in FIGS. 18 and 19.

The arrangement of the focusing coil 31 and the tracking coil 34 and that of the magnetic circuit section 36 are selected for improving the utilization efficiency of the focusing coil 31. For improving the utilization efficiency of the tracking coil 34 and the driving efficiency for the driving current supplied to the focusing coil 31 and the tracking coil 34, the arrangement of the focusing coil 31 and the tracking coil 34 and that of the magnetic circuit section 36 may be designed as shown in FIGS. 19 and 20.

The arrangement of the magnetic circuit section 36 is explained. The magnetic circuit section 36 has, on the upper and lower ends of the surfaces of upstanding pieces 45, 46 of the yoke 37 carrying the magnets 47, 48, horizontal protrusions 45a, 45b, 46a, 46b facing in proximity to each other, for delimiting the magnetic gaps $G_2$, $G_3$, as shown in FIG. 20, as in FIG. 15. On both sides of the surface of the upstanding pieces 45, 46 carrying the magnets 47, 48 are formed vertical protrusions 45e, 45f and 46e, 46f facing in proximity to each other, as shown in FIG. 20. The protrusions 45e and 46e and the protrusions 45f and 48f delimit magnetic gaps $G_4$ and $G_5$, respectively.

On one lateral side and on the opposite lateral side of the coil mounting substrate 28, there are formed a pair of coil portions 29, 30 making up the focusing coil 31 and another pair of coil portions 32, 33 making up the tracking coil 34. The coil portions 29, 30, making up the focusing coil 31, are wound in a flat-plate-shape having a pair of horizontal sections 29a, 29b, 30a, 30b extending parallel to the longitudinal direction of the coil mounting substrate 28 and a pair of vertical sections 29c, 29d, 30c, 30d extending parallel to the short sides of the coil mounting substrate 28, as shown in FIG. 20. The coil portions 29, 30 are provided on one lateral side of the coil mounting substrate 28 with the horizontal sections 29a, 30a lying adjacent to each other. The coil portions 29, 30 are dimensioned so that the horizontal sections 29a, 30a neighboring to each other are positioned at a mid portion of the magnetic gap $G_1$ delimited by the magnets 47, 48, while the opposite horizontal section 29b of the coil portion 29 is positioned within the magnetic gap $G_2$ delimited by the vertical protrusions 45a and 46a and the opposite horizontal section 30b of the coil portion 30 is positioned within the magnetic gap $G_3$ delimited by the opposite horizontal protrusions 45b and 46b.

The coil portions 29, 30 are formed with a width $W_4$ such that, when the objective lens 21 is moved in the tracking direction, that is in a direction normal to the optical axis, the vertical sections 29c, 29d, 30c, 30d are not facing the inside of the magnetic gaps $G_4$ and $G_5$ constituted by the vertical protrusions 45e, 45f and 46e, 46f.

Figure 21:
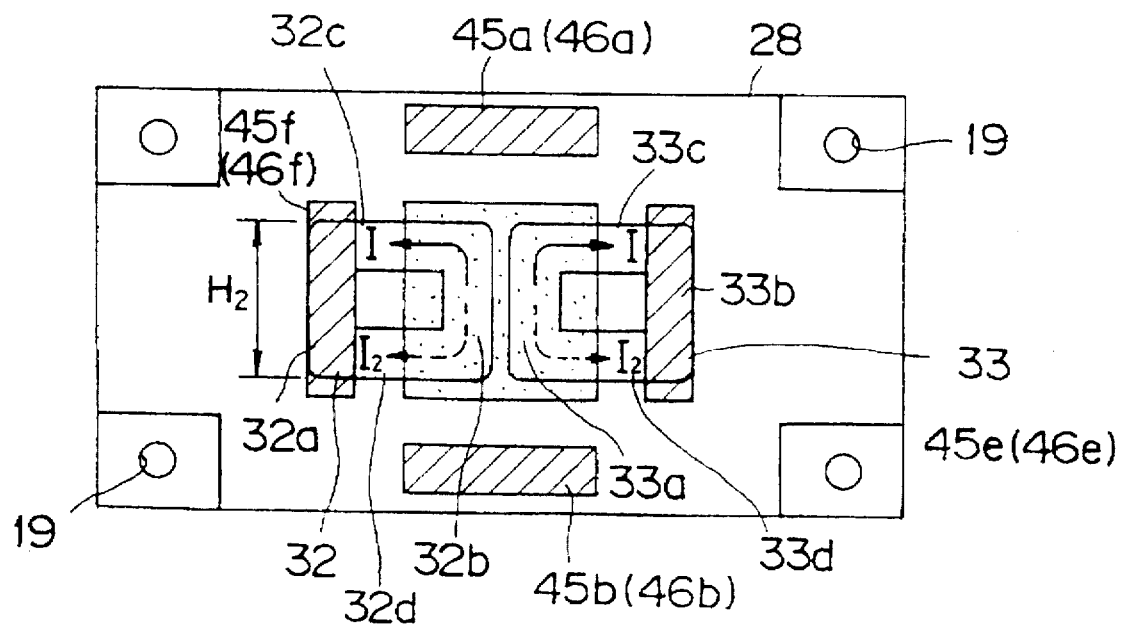
FIG. 21 is a front view showing the relation of disposition between the tracking coil provided on the coil mounting substrate and a magnetic circuit section shown in FIGS. 18 and 19.

On one lateral side of the coil mounting substrate 28, a pair of coil portions 32, 33 making up the tracking coil 34, are wound into a flat-plate-shape having a pair of vertical sections 32a, 32b, 33a, 33b and a pair of horizontal sections 32c, 32d, 33c, 33d, as shown in FIG. 21. The vertical sections 32a, 32b, 33a, 33b run parallel to the short sides normal to the longitudinal direction of the coil mounting substrate 28, while the horizontal sections 33c, 32d, 33c, 33d run parallel to the longitudinal direction of the coil mounting substrate 28. The coil portions 32, 33 are provided on the opposite surface of the coil mounting substrate 28 with the vertical sections 32a, 33a lying adjacent to each other. The coil portions 32, 33 making up the tracking coil 34 are dimensioned so that the vertical sections 32a, 33a neighboring to each other are positioned at a mid portion of the magnetic gap $G_1$ delimited by the magnets 47, 48, while the opposite vertical section 32b of the coil portion 32 is positioned within the magnetic gap $G_4$ delimited by the vertical protrusions 45e and 46e and the opposite vertical section 33b of the opposite coil portion 33 is positioned within the magnetic gap $G_5$ delimited by the opposite vertical protrusions 45f and 46f.

The coil portions 32, 33 making up the tracking coil 34 are formed with such a height $H_2$ that, when the objective lens 21 is moved in the focusing direction, that is in a direction parallel to its optical axis, the horizontal sections 33c, 32d, 33c, 33d are not caused to face the inside of the magnetic gaps $G_2$, $G_3$ delimited by the horizontal protrusions 45a, 45b, 46a and 46b, as shown in FIG. 21.

By arranging the focusing coil 31, the tracking coil 34 and the magnetic circuit section 36, as described above, the horizontal sections 29a, 29b and the horizontal sections 30a, 30b of the coil sections 29, 30 making up the focusing coil 31 are caused to face the inside of the magnetic gaps $G_1$, $G_2$ and $G_3$ where the magnetic fluxes Bg, $Bg_1$ and $Bg_2$ are concentrated. The vertical sections 32a, 32b, 33a, 33b of the coil sections 32, 33 making up the tracking coil 34 are also caused to face the inside of the magnetic gaps $G_1$, $G_4$ and $G_5$ where the magnetic fluxes Bg, $Bg_3$ and $Bg_4$ are concentrated.

Thus the utilization efficiency of the coil portions 29, 30 making up the focusing coil 31 and the coil portions 32, 33 making up the tracking coil 34 may be improved, while the generated driving force with respect to the driving current supplied to the focusing coil 31 and the tracking coil 34 may also be improved.

The above-described magnetic circuit section 36 employs magnets 47, 48 magnetized to the single direction of polarization, as shown for example in FIG. 17. However, the utilization efficiency of at least the coil portions constituting the focusing coil 31 may be improved by employing magnets 147, 148 magnetized to two directions of polarization.

Figure 22:
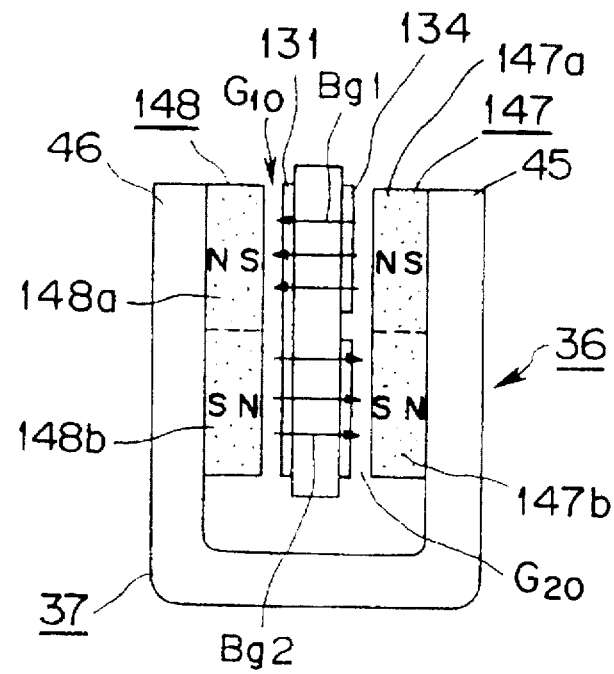
FIG. 22 is a side view showing the relation of disposition between the coil mounting substrate and a magnet having two magnetic poles.

Referring to FIG. 22, an embodiment of the invention in which the magnetic circuit portion 36 is constituted using the magnets 147, 148 magnetized to two polarities is explained. The parts or components common to those of the magnetic circuit section 36 are denoted by the same numerals and the corresponding description is omitted for simplicity. The magnets 147, 148 are magnetized to two opposite magnetic polarities, with the direction of magnetization being reversed at a mid point in the height-wise direction parallel to the optical axis of the objective lens 21. These magnets 147, 148 are provided with first magnetized portions 147a, 148a and second magnetized portions 147b, 148b arranged side-by-side and having different directions of magnetization along the thickness, as shown in FIG. 22. The magnets 147, 148 are mounted on mutually facing inner lateral sides of a pair of mutually facing upstanding pieces 45, 46 making up the yoke 37, with the first magnetized portions 147a and 148a of the magnets 147, 148 defining a first magnetic gap $G_{10}$ and the second magnetized portions 147b and 148b of the magnets 147, 148 defining a second magnetic gap $G_{20}$. Since the first magnetized portions 147a and 148a and the second magnetized portions 147b and 148b of the magnets 147, 148 are magnetized in opposite directions to each other, the magnetic flux $Bg_1$ and the magnetic flux $Bg_2$, opposite to each other in direction, are radiated into the first magnetic gap $G_{10}$ and the second magnetic gap $G_{20}$, respectively.

The focusing coil 131 applied to the magnetic circuit section 36 is formed as a single coil portion 51 in the form of a flat rectangular shape. That is, the coil portion 51 of the focusing col 131 is formed by winding into a flat rectangular shape and has a pair of horizontal sections 51a, 51b parallel to the longitudinal direction of the coil mounting substrate 28 and a pair of vertical sections 51c, 51d parallel to the short sides of the coil mounting substrate 28. The coil portion 51 is provided on a lateral side of the coil mounting substrate 28. The coil portion 51 is dimensioned so that its horizontal section 51a is disposed within the first magnetic gap $G_{10}$ delimited by the first magnetized portions 147a, 148a and its opposite horizontal section 51b is disposed within the second magnetic gap $G_{20}$ delimited by the second magnetized portions 147b, 148b.

The coil portion 51 is formed with a width such that, when the objective lens 21 is moved in the tracking direction normal to its optical axis, the vertical sections 51c, 51d are not disposed within the first and second magnetic gap $G_{10}$, $G_{20}$. Specifically, the distance $W_{50}$ between the vertical sections 51c, 51d is selected to be equal to the width $W_{50}$ of the magnets 47, 48 plus the amount of movement of the objective lens 21 in the tracking direction.

When the unidirectional currents 110, 120 are supplied to the coil portion 51 constituting the focusing coil 131, the directions of the currents flowing through the horizontal sections 51a, 51b are reversed to each other. However, since the first and second magnetized portions 147a, 148a, 147b, 148b are magnetized in different directions along the thicknesses thereof, the magnetic fluxes $Bg_1$, $Bg_2$ within the first and second magnetic gap $G_{10}$, $G_{20}$ are also reversed relative to each other. Thus, if the driving current is supplied to the coil portion 51, the driving force may be produced in the focusing direction, that is in a direction parallel to the optical axis of the objective lens 21, by taking advantage of both horizontal sections 51a, 51b of the coil portion 51.

Figure 24:
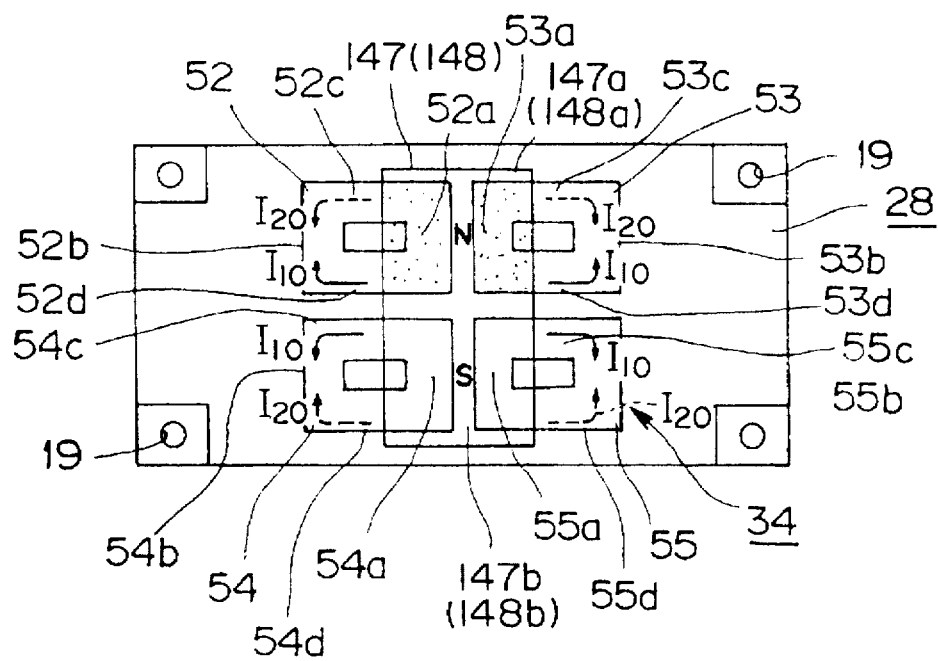
FIG. 24 is a side view showing the relation of disposition between the tracking coil and a magnet having two magnetic poles.

The tracking coil 134 is made up of a pair of coil sections 52, 58 arranged facing the first magnetized portions 147a, 148a of the magnets 147, 148 and a pair of coil sections 54, 55 arranged facing the second magnetized portions 147b, 148b of the magnets 147, 148, as shown in FIG. 24. These coil portions 52, 53, 54 and 55 are formed by winding in flat rectangular plate shape and are made up of pairs of vertical sections 52a, 52b, 53a, 53b, 54a, 54b, 55a, 55b, parallel to the short sides normal to the longitudinal direction of the coil mounting substrate 28 and pairs of horizontal sections 52c, 52d, 53c, 53d, 54c, 54d, 55c, 55d, parallel to the longitudinal direction of the coil mounting substrate 28, as shown in FIG. 24. The coil portions 52, 53, arranged facing the first magnetized portions 147a, 148a and the coil portions 54, 55, arranged facing the second magnetized portions 147b, 148b are mounted on the opposite sides of the coil mounting substrate 28 with the vertical sections 52a, 53a, 54a and 55a lying adjacent to one another. The paired coil portions 52, 53, 54, 55 making up the tacking coil 134 are dimensioned so that the vertical portions 52a, 53a, 54a and 55a neighboring to one another are positioned within the first and second magnetic gap $G_{10}$, $G_{20}$ delimited by the first magnetized portions 147a, 148a and the second magnetized portions 148a, 148b, while the opposite vertical portions 52b, 53b, 54b and 55b are positioned outside of the first and second magnetic gap $G_{10}$, $G_{20}$.

Figure 23:
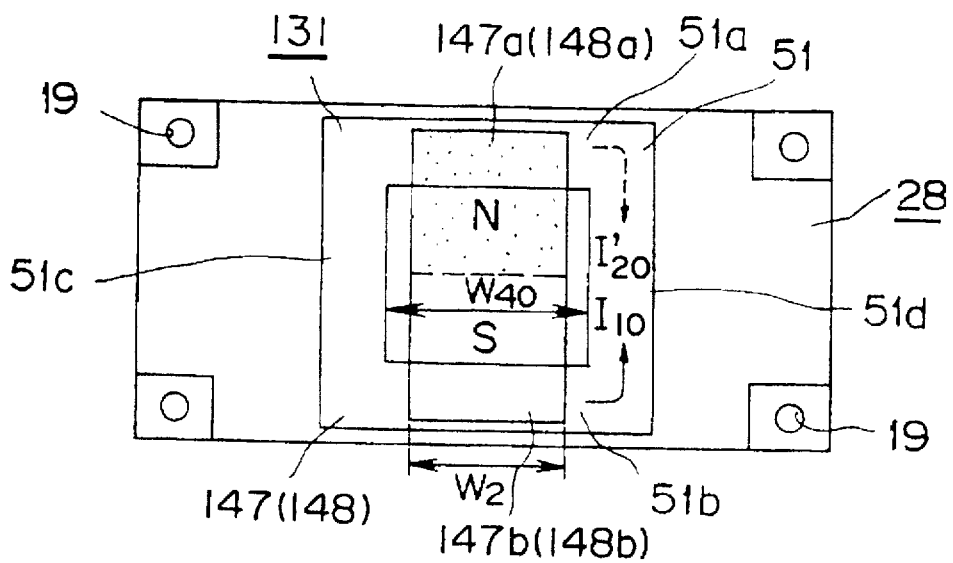
FIG. 23 is a side view showing the relation of disposition between the focusing coil and a magnet having two magnetic poles.
Figure 25:
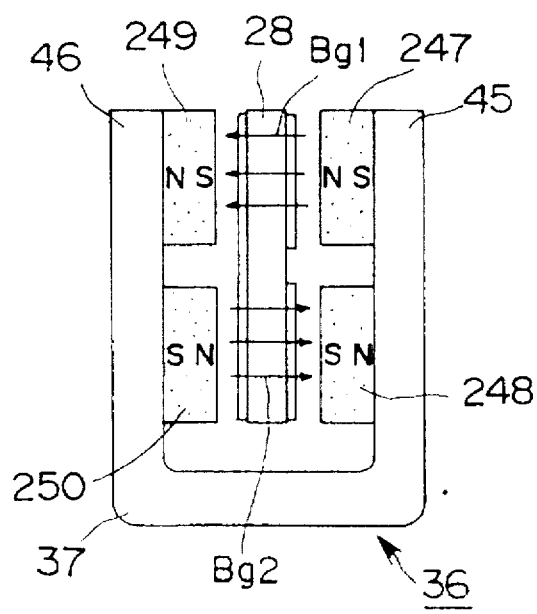
FIG. 25 is a side view showing the relation of disposition of the coil mounting substrate and a magnetic circuit employing a plurality of magnets each having a single magnetic pole.
Figure 26:
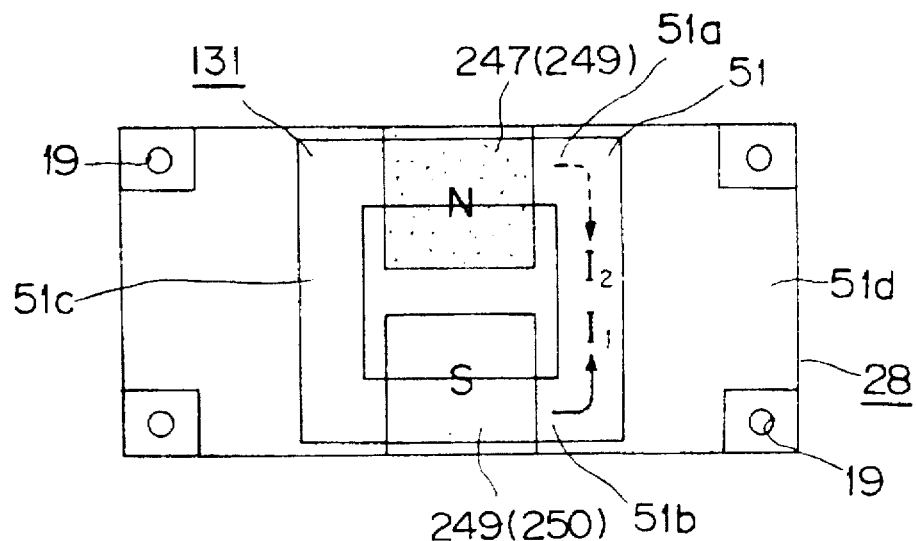
FIG. 26 is a front view showing the relation of disposition of the focusing coil and a magnetic circuit employing a plurality of magnets each having a single magnetic pole.
Figure 27:
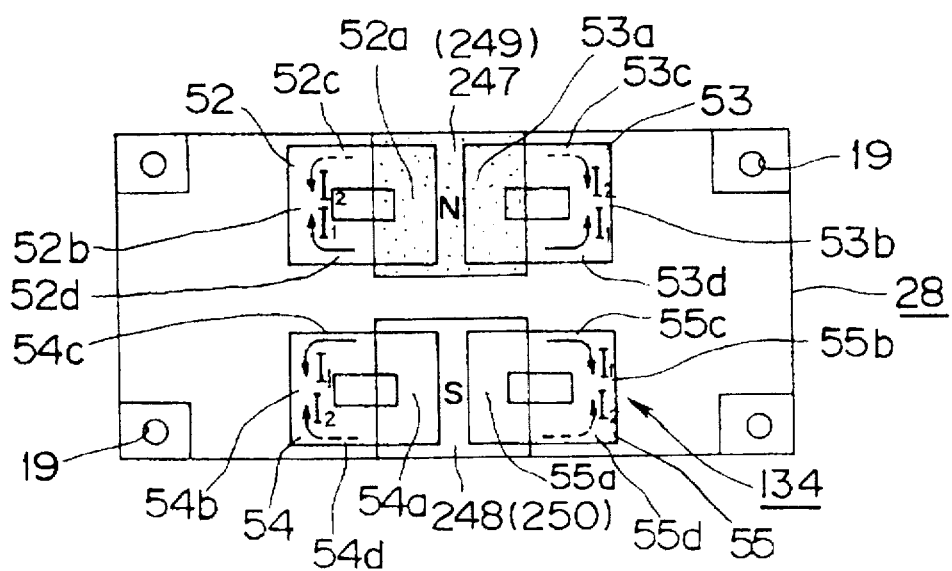
FIG. 27 is a front view showing the relation of disposition of the tracking coil and a magnetic circuit employing a plurality of magnets each having a single magnetic pole.

In the embodiment shown in FIGS. 22 to 24, two magnetized portions with different directions of polarizations are provided on the single magnets 147, 148. In a modification of the embodiment of FIGS. 22 to 24, shown in FIGS. 25 to 27, the portions common to those shown in FIGS. 22 to 24 are denoted by the same numerals. It is also possible to provide magnets 247, 248, 249 and 250, each magnetized to the same polarity, in association with first magnetized portions 247a, 248a and the second magnetized portions 147a, 148b. In this case, the magnets 247, 248, 249 and 250 are magnetized to different directions of magnetization as shown in FIG. 25. The driving force for moving the objective lens 21 in the focusing and tracking directions is generated in the same way as in the embodiment shown in FIGS. 22 to 24.

Figure 28:
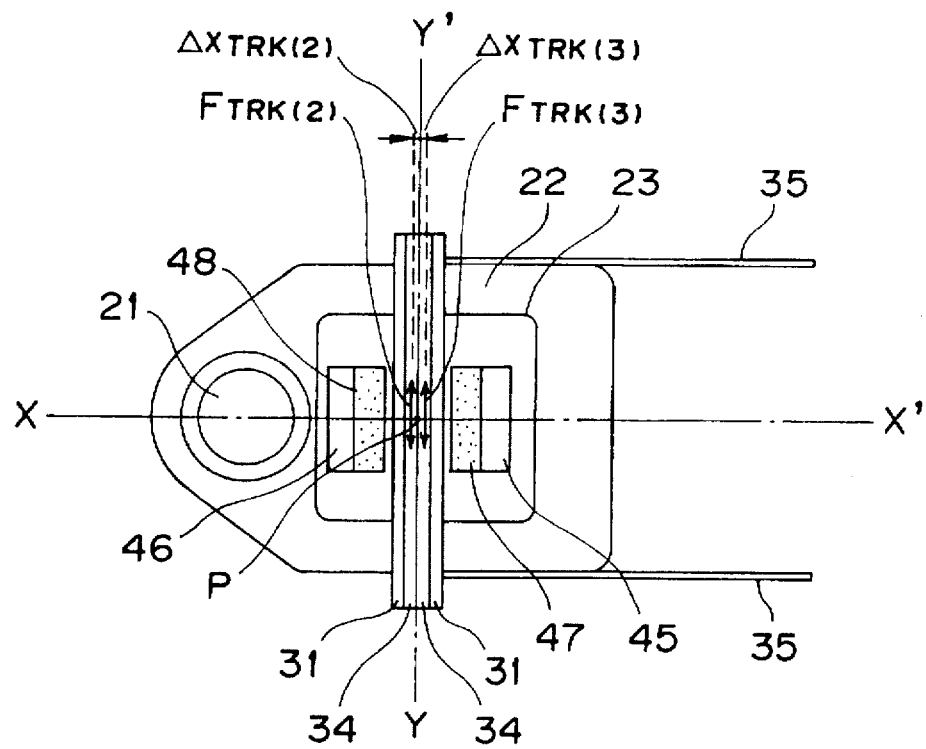
FIG. 28 is a plan view showing an arrangement of a magnetic circuit section, focusing coil and the tracking coil.
Figure 29:
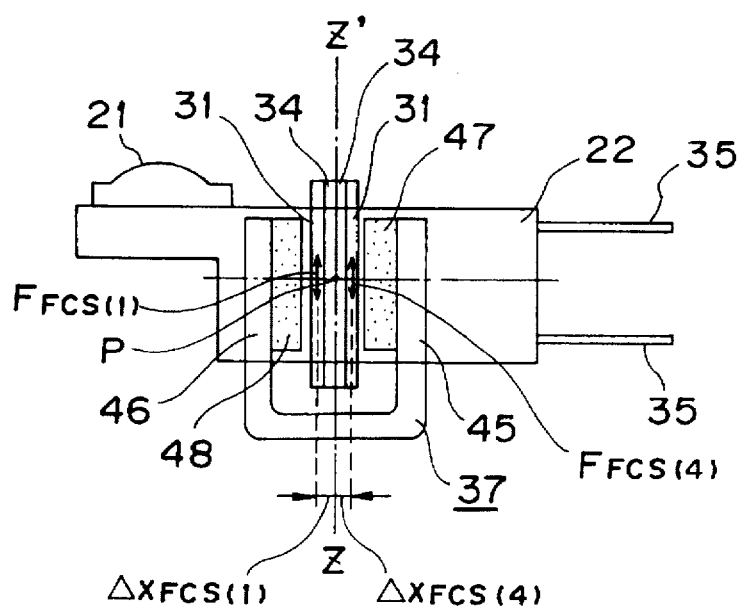
FIG. 29 is a cross-sectional view showing an arrangement of a magnetic circuit section, focusing coil and the tracking coil.
Figure 30:
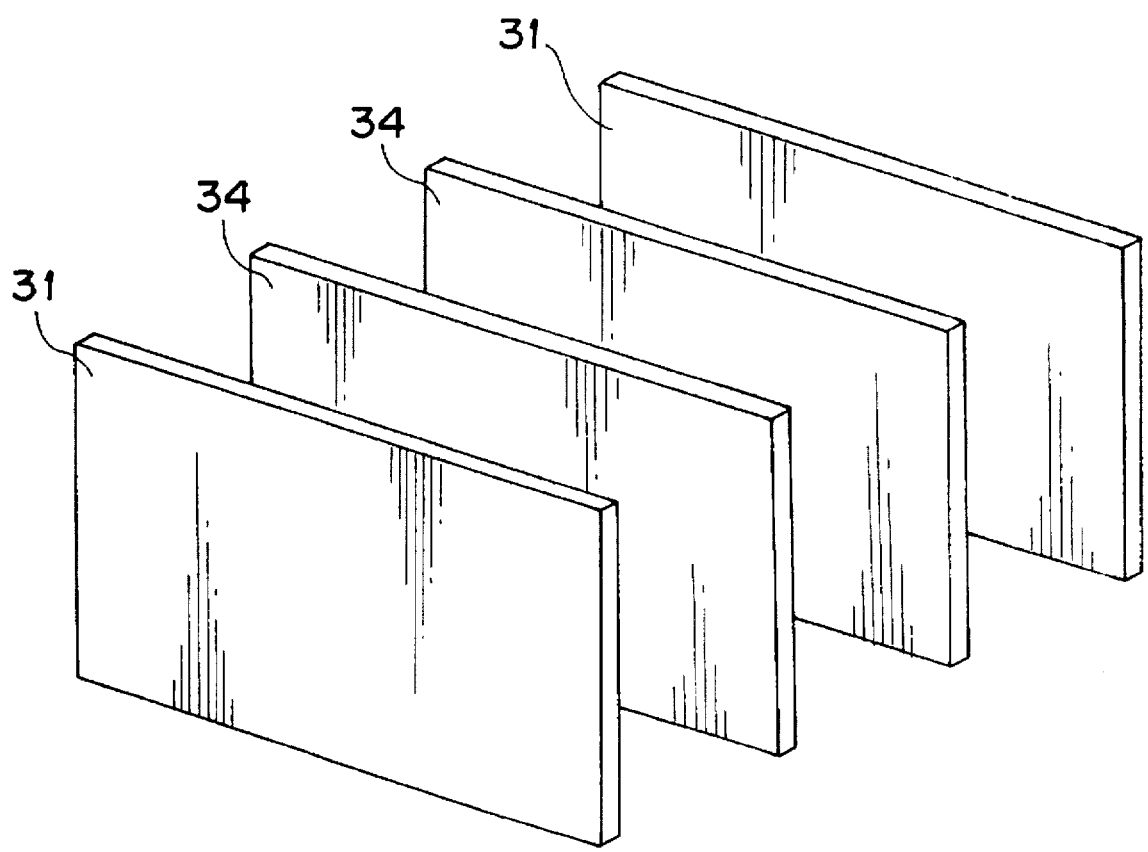
FIG. 30 is a schematic view showing an arrangement of a focusing coil and a tracking coil.

The magnetic circuit section 38, as an essential portion of the objective lens driving device 20 of the instant embodiment, is provided with a set of overlaid coil mounting substrates 28 in a magnetic gap of the magnets 47, 48 mounted on the upstanding pieces 48, 47 of the yoke 37 facing each other, as shown in FIGS. 28 and 29. The coil mounting substrates 28, 28, each carrying the focusing coil 31 and the tracking coil 34 on its both surfaces, are joined to each other with the sides thereof carrying the tracking coils 34 being layered and bonded to each other with the aid of a non-conductive adhesive. In FIGS. 28 and 29, the mounting substrates 28, 28 are not shown for simplicity.

In the magnetic gap of the magnets 47, 48 of the magnetic circuit section 38, there are layered the tracking coils 34, 34 in contact with each other, with the focusing coils 31, 31 being disposed on both sides of the tracking coils 34, 34.

These focusing coils 31, 31 and the tracking coils 34, are arrayed in a four-layer arrangement in which the focusing coils 31, 31 and the tracking coils 34, 34 are plane-symmetrical relative to the layered surface of the tracking coils 34. The number of turns of the focusing coils 31, 31 and the tracking coils 34, 34 are set so as to be equal to each other.

Figure 31:
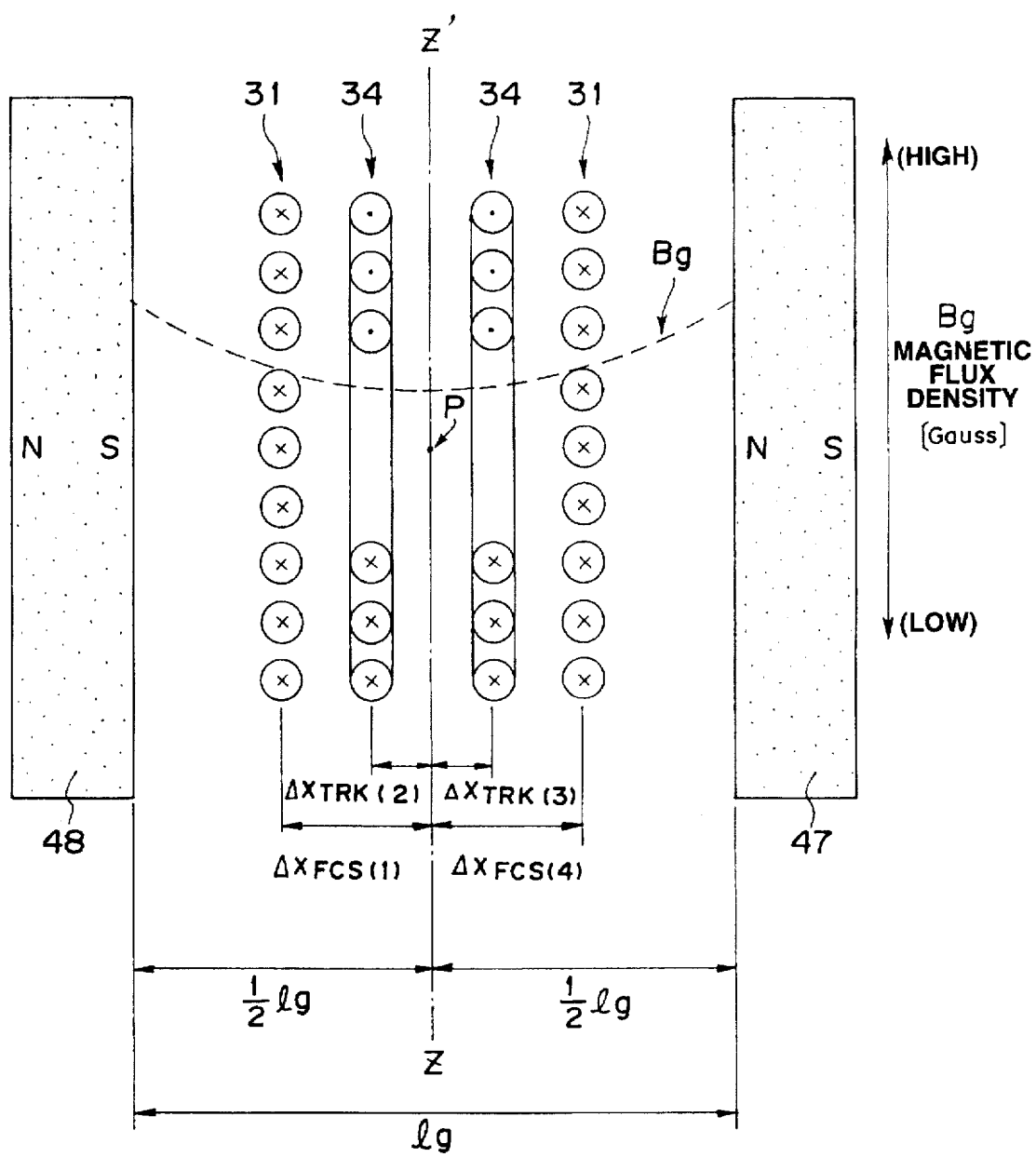
FIG. 31 is a schematic cross-sectional view showing an arrangement of a focusing coil and a tracking coil.

Referring to FIGS. 28, 29 and 31, the driving force $F_{FCS}$ generated by the focusing coils 31, 31 and the driving force $F_{TRK}$ generated by the tracking coils 84, 34 in the magnetic circuit section 88 provided with the focusing coils 31, 31 and the tracking coils 34, 34 will be explained in detail.

The X—X', Y—Y' and Z—Z' axes pass through the center of a magnetic gap $G_1$ and cross one another. At a point of intersection of these axes, there is a center of gravity P of the coil mounting substrates 28, 28 overlaid with each other and carrying the focusing coils 31, 31 and the tracking coils 34, 34. In FIG. 31, each of the Y—Y' and X—X' axes are positioned at a magnetic gap length ½ Lg, with the length of the magnetic gap $G_1$ delimited by the magnets 47, 48 being Lg.

In FIG. 31, a broken line indicates the magnetic flux density Bg generated by the magnets 47, 48. The magnetic flux Bg becomes high towards the magnets 47, 48 and becomes lower as the center of the magnetic gap $G_1$ is approached. Thus, in the magnetic gap $G_1$, the density of the magnetic field generated by the magnets 47, 48 is symmetrically formed with the X—X', Y—Y' and Z—Z' axes as the center.

The focusing coils 31, 31 and the tracking coils 34, 34 of the four-layered structure represent the first layer coil to the fourth layer coil, looking from the left end in FIG. 31. The driving forces generated by the coils are denoted $F_{FCS(1)}$, $F_{FCS(2)}$, $F_{FCS(3)}$, $F_{FCS(4)}$.

If the distance from the focusing coils 31, 31 to the Z—Z' axis are denoted $\Delta X_{FCS(1)}$, $\Delta X_{FCS(4)}$, $\Delta X_{FCS(1)} = \Delta X_{FCS(4)}$.

Since the magnetic flux densities generated by the magnets 47, 48 are symmetrical with the Z—Z' axis as the center, the density of the magnetic flux interlinked with the focusing coils 31, 31 in the magnetic gap $G_1$ become equal in magnitude to each other. The focusing coils 31, 31, whose numbers of turns of the focusing coils 31, 31 are equal to each other, are fed with the currents of the same intensities.

Consequently, $F_{FCS(1)} = F_{FCS(4)}$.

The driving force $F_{FCS}$, generated by the focusing coils 31, 31 is the resultant force of $F_{FCS(1)}$ and $F_{FCS(4)}$, and is represented by $$F_{FCS} = F_{FCS(1)} + F_{FCS(4)}.$$

Thus the driving force $F_{FCS}$, generated by the focusing coils 31, 31, act in concert on the center of gravity P.

If the distances from the tracking coils 34, 34 to the Z—Z' axis are $\Delta X_{TRK(2)}$, $\Delta X_{TRK(3)}$, the tracking coils 34, 34 are arranged at a position such that $$\Delta X_{TRK(2)} = \Delta X_{TRK(3)}.$$

Since the magnetic flux density generated by the magnets 47, 48 are arranged symmetrically with respect to the Y—Y' axis, the densities of the magnetic flux interlinked with the tracking coils 34, 34 within the magnetic gap $G_1$ become equal to each other. The tracking coils 34, 34 have the same number of turns such that they are supplied with the same intensity of the electrical current.

Therefore, $$F_{TRK(2)} = F_{TRK(3)}.$$

The driving force $F_{TRK}$, generated by the tracking coils 34, 34, is the resultant force of $F_{TRK(2)}$ and $F_{TRK(3)}$, and is represented by $$F_{TRK} = F_{TRK(2)} + F_{TRK(3)}.$$

Thus the driving force $F_{TRK}$, generated by the tracking coils 34, 34, act in concert on the center of gravity P.

With the above-described magnetic circuit section 36, in which the focusing coils 31, 31 and the tracking coils 34, 34 are arranged symmetrically with respect to the Z—Z' axis, the driving force $F_{FCS}$ and the driving force $F_{TRK}$ act in concert on the center of gravity P. Thus, with the magnetic circuit section 36, the force of deflection producing distortion or flexure in the elastic supporting member 35 at the time of movement of the objective lens 21 is reduced, so that, with the magnetic circuit section 36, the resonant vibrations produced with the movement of the objective lens 21 may be reduced.

Figure 32:
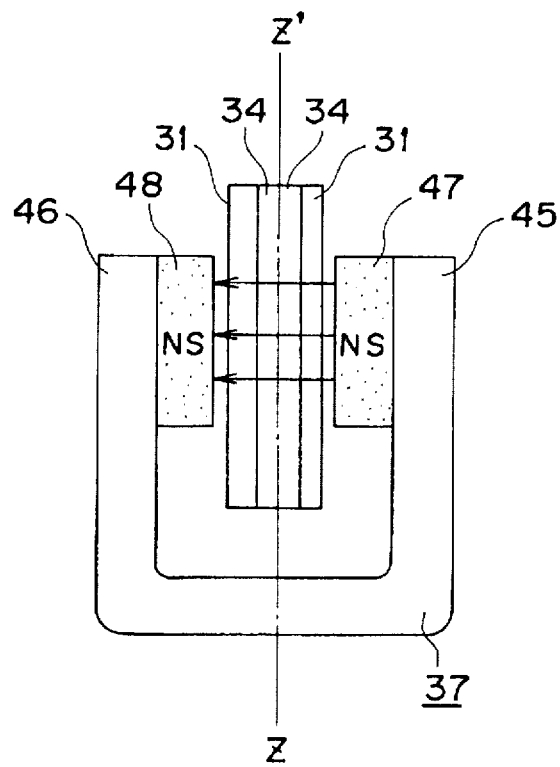
FIG. 32 is a side view showing the relation of disposition between a magnetic circuit section, focusing coil and the tracking coil.
Figure 33:
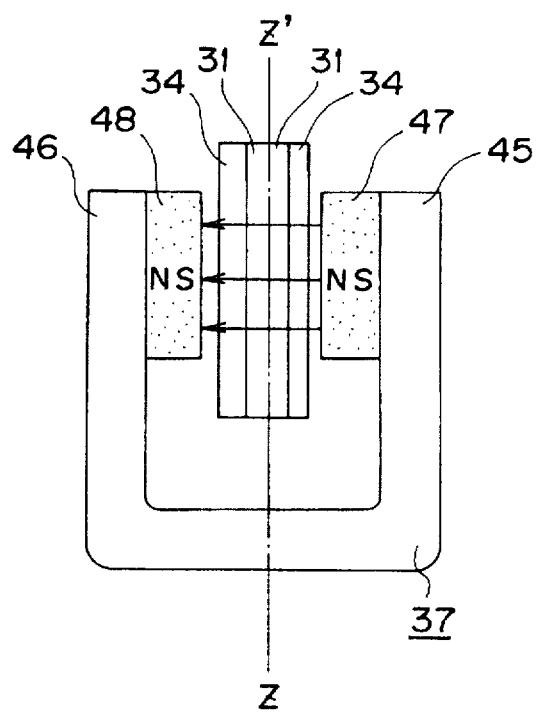
FIG. 33 is a side view showing the relation of disposition between the magnetic circuit section, focusing coil and the tracking coil.

The above-described embodiment, shown in FIG. 32, is a four-layer structure in which the tracking coils 34, 34 are layered together and the focusing coils 31, 31 are layered on the outer sides of the tracking coils 34, 34. However, the four-layer structure may also be so arranged that the focusing coils 31, 31 are layered together and the tracking coils 34, 34 are layered on the outer sides of the focusing coils 31, 31, as shown in FIG. 33.

Figure 34:
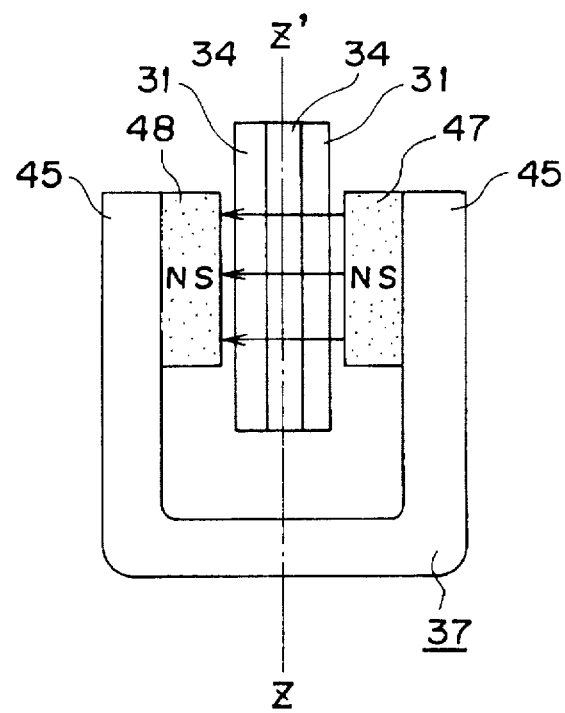
FIG. 34 is a side view showing the relation of disposition between the magnetic circuit section, focusing coil and the tracking coil.
Figure 35:
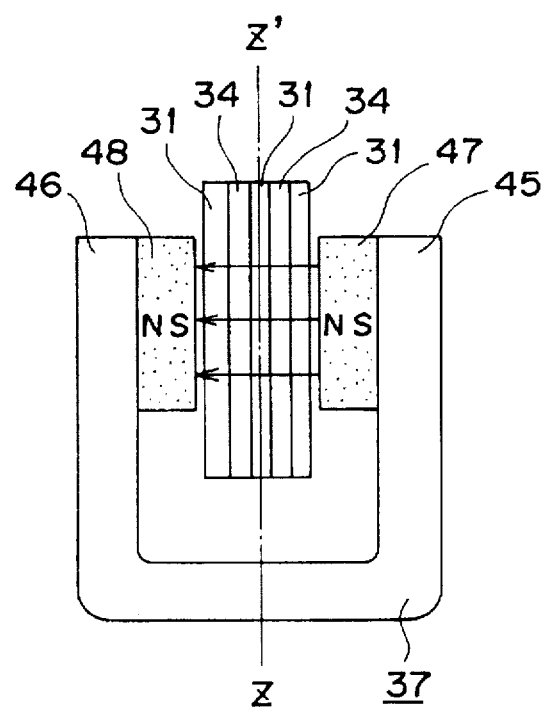
FIG. 35 is a side view showing the relation of disposition between the magnetic circuit section, focusing coil and the tracking coil.

In the above-described embodiment, the four-layer construction is provided by the focusing coils 31, 31 and the tracking coils 34, 34. However, a sole tracking coil 34 may be disposed with the center of gravity thereof coincident with the Z—Z' axis and two focusing coils 31, 31 may be then disposed symmetrically with respect to the Z—Z' axis on both sides of the tracking coil 34, as shown in FIG. 34.

The above-described embodiment may be modified so that a sole focusing coil 31 is disposed with the center of gravity thereof coincident with the Z—Z' axis, two tracking coils 34, 34 are arranged on both lateral sides of the focusing coil 31 and two focusing coils 31, 31 are then arranged on the outer sides of the tracking coils 34, 34 by way of completing a five-layered construction. The focusing coils 31, 31 and the tracking coils 34, 34 are arranged symmetrically with respect to the Z—Z' axis.

Since the intensity of the magnetic field generated by a magnet is decreased in inverse proportion to the square of the distance from the magnet, the electro-magnetic force generated in the coil arranged on the outer side adjacent to the magnet becomes larger than that generated in a coil disposed on the inner side or towards the center of gravity P.

That is, with the coil disposed adjacent to the magnet, it is possible to develop a driving force which is larger than that developed with the coil arranged on the inner side, thus enabling the operational sensitivity to be raised. Thus, with the above-described embodiments, one of the focusing coil 31 or the tracking coil 34 is arranged adjacent to the magnets 47, 48, and the numbers of the respective coils are selected optionally.

Figure 36:
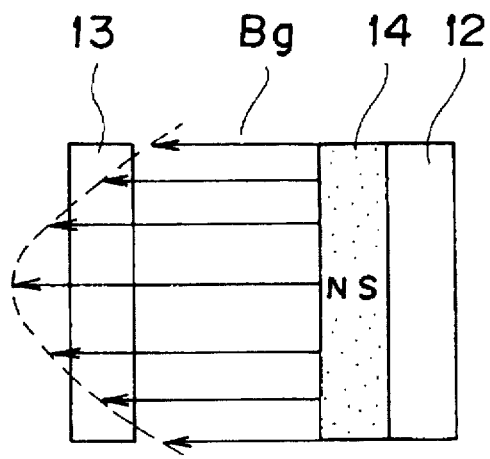
FIG. 36 is a schematic plan view for illustrating the distribution of energy of a magnetic field generated by a magnet of the magnetic circuit section.
Figure 37:
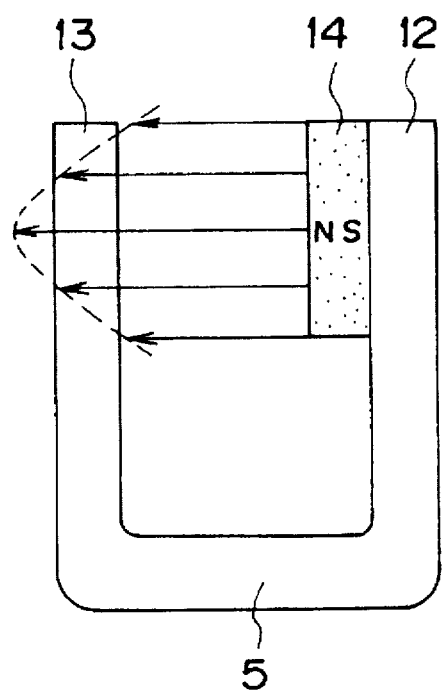
FIG. 37 is a schematic side view for illustrating the distribution of energy of a magnetic field generated by a magnet of the magnetic circuit section.

In general, the distribution of the magnetic energy generated by the magnet 41, that is the so-called magnetic flux density, is maximum at a mid portion of the magnet 14 and becomes gradually smaller towards the outer periphery of the magnet 14, as shown in FIGS. 36 and 37. Since the focusing coils 31, 31 and the tracking coils 34, 34 are moved within the magnetic gap, they are not necessarily positioned facing the mid portion of the magnet 14.

Consequently, since the interlinked state of the focusing coils 31, 31 and the tracking coils 34, 34 with the magnetic flux Bg is abruptly changed as the focusing coils 31, 31 and the tracking coils 34, 34 are moved in the magnetic gap, resonant vibrations may be produced, while the power consumption tends to be increased or decreased abruptly, or the operational control is likely to be lowered.

Figure 38:
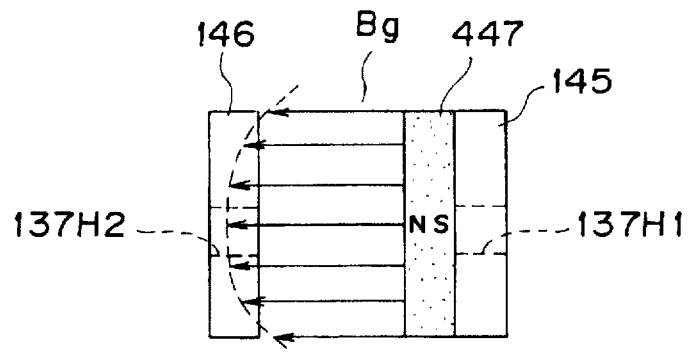
FIG. 38 is a plan view showing a yoke of the magnetic circuit section.
Figure 39:
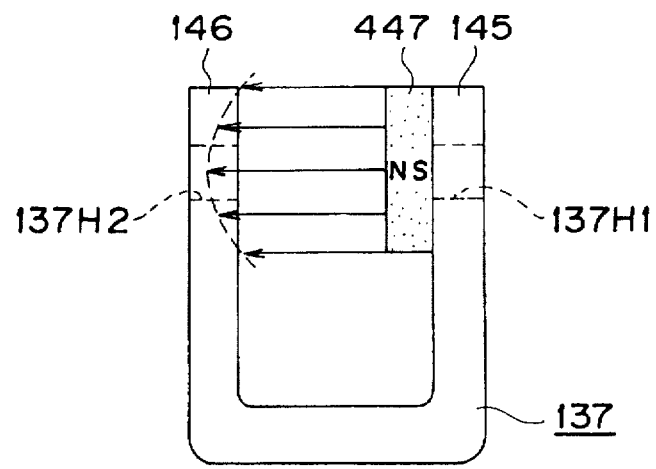
FIG. 39 is a side view showing a yoke of the magnetic circuit section.
Figure 40:
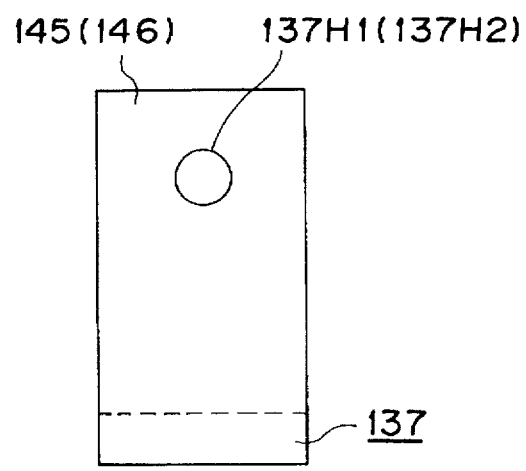
FIG. 40 is a front view showing a yoke of the magnetic circuit section.

Referring to FIGS. 38, 39 and 40, a magnetic circuit section 136, freed of the above-described inconveniences, is now explained. With the present magnetic circuit section 136, a magnet 447 is mounted on the inner surface of one 146 of the upstanding pieces 145 and 146 of the yoke 137 facing each other.

The yoke 137 is provided with magnetic reluctance portions facing each other and the mid portion of the magnet 447. These magnetic reluctance portions are formed by through-holes 137H1, 137H2 of pre-set sizes extending through the upstanding pieces 145, 146.

Thus the magnetic circuit section 136 is formed with the through-holes 137H1, 137H2 formed in the upstanding pieces 145, 16 of the yoke 137. Since this increases the magnetic reluctance of the mid portion of the magnet 147, the density of the magnetic flux generated by the magnet 447 of the magnetic circuit section 136 becomes uniform, as shown in FIGS. 38 and 39.

Figure 41:
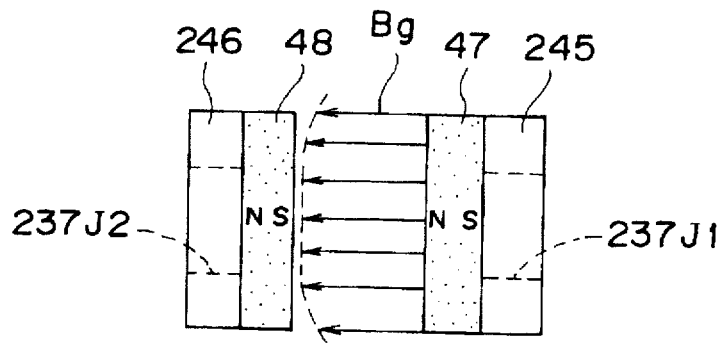
FIG. 41 is a plan view showing a yoke of the magnetic circuit section.
Figure 42:
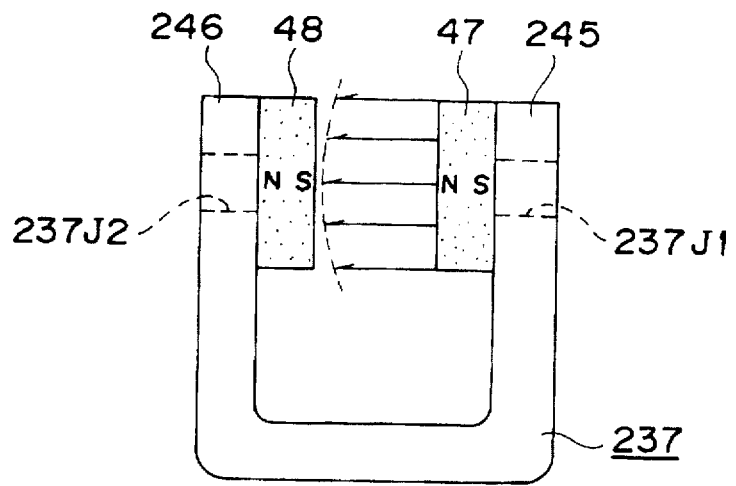
FIG. 42 is another side view showing a yoke of the magnetic circuit section.
Figure 43:
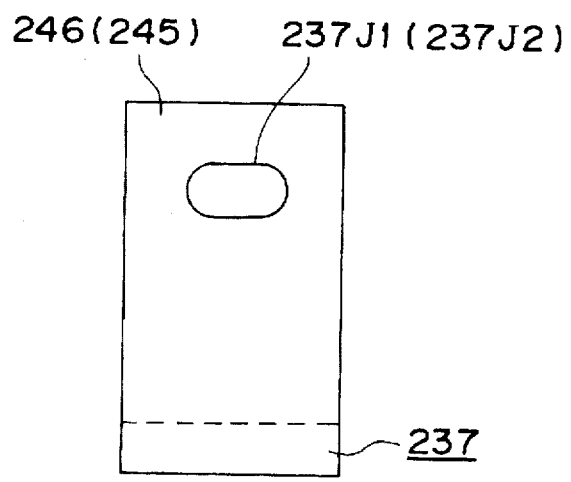
FIG. 43 is another front view showing a yoke of the magnetic circuit section.

Referring to FIGS. 41 to 43, a magnetic circuit section 236, improved over the above-described magnetic circuit section 36, is explained. With the present magnetic circuit section 236, magnets 47, 48 are mounted on the inner sides of upstanding pieces 245, 246 facing each other and constituting a yoke 237.

The upstanding pieces 245, 246 of the yoke 237 are provided in register with the mid portion of the magnets 47, 48 with magnetic reluctance portions facing each other. These magnetic reluctance portions are constituted by elongated holes 237J1, 237J2 of pre-set size extending along the width at right angles to the upstanding pieces 245, 246. The upstanding pieces 245, 246 of the yoke 237 of the magnetic circuit section 236 are formed with the elongated holes 237J1, 237J2 for increasing the magnetic reluctance at the mid portion of the magnets 47, 48.

With the above-described magnetic circuit section 236, the magnetic flux density in the magnetic gap of the magnets 47, 48 are rendered uniform by provision of the elongated holes 237J1, 237J2 in the yoke 237, as shown in FIGS. 41 and 42. Thus it is possible with the magnetic circuit section 236 to prohibit resonant vibrations or variation in the operating sensitivity during movement of the objective lens 21.

With the magnetic circuit section 236, the distribution of the magnetic energy generated by the magnets 47, 48 may be optionally set by appropriately setting the shape or size of the through-holes constituting the magnetic reluctance depending upon the length or width of the magnets 47, 48.

Figure 44:
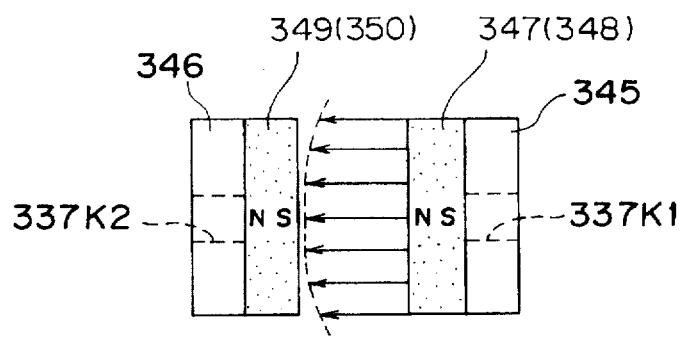
FIG. 44 is a plan view showing a yoke of a magnetic circuit section employing plural magnets each having two magnetic poles.
Figure 45:
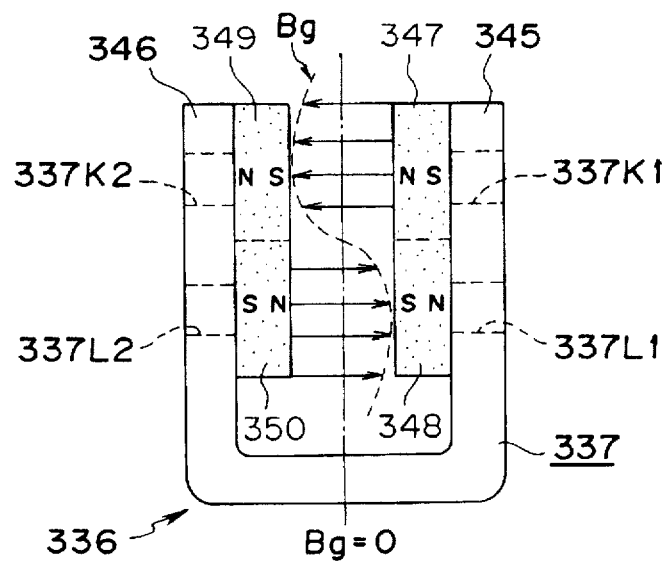
FIG. 45 is a side view showing a yoke of a magnetic circuit section employing plural magnets each having two magnetic poles.
Figure 46:
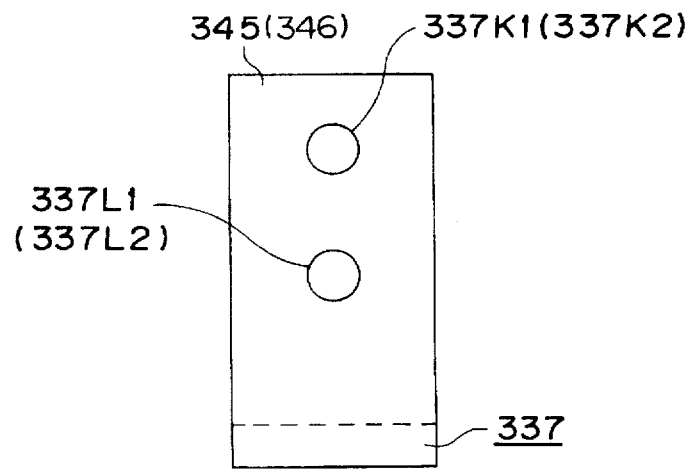

Referring to a magnetic circuit section 336, employing a magnet magnetized to two magnetic polarities, is explained by referring to FIGS. 44 to 46. With the magnetic circuit section 336, magnets 347, 348 and magnets 349, 350 are mounted on the inner sides of a pair of upstanding pieces 345, 346 facing each other and constituting the yoke 337.

The upstanding pieces 345, 346 of the yoke 337 are provided with mutually facing magnetic reluctance portions in register with the mid portions of the magnets 347, 349. These magnetic reluctance portions are formed by through-holes 337K1, 337K2 of pre-set size extending at right angles to the upstanding pieces 345, 346. Thus, with the magnetic circuit portion 336, the mid portions of the magnets 347, 349 are increased in magnetic reluctance by the through-holes 337K1, 337K2 formed in the upstanding pieces 345, 346 of the yoke 337.

The opposite upstanding piece 346 of the yoke 337 is provided with facing magnetic reluctance portions in register with the mid portions of the magnets 348, 350. These magnetic reluctance portions are constituted by through-holes 371L1, 371L2 of pre-set size formed in the upstanding pieces 345, 346. That is, with the magnetic circuit section 336, the magnetic reluctance at mid portions of the magnets 348, 350 is increased by provision of the through-holes 337L1, 337L2 in the upstanding pieces 345, 346 of the yoke 337.

With the magnetic circuit section 336, described above, the magnetic flux density in the magnetic gaps delimited by the magnets 347, 349 and magnets 348, 350 is rendered uniform by the provision of the through-holes 337K1, 337K2, 337L and 337L2 in the upstanding pieces 345, 346 of the yoke 337. Thus it is possible with the magnetic circuit section 336 to reduce resonant vibrations or variations in the operational sensitivity. It is also possible with the magnetic circuit section 336 to smooth the rate of change in the intensity in the magnetic field in the vicinity of the magnets 347, 348 349 and 350.

The magnetic reluctance portions in the magnetic circuit sections 236, 237 may be provided by non-magnetic materials, such as synthetic resin, embedded in the upstanding pieces 245, 246 of the yoke 237 and in the upstanding pieces 345, 346 of the yoke 337.

Meanwhile, the elastic supporting members 35, supporting the bobbin 22 fitted with the objective lens 21 constituting the objective lens driving device 20, movably support the bobbin 20 by having the ends 35a fixedly supported by the coil mounting substrate 28 using an electrically conductive adhesive, such as a solder 41. The end 35a of the elastic supporting member 35 is inserted into the elastic supporting member insertion hole 19 bored in the connection terminal section 40 provided at each corner of the coil mounting substrate 28 mounted on the bobbin 22.

By boring the elastic supporting member insertion hole 19 in the coil mounting substrate 28, and by inserting the end 35a into the through-hole 19a for supporting the elastic supporting member 35, the adhesive, such as the solder 41, is coated on the entire outer periphery of the elastic supporting member 35, thus assuring positive electrical conduction between the elastic supporting member 35 and the connection terminal 40 as well as sufficient mounting integrity with respect to the coil mounting substrate 28.

In this case, the end 35a of the elastic supporting member 35 needs to be inserted into the elastic supporting member insertion hole 19, so that there is a risk that the elastic supporting member 35 cannot be mounted with ease on the coil mounting substrate 28.

Figure 47:
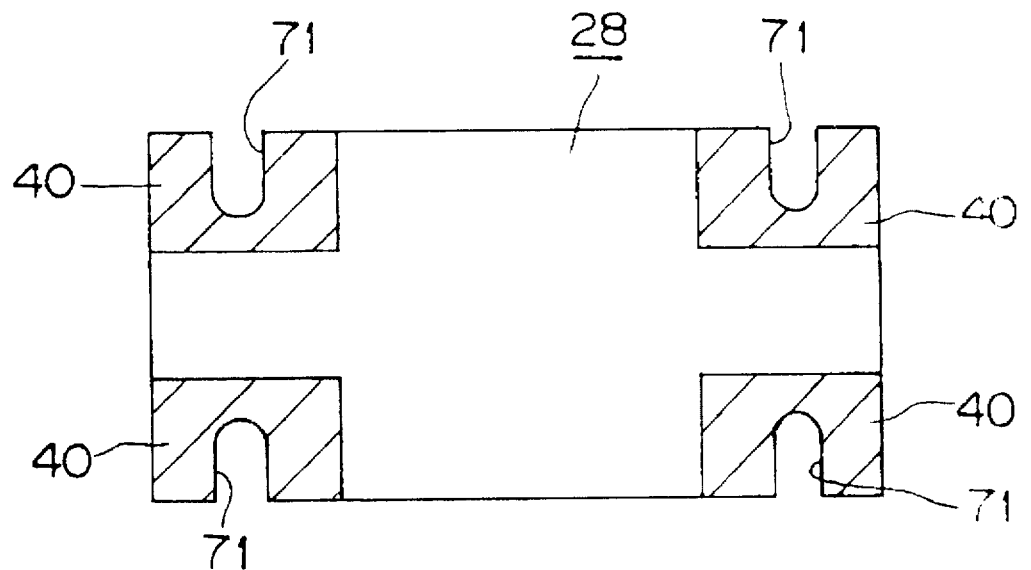
FIG. 47 is a front view showing another example of a coil mounting substrate constituting the objective lens driving device according to the embodiment of FIG. 9.

Thus a number of fitting recesses 71 opened on the longitudinal sides of the coil mounting substrate 28 may be provided in place of the through-holes 19 at the connection terminals 40 as shown in FIG. 47. The elastic supporting member 35 may be mounted on the coil mounting substrate 28 by fitting the end 35a in the fitting recess with the longitudinal sides of the elastic supporting member 35 lying at right angles to the side of the coil mounting substrate 28, thus assuring ease with which the elastic supporting member is mounted on the coil mounting substrate 28.

In this case, the elastic supporting member 35 is fixedly supported by an electrically conductive adhesive, such as solder 41 deposited in the connection terminal portion 40, as the elastic supporting member 35 is electrically connected to the coil mounting substrate 28, with the elastic supporting member being floated within the fitting recess 71.

Figure 48:
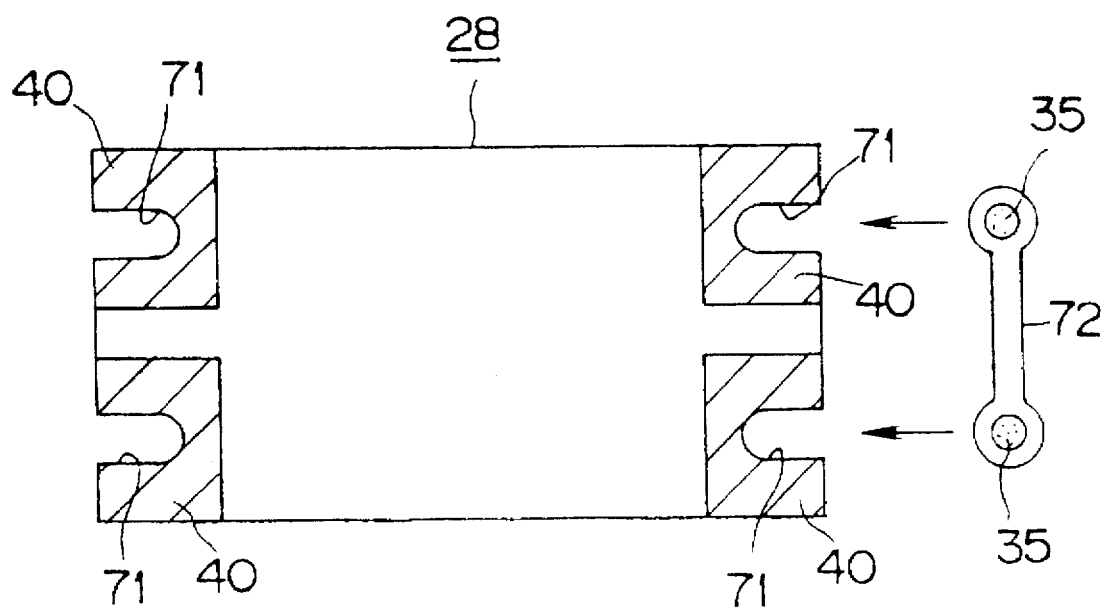
FIG. 48 is a plan view showing a yoke of a magnetic circuit section employing plural magnets each having two magnetic poles.
Figure 49:
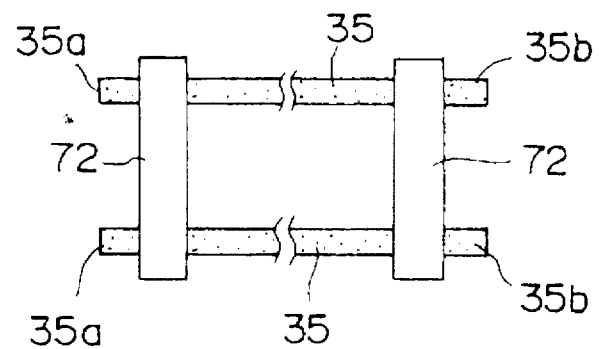
FIG. 49 is a side view showing an elastic supporting member employed for the coil mounting substrate shown in FIG. 42.

The fitting recesses 71 may also be formed by opening the short sides of the coil mounting substrate 48, normal to its longitudinal sides, as shown in FIG. 48. By forming the fitting recesses 71 in this manner, a pair of the elastic supporting members 35, 35 may be mounted on the coil mounting substrate 28 by having the ends 35a, 35a and the opposite ends 35b, 35b of the elastic supporting members 35, 35 on both ends of the bobbin 22 interconnected by connecting elements 72, 72, as shown in FIG. 49. By interconnecting the elastic supporting members 35, 35 by the connecting elements 72, 72, the elastic connecting members 35, 35 may be mounted on the coil mounting substrate 28 in such a manner as to maintain parallelism between the elastic supporting members 35, 35. The connecting elements 72, 72 are formed of an insulating material, such as synthetic resin, for assuring insulation of the electrically conductive elastic supporting members 35, 35.

In the above-described embodiments, since the elastic supporting members 35 are secured by the electrically conductive material, such as the solder 41, deposited on the connection terminals 40 formed on the plane of the coil mounting substrate 28, the state of the bobbin 22 supported by the elastic supporting members 35 in the center of gravity equilibrium tends to be affected by possible variations in the plate thickness of the coil mounting substrate 28 provided with the focusing coil 31 and the tracking coil 34.

Figure 50:
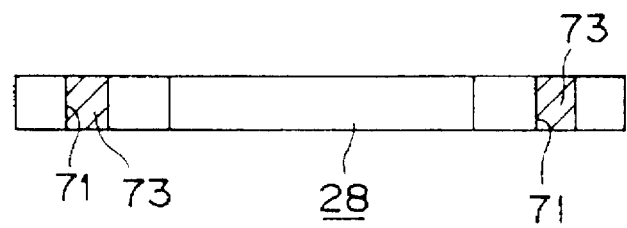
FIG. 50 is a plan view showing a fitting recess in which is fitted the elastic supporting member provided on the coil mounting substrate shown in FIG. 47.
Figure 51:
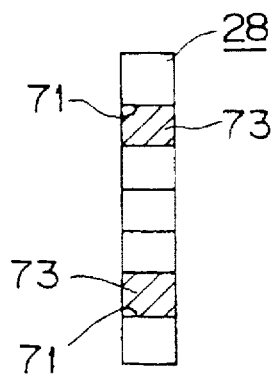
FIG. 51 is a side view showing a fitting recess in which is fitted the elastic supporting member provided on the coil mounting substrate shown in FIG. 48.

On the inner surface of the fitting recess 71 is formed a connection terminal section 73 and electrical and mechanical connection between the elastic supporting member 35 and the connection terminal 73 is established by an electrically conductive material, such as a solder 41, charged into the fitting recess 71, as shown in FIGS. 50 and 51. By securing the elastic supporting member 35 within the plate thickness of the coil mounting substrate 28, the bobbin 22 can be supported without producing serious plate thickness variations in the coil mounting substrate 28.

Figure 52:
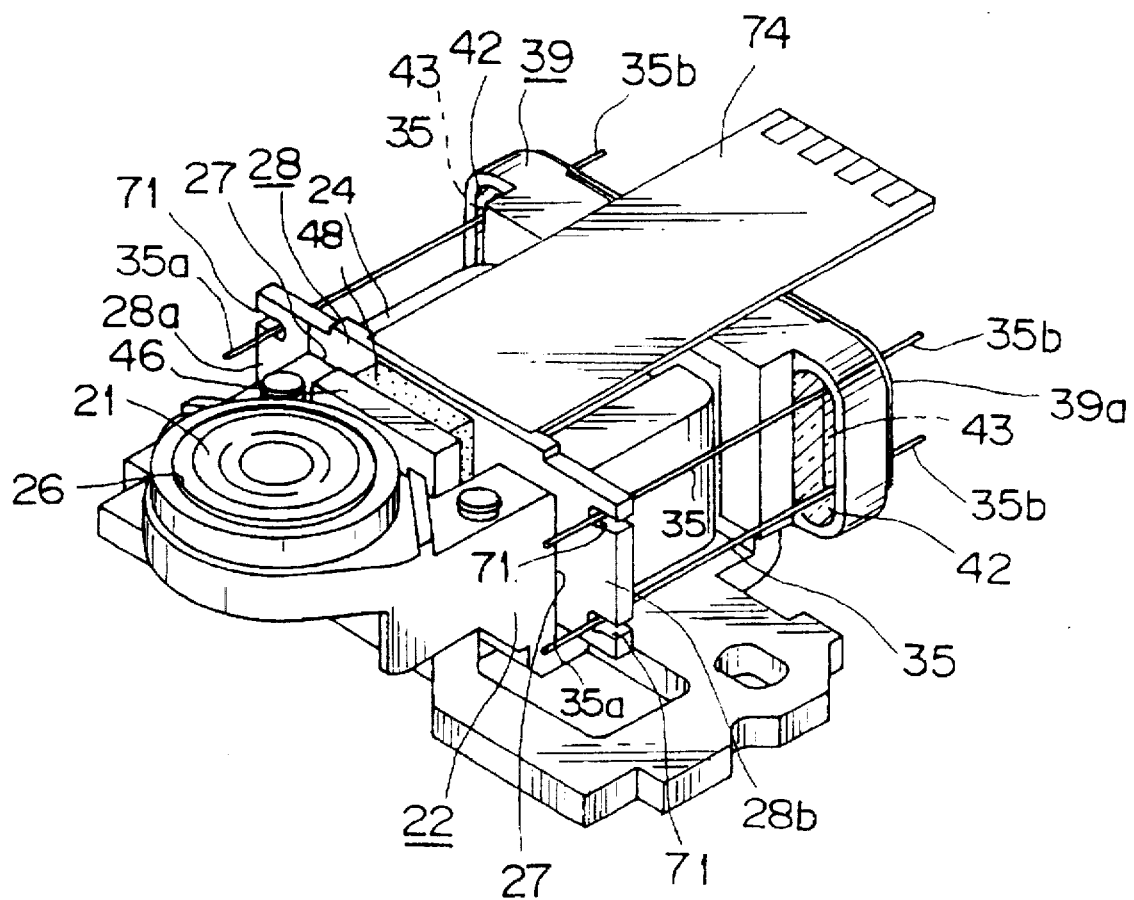
FIG. 52 is a perspective view showing an objective lens driving device employing a flexible printed circuit board for electrical connection between the focusing and tracking coils.

In the above-described embodiment, the elastic supporting member 35 supporting the bobbin 22 is formed of an electrically conductive material, and the focusing coil 31 and the tracking coil 34 provided on the coil mounting substrate 28 are supplied with current via this elastic supporting member 35. On the other hand, a flexible printed wiring board 74 operating as a feed line may be mounted on the coil mounting substrate 28 so that the focusing coil 31 and the tracking coil 34 will be supplied with current via this flexible printed wiring board 74, as shown in FIG. 52. In such case, there is no necessity of forming the elastic supporting member 35 of an electrically conductive material. Thus the elastic supporting member 35 may be formed of a material of appropriate properties, such as elasticity, which may be freely selected for movably supporting the movable portion inclusive of the bobbin 22. For example, the elastic supporting member 35 may be formed of a metallic spring plate of inferior electrical properties or an insulating synthetic resin or rubber.

As the coil mounting substrate 28, such a coil mounting substrate having fitting recesses 71 on the short sides thereof as shown in FIG. 48 is employed for facilitating mounting of the elastic supporting member 35 to the coil mounting substrate 28 having mounted thereon the flexible printed wiring substrate 74 for current feeding to the focusing coil 31 and the tracking coil 34.

If the flexible printed wiring board 74 is employed for feeding the current to the focusing coil 31 and the tracking coil 34, it is unnecessary to provide the coil mounting substrate 28 with the connection terminal portion 40 designed for establishing electrical connection with the electrically conductive elastic supporting member 35. In addition, there is no necessity of providing the supporting holder 39 with the flexible printed wiring board 44 for connecting the end 35b of the elastic supporting member 35 to an external driving control circuit. In such case, the end 35b of the elastic supporting member 35 is directly supported by the supporting holder 39 or fixedly supported to a fixed plate 39a mounted on the supporting holder 30.

Meanwhile, in the above-described objective lens driving apparatus, since the coil mounting plate insertion openings 27, 27 are formed as recessed grooves by opening both sides of the bobbin 22, it is necessary to effect longitudinal position matching (registration) of the coil mounting plate with respect to the bobbin 22 using a supporting fixture before proceeding to applying an adhesive for bonding. That is, for setting the facing position between the focusing coil 31 and the tracking coil 34 provided on the coil mounting substrate 28 and the magnets 47, 48 making up the magnetic circuit section 38, it is necessary to effect longitudinal registration of the coil mounting substrate 28 with respect to the bobbin 22.

Figure 53:
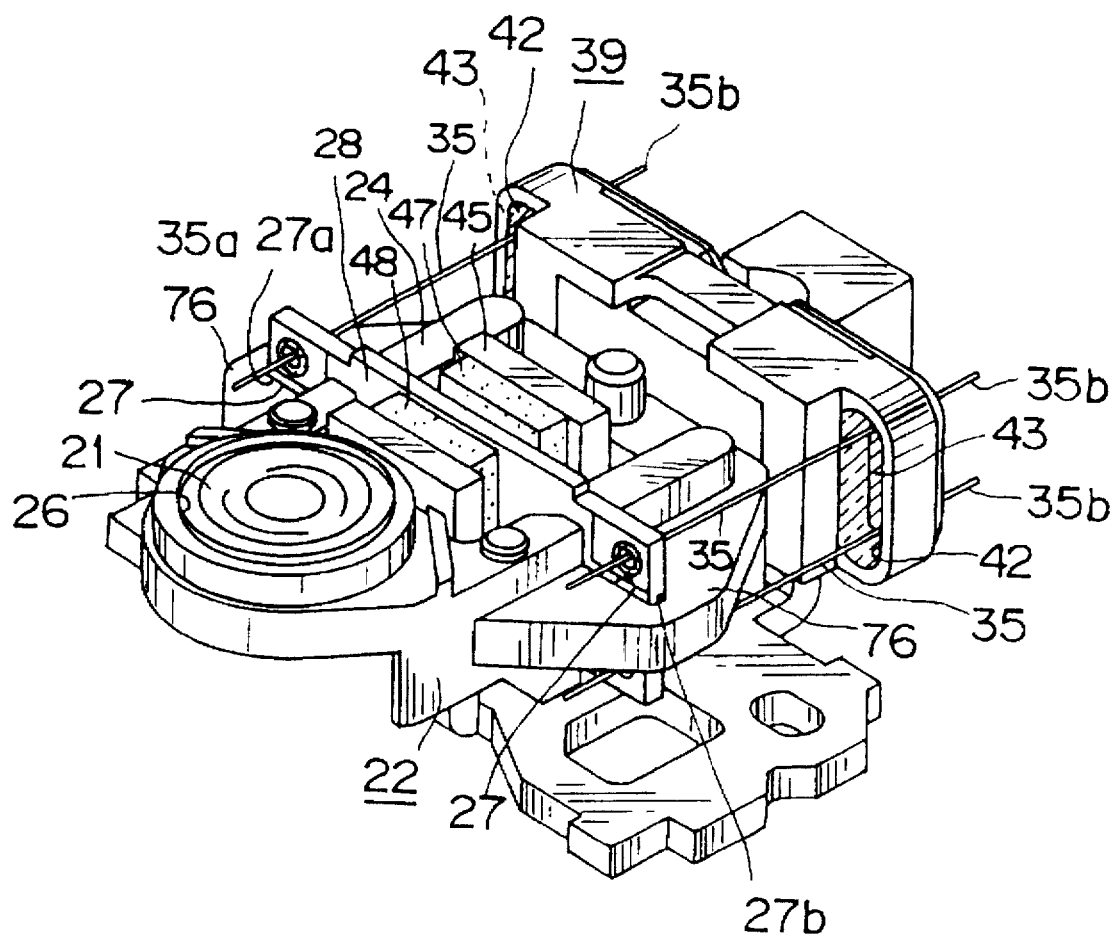
FIG. 53 is a perspective view showing another example of a bobbin constituting an objective lens driving device shown in FIG. 52.

Thus, as shown in FIG. 53, laterally extending flanges 76, 76 are provided on both sides of the bobbin 22 and the coil mounting plate insertion grooves 27, 27 are bored as far as mid portions of the flanges 76, 76 for stopping the lateral ends 27a, 27b. By using these lateral ends 72a, 72b as longitudinal position regulating portions of the coil supporting substrate 28 for the bobbin 22, the coil supporting substrate 28 can be mounted in position with respect to the bobbin 22 without employing supporting fixtures.

If the flexible printed wiring substrate 74 is used for supplying the current to the focusing coil 31 and the tracking coil 34, it becomes unnecessary to supply the current to the focusing coil 31 and the tracking coil 34 provided on the coil mounting substrate via the elastic supporting member 35. Thus the bobbin 22 may be directly supported on the end 35a of the elastic supporting member 35 having its opposite end 35b fixedly supported by the supporting holder 39.

Figure 54:
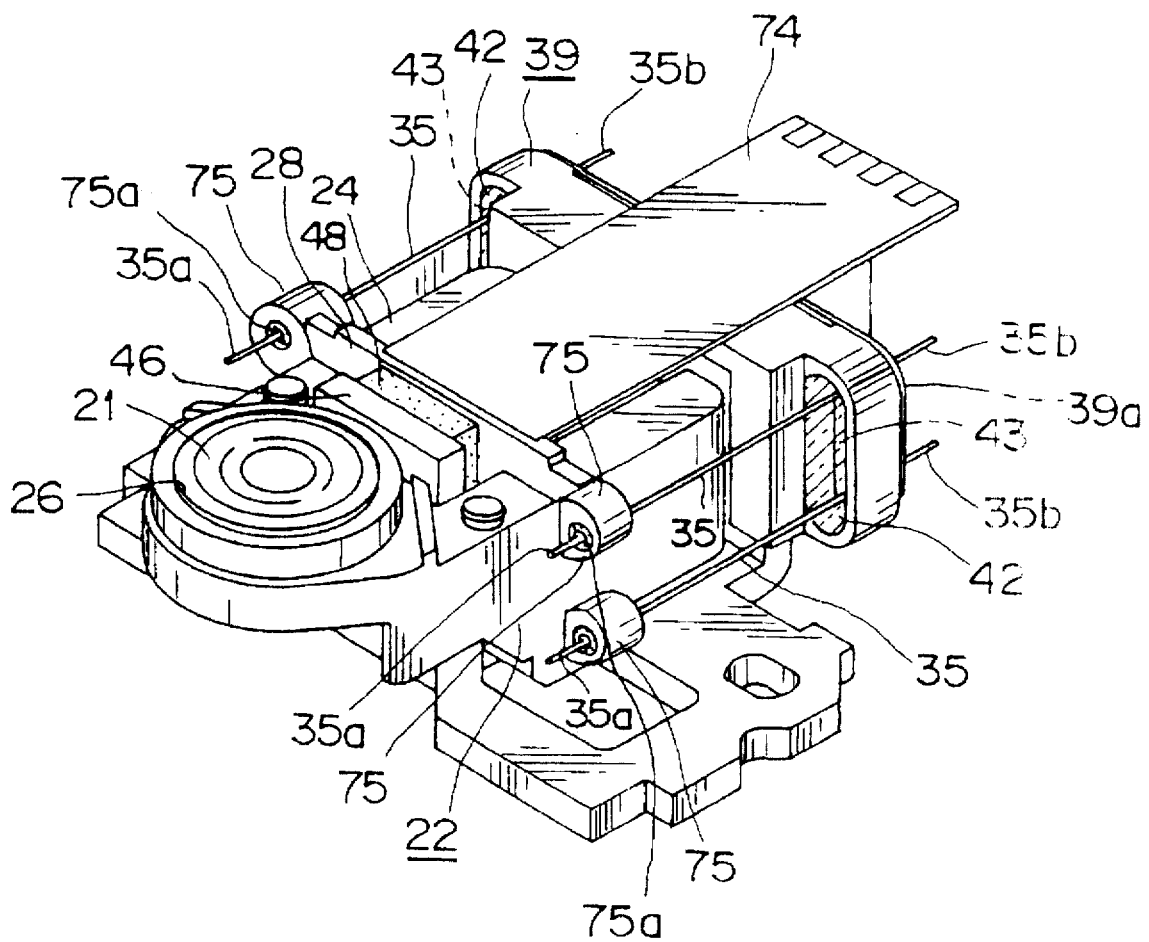
FIG. 54 is a perspective view of an objective lens driving device designed for directly supporting the bobbin by the elastic supporting member.

In this case, an elastic supporting member mounting portion 75 formed integrally with the bobbin 22 may be mounted on a lateral side of the bobbin 22 formed of, for example, synthetic resin, as shown in FIG. 54, so that the elastic supporting member 35 has its one end 35a inserted into and supported by a through-hole 75a formed in the elastic supporting member 75.

The above-described objective lens driving device 20 has the bobbin 22 on which is mounted the coil mounting substrate 28 carrying the focusing coil 31 and the tracking coil 34, and the coil supporting substrate 28 mounted on the bobbin 22 is supported by plural elastic supporting members 35 for providing a moving coil type structure. However, the yoke 37 carrying the magnets 47, 48 may be mounted on the bobbin 22 and the coil mounting substrate 28 may be arranged on a supporting substrate 78 making up a stationary portion for providing a moving magnet type structure.

The above-described objective lens driving devices 20, 120 are arranged on a base, carrying a light source for radiating a light beam and light receiving elements for detecting the return light from the optical disc, for constituting an optical pickup unit.

Such an optical pickup unit, constituted by the above-described moving coil type objective lens driving device 20, is explained.

Figure 55:
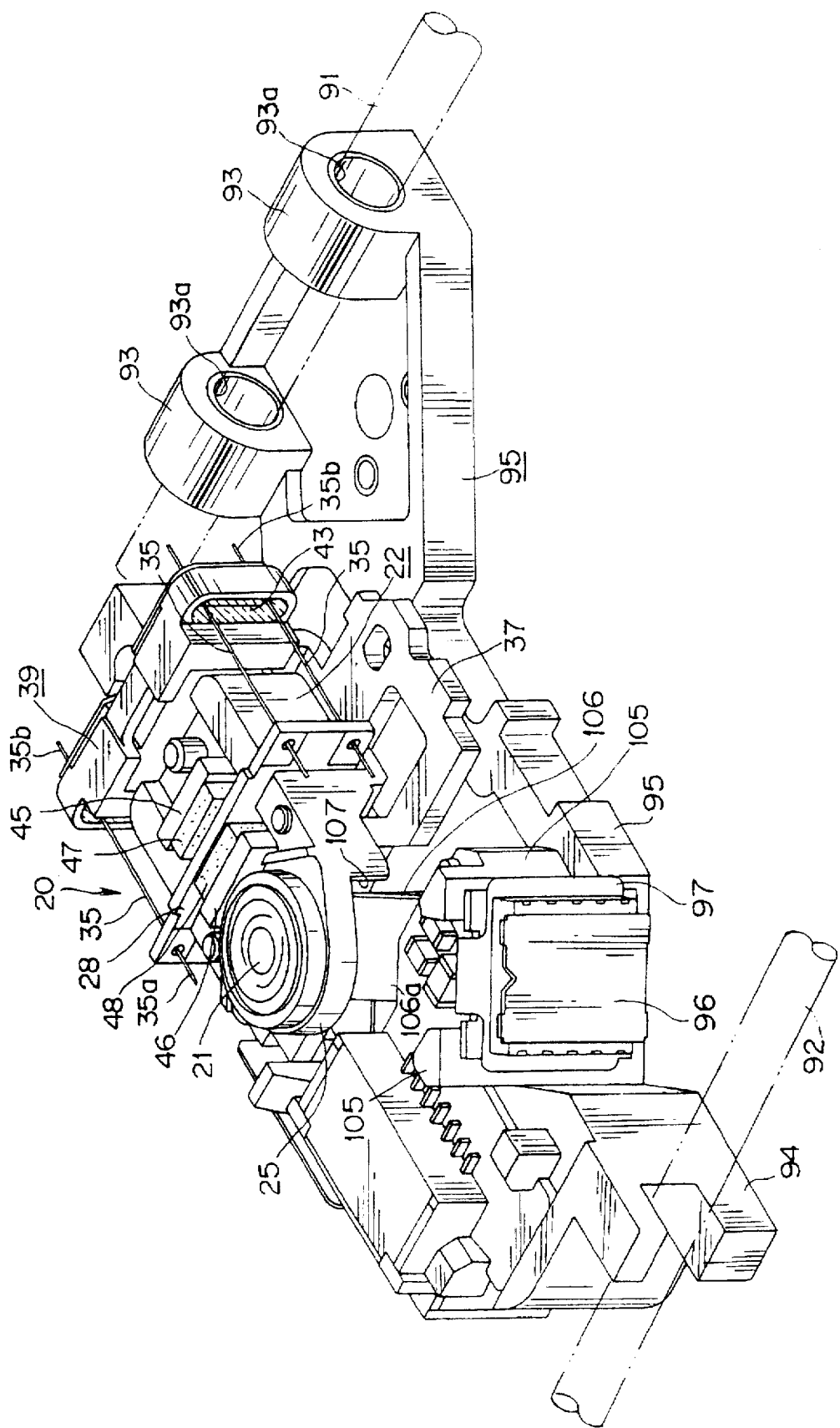
FIG. 55 is a perspective view showing an optical pickup unit according to an embodiment of the present invention.

The optical pickup unit includes a substantially flat-plate-shaped base 95 having a guide shaft insertion portion 93 and a guide shaft engagement portion 94 on its lateral sides, as shown in FIG. 55. The guide shaft insertion portion 93 and the guide shaft engagement portion 94 operate as guided portions into which are inserted or engaged a slide guide reference shaft 91 and a slide guide shaft 92 constituting parallel guide means arranged within the optical disc recording and/or reproducing apparatus parallel to each other. The guide shaft insertion portions 93, provided on both sides of the base 95, are formed with a through-hole 93a in which is inserted the slide guide reference shaft 91. The slide guide shaft engagement portion 94 is formed in a U-shaped cross-sectional shape.

The objective lens 20 is arranged on a base 95 intermediate between the slide guide reference shaft 91 and the slide guide shaft 92 so that the direction of extension of the elastic supporting member 35 movably supporting the bobbin 22 carrying the objective lens 21 is perpendicular to the axial direction of the slide guide reference shaft 91 and the slide guide shaft 92, as shown in FIG. 55. Specifically, the optical axis of the objective lens 21 held by one end of the bobbin 22 is positioned at a mid point between the slide guide reference shaft 91 and the slide guide shaft 92.

The objective lens driving device 20 is mounted on the base 95 by securing the yoke 37 constituting the magnetic circuit 36 such as with a set screw.

On the base 95 carrying the objective lens driving device 20 is mounted a light emitting/light receiving compound element 96 integrally constituted by a semiconductor laser element, as a laser light source, a light receiving element for receiving the return light reflected from the optical disc and a separating optical element for separating the light beam outgoing from the semiconductor laser from the return laser light.

Figure 56:
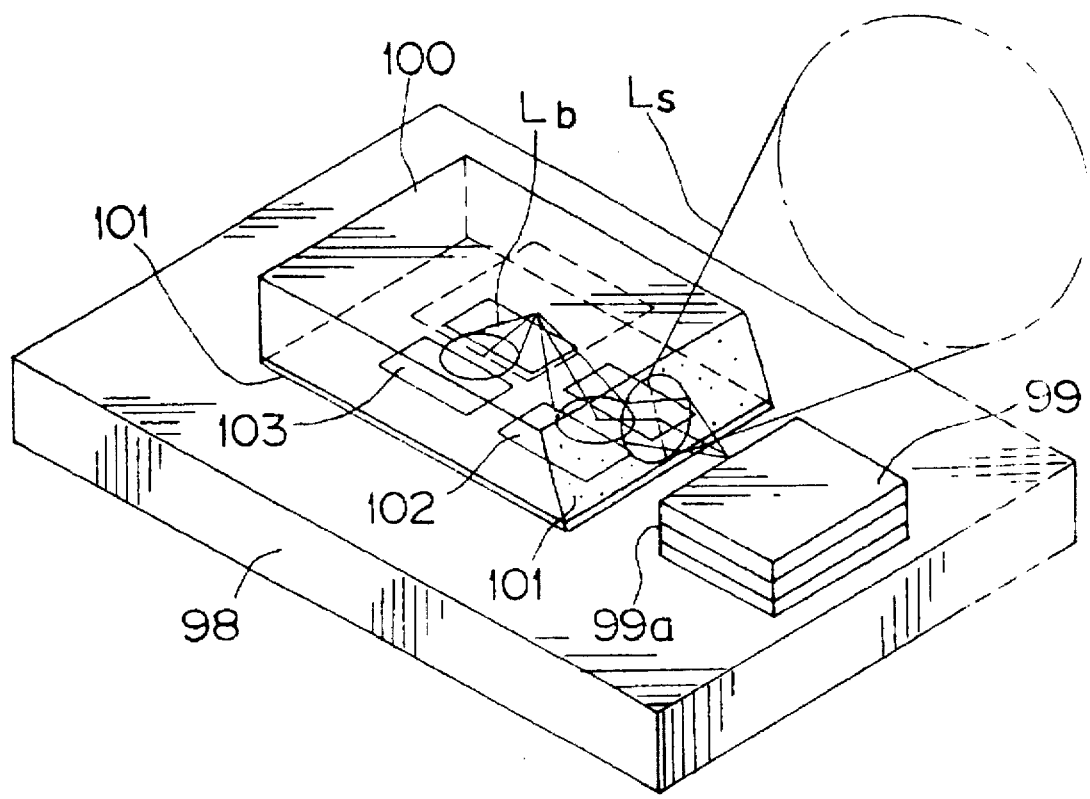
FIG. 56 is a perspective view showing a light emitting/receiving compound element employed in the optical pickup unit shown in FIG. 55.

The light emitting/light receiving compound element 96 is mounted in a package 97 by means of which it is mounted on the base 95. The light emitting/light receiving compound element 96 forms a semiconductor laser element 99 by layering plural semiconductor layers inclusive of a semiconductor substrate 98, as shown in FIG. 56. On the semiconductor substrate 98 is mounted a beam splitter 100 facing a light beam radiating surface 99a of the semiconductor laser element 99 for separating the return light reflected from the optical disc from the light beam radiated from the semiconductor element 99. This beam splitter 100 is secured to the semiconductor substrate 98 via an adhesive 101.

Figure 57:
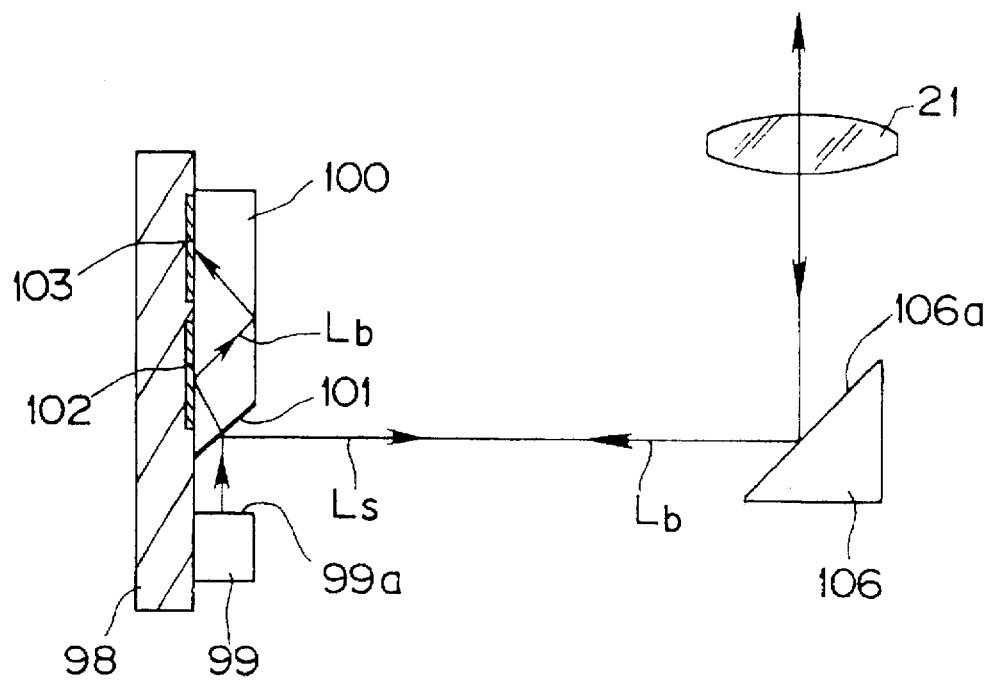
FIG. 57 is a side view showing an arrangement of a light emitting/receiving compound element and a reflective mirror.

The beam splitter 100 has its surface facing the light beam radiating surface 99a of the semiconductor laser element 99. This surface is inclined with respect to the optical axis of a light beam Ls radiated from the semiconductor laser element 99, as shown in FIGS. 56 and 57. Specifically, the inclined surface is inclined 45° with respect to the optical axis of the light beam. On this inclined surface is formed a semi-transparent reflective film 101 having the function of reflecting the light beam Ls radiated from the semiconductor laser 99 and transmitting a return light Lb. By forming the semi-transparent reflective film 101 on the inclined surface of the prism 100, the light beam Ls radiated from the semiconductor laser element 99 proceeds as its optical axis is bent 90° by the semi-transparent reflective film 101.

The semi-transparent reflective film 101 transmits the return light reflected from the optical disc for transmission through the beam splitting prism 100. The return light transmitted through the semi-transparent reflective film 101 proceeds as it is reflected within the beam splitting prism 100.

On the lower surface of the semiconductor substrate 98 carrying the beam splitting prism 100 are formed first and second splitting detectors 102, 103 operating as light receiving elements for receiving the return light from the optical disc proceeding as it is reflected within the beam splitting prism 100. The first and second splitting detectors 102, 103 detect the return light by plural light receiving elements making up the splitting discs 102, 103 for reading out and outputting information signals recorded on the optical disc, such as focusing error and tracking error signals.

The light emitting/light receiving compound element 96, comprised of the semiconductor laser element 99 and the first and second splitting detectors 102, 103 on the common semiconductor substrate 98 as described above, is mounted on the base 95 so that the light radiating direction of the light beam Ls radiated from the semiconductor laser element 99 is parallel to the optical axis of the objective lens 21 provided in the objective lens driving device 20 arranged on the base 95, as shown in FIG. 57. That is, the semiconductor substrate 98 is mounted on the base 95 so that its surface having the semiconductor laser element 99 and the first and second splitting detectors 102, 103 is parallel to the optical axis of the objective lens 21.

The light emitting/light receiving compound element 96 is accommodated in a package 97 in which is mounted the semiconductor substrate 98 carrying the semiconductor laser element 99 and the first and second splitting detectors 102, 103. The light emitting/light receiving compound element 96 is arranged on the base 95 by having the package 97 mounted between a pair of compound element mounting portions 105, 105 formed on the base 95. The compound element mounting portions 105, 105, carrying the light emitting/light receiving compound element 96, are mounted upright on the surface of the base 95 so as to be parallel to the optical axis of the objective lens 1.

That is, the light emitting/light receiving compound element 96 is mounted on the base 95 so that the semi-transparent reflective film 101 deflecting the light path of the light beam Ls outgoing from the semiconductor laser element 99 by 90° will face the spacing between the compound element mounting portions 105, 105 and so that both sides of the package 97 will be supported by the compound element mounting portions 105, 105.

By mounting the light emitting/light receiving compound element 96 on the base 95, with the surface of the semiconductor substrate 98 carrying the semiconductor laser element 99 and the first and second splitting detectors 102, 103 running parallel to the optical axis of the objective lens 21 and with the semi-transparent reflective film 101 of the beam splitting prism 100 facing the spacing defined between the compound element mounting portions 105, 105, the light beam from the semiconductor laser element 99 is radiated in a direction parallel to the optical axis of the objective lens 1. By deflecting the light path of the light beam Ls by the semi-transparent reflective film 101 by 90°, the light beam Ls proceeds in a direction normal to the optical axis of the objective lens 21, that is in a direction parallel to the surface of the base 95.

Figure 58:
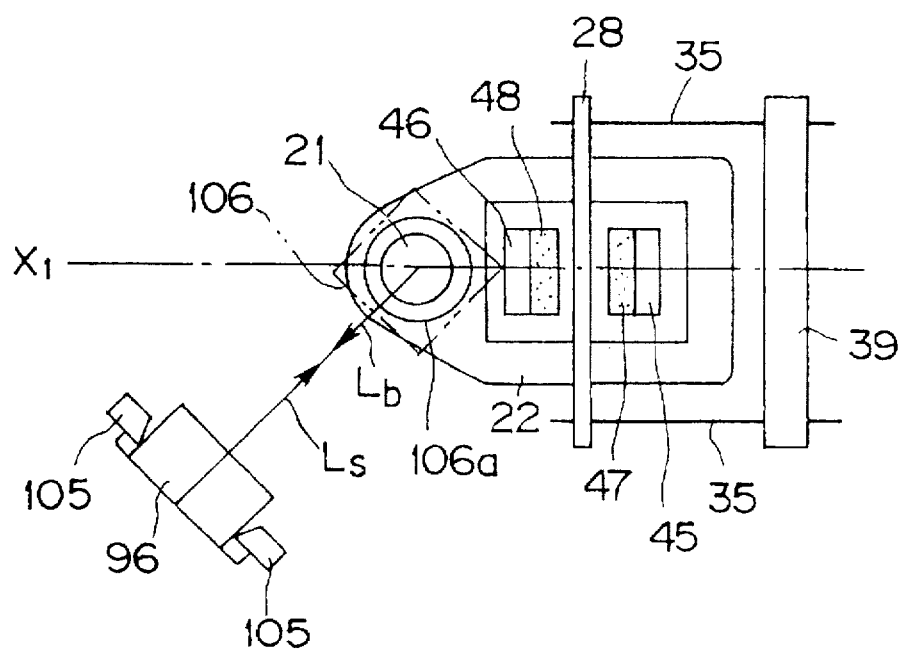
FIG. 58 is a plan view showing an arrangement of a light emitting/receiving compound element and an objective lens provided in an object lens driving device.

The light emitting/light receiving compound element 96 is arranged at a position inclined by approximately 45° about the optical axis of the objective lens 21, that is at a position obliquely laterally of the objective lens 21 provided on one end of the objective lens driving device 20 arranged on the base 95, as shown in FIG. 58. The light emitting/light receiving compound element 96 is arranged on the base 95 so that the light path of the light beam Ls proceeding with its optical path deflected 90° by the semi-transparent reflective film 101 is inclined by approximately 45° with respect to the direction of extension $X_1$ of the elastic supporting member 35 configured for supporting the bobbin mounting the objective lens 21 in a cantilevered fashion.

On the base 95 and directly below the objective lens 21 of the objective lens driving device 20 mounted on the base 95 is provided a reflecting mirror 108 configured for deflecting by 90° the light path of the laser beam radiated from the semiconductor laser element 99 by the semi-transparent reflective film 101 of the beam splitting prism 100 before the light beam falls on the objective lens 21, as shown in FIG. 57. The reflecting mirror 106 has its reflecting surface 108a inclined 45° with respect to the optical axis of the objective lens 21, as shown in FIG. 57. The reflective mirror 106 is provided on the base 95 by being tilted approximately 45° about the optical axis of the objective lens 21 so that the reflecting surface 108a thereof directly faces the light beam Ls proceeding with its optical path deflected by 90° by the semi-transparent reflective film 101. That is, the reflective mirror 106 is arranged on the base 95 at approximately 45° with respect to the direction of extension $X_1$ of the elastic supporting member 35 designed for supporting the bobbin 22 carrying the objective lens 21.

Figure 8:
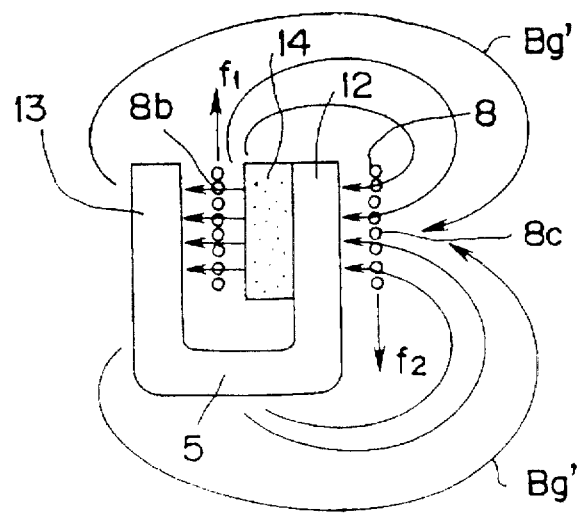
FIG. 8 is a side view showing the state of facing of the magnet and the tracking coil in the conventional objective lens driving device.

The lower surface of the end of the lateral side of the bobbin 22 of the objective lens driving device 20 on the base 95 facing the reflective mirror 108 mounted on the base 95 is formed with a cut-out 107 as shown in FIGS. 8 and 55. The cut-out 107 is formed on the rim of the lower surface of the objective lens mounting portion 25 provided on one end of the main bobbin member 24 of the bobbin 22 for holding the objective lens 21. By forming such cut-out 107, the reflective mirror 106 can be approached further to the objective lens 21 for suppressing the height of the optical pickup unit for reducing the thickness of the recording/reproducing apparatus.

The light emitting/light receiving compound element 96 employed is configured so that the semiconductor laser element 99 and the first and second splitting detectors 102, 103 are provided on the common semiconductor substrate 98 and the beam splitting prism 100 is housed within the package 97, as described above. Since this eliminates the necessity of separating the light path of the light beam incident on the optical disc from the light path of the return light reflected from the optical path in constructing the base 95, the optical pickup unit and hence the recording/reproducing apparatus itself may be reduced in size.

Since the light beam Ls, radiated from the semiconductor laser element 99 of the light emitting/light receiving compound element 96, proceeds parallel to the base surface, the optical pickup unit may be further reduced in size.

In addition, since the light emitting/light receiving compound element 96 is arranged at a position inclined approximately 45° about the optical axis of the objective lens 21, the optical pickup unit may be reduced in width in the tracking direction.

Figure 59:
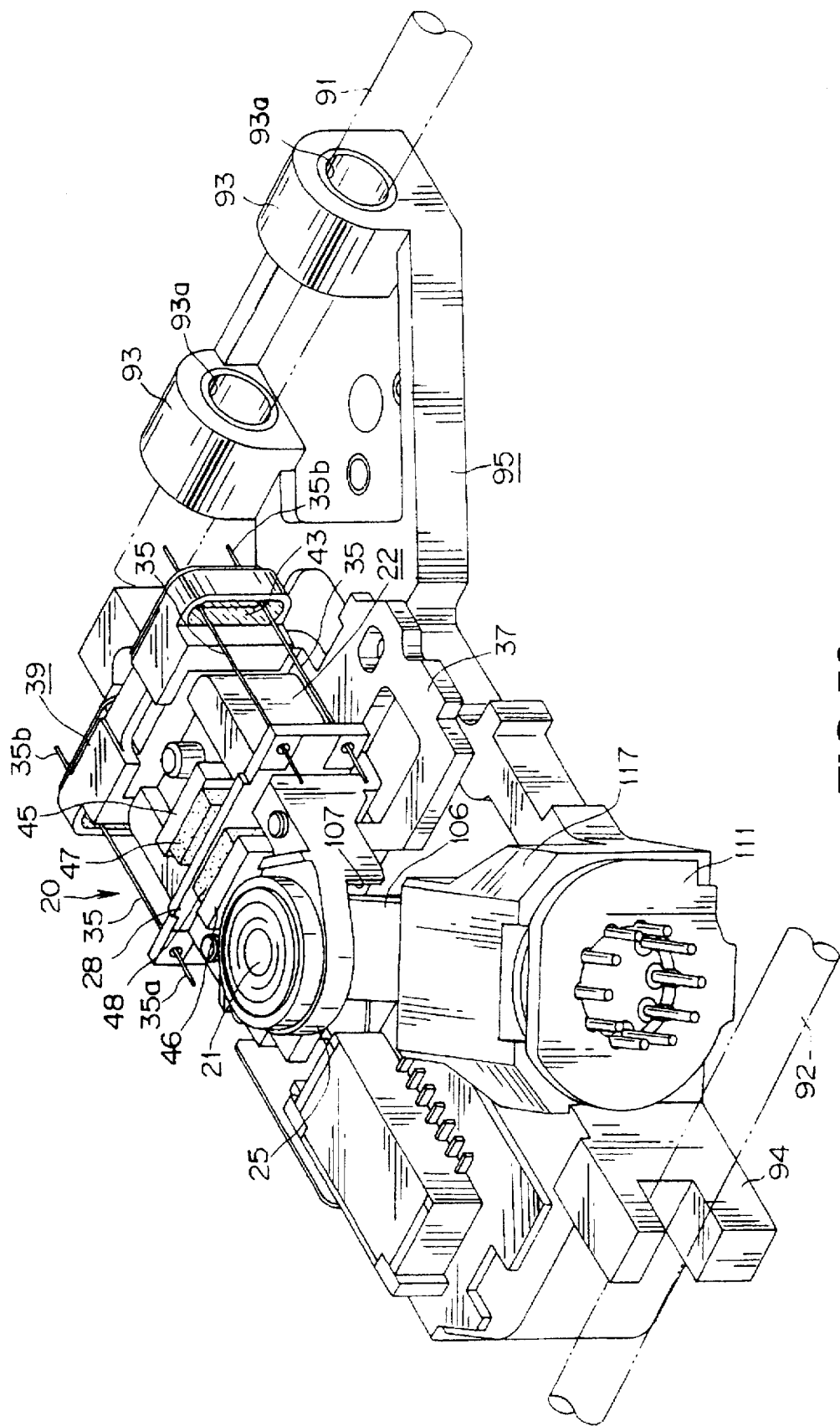
FIG. 59 is a perspective view showing a modified optical pickup unit according to the present invention.

The light emitting/light receiving compound element 96, as a separating optical element for separating the light beam radiated from the semiconductor laser element 99 from the return light reflected from the optical disc, is constituted by a beam splitting prism 100 provided on the semiconductor substrate 98 on which are formed the semiconductor laser element 99 and the first and second splitting detectors 102,103. In addition, the light emitting/light receiving compound element 96 may be constituted by a hologram element 110, as shown in FIGS. 59 and 60.

Figure 60:
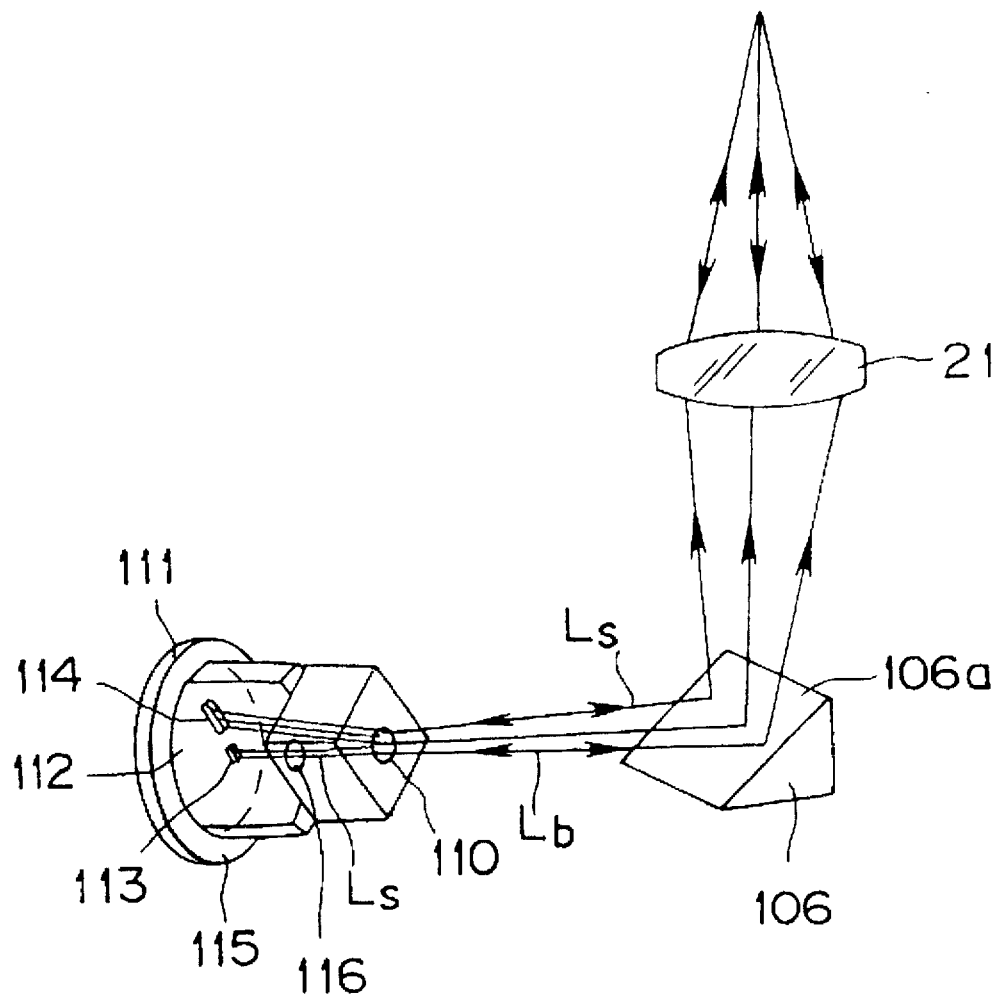
FIG. 60 is a perspective view showing an arrangement of a light emitting/receiving element employing a hologram and a reflective mirror.
Figure 61:
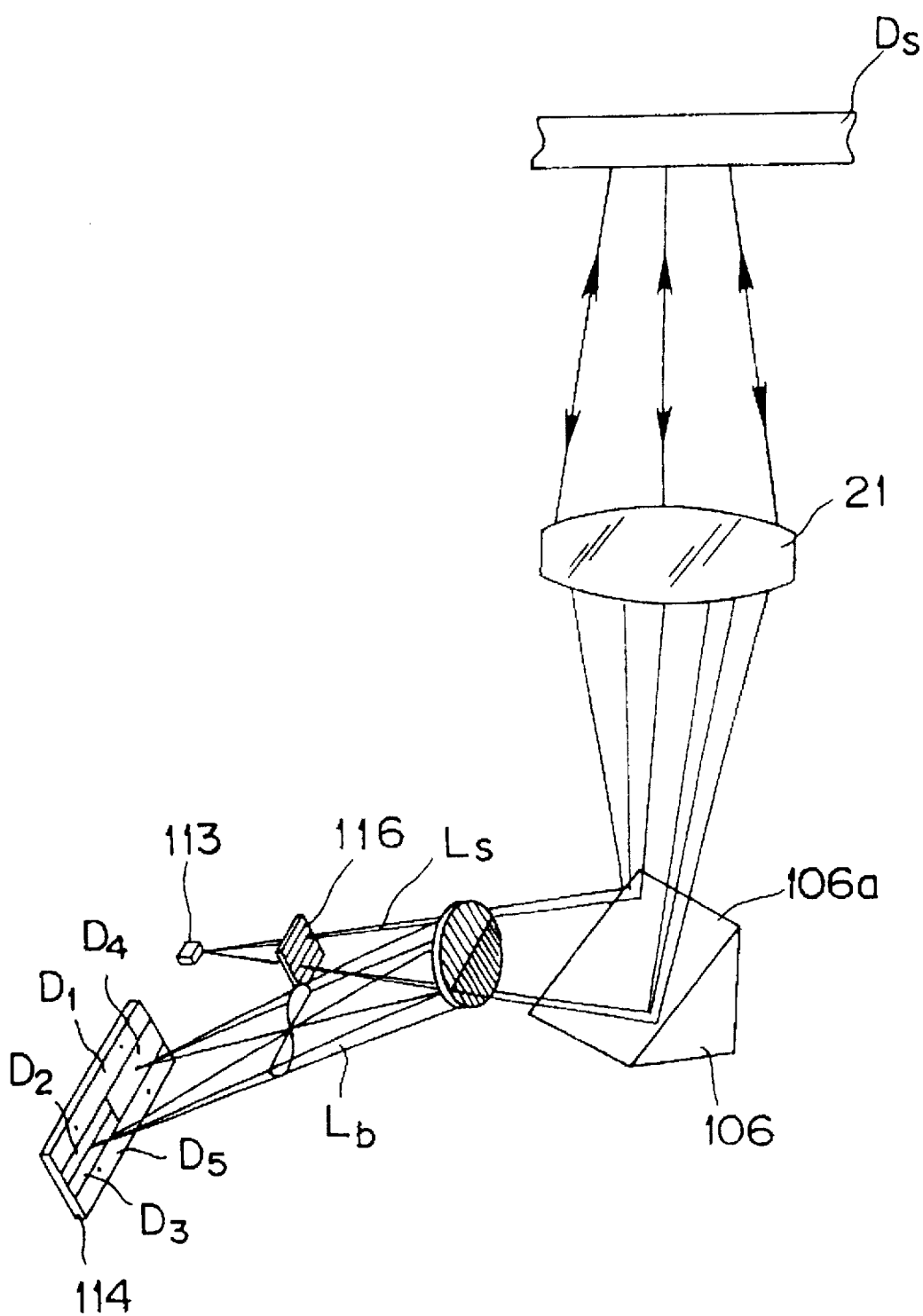
FIG. 61 is a perspective view showing the state of detection of a return light from an optical disc of a light emitting/receiving element employing a hologram.

The light emitting/light receiving compound element 111 employing the hologram 110 is comprised of a semiconductor laser element 113 and a five-segment detector 114 arranged side-by-side on a common substrate 112 as shown in FIG. 60. The common substrate 112, carrying the semiconductor laser element 113 and a five-segment detector 114, is mounted on a package 115. The hologram element 110 is arranged on the light path of the light beam Ls radiated from the semiconductor element 113, and is fitted on the front side of the package 115 using an adhesive or the like.

Between the semiconductor laser element 113 and the hologram element 110 is mounted a grating 116.

The light emitting/light receiving compound element 111 employing the hologram 110 has the semiconductor laser element 113 and the five-segment detector 114 enclosed therein and is mounted on the base 95 by having the package 115 carrying the hologram element 110 supported by a laser hologram unit mounting portion 117 provided on the base 95, as shown in FIG. 9.

Similarly to the light emitting/light receiving compound element 96, the light emitting/light receiving compound element 111 employing the hologram 110 is mounted on the base 95 so that the surface of the substrate 112 carrying the semiconductor laser element 113 and the five-segment detector 114 is parallel to the optical axis of the objective lens 21. The light beam Ls radiated from the semiconductor laser element 113 is radiated in a direction which is perpendicular to the substrate 112 and parallel to the base surface.

The light emitting/light receiving compound element 111 is arranged at a position inclined about 45° about the optical axis of the objective lens 21 obliquely laterally of the objective lens 21 mounted at one end of the objective lens driving device 20 arranged on the base 95. The light emitting/light receiving compound element 111 is arranged on the base 95 so that the radiating direction of the light beam Ls from the semiconductor laser element 113 forms an angle of about 45° with respect to the elastic supporting member 35 supporting the bobbin 22 carrying the objective lens 21 in a cantilevered fashion.

The light beam Ls, radiated from the semiconductor laser element 113 of the light emitting/light receiving compound element 111 employing the hologram 110, is split into two subsidiary light beams for tracking and a main light beam for information signal readout by the grating 116. The light beam Ls, separated into these three beams, falls on the reflective mirror 106 arranged on the beam 95 via the hologram 110 so as to be deflected 90° in its light path by the reflecting mirror 106. The light beam then falls on the objective lens 21 so as to be radiated via the objective lens on an optical disc Ds.

The return light Lb, reflected by the optical disc Ds, is incident via the objective lens 21 on the reflecting mirror 106 by which it is deflected 90° in its optical path. The return light is then incident on and diffracted by the hologram element 110. The return light, thus diffracted by the hologram 110, is led to the five-segment detector 114.

The hologram element 110 has two regions of different lattice periods, so that the portion of the return light beam Lb from the optical disc Ds derived from the main beam separated by the grating 116 and incident on one of the above regions is condensed on a line of partition between photodetectors $D_2$ and $D_3$ making up the five-segment detector 114. The portion of the return light beam incident on the remaining region is condensed on a photodetector $D_4$. The return light Lb derived from the subsidiary beam is condensed on photodetectors $D_1$, $D_5$. The focusing error signal, tracking error signal and the information signal readout signal are produced based upon detection outputs $S_1$ to $S_5$ of the return light Lb produced from the photodetectors $D_1$ to $D_5$. That is, the focusing error signal is produced by the difference between detection outputs $S_2$, $S_3$ of the photodetectors $D_2$, $D_3$ detecting the return light derived from the main beam, while the tracking error signal is produced by the difference between detection outputs $S_1$, $S_5$ of the photodetectors $D_1$, $D_5$ detecting the return light derived from the subsidiary beam. The information readout signal is derived from the sum of the detection outputs $S_2$, $S_3$ and $S_4$ of the photodetectors $D_2$, $D_3$ and $D_4$ detecting the return light derived from the main beam.

With the present optical pickup unit, in which the light emitting/light receiving compound element 111 employing the hologram 110 is mounted on the base 95, the semiconductor laser element 113 and the five-segment detector 114 are mounted on the common substrate 112, and the hologram element 110 is unified with the element 111, it becomes unnecessary to separate the light path of the light beam incident on the optical disc from that of the return light reflected from the optical disc, in constructing the base 95. Thus the optical system of the optical pickup unit and hence the recording/reproducing apparatus may be reduced in size.

Since the light beam Ls radiated from the semiconductor laser element 113 of the light emitting/light receiving compound element 111 proceeds parallel to the base surface, the optical pickup unit may be reduced in thickness.

Since the light emitting/light receiving compound element 111 is arranged at a position inclined 45° about the optical axis of the objective lens 21 obliquely laterally of the objective lens 21, it becomes possible to reduce the width of the optical pickup unit 21 along which the optical lens 21 is moved in a planar direction normal to its optical axis.

The objective lens driving device and the optical pickup unit according to the present invention may be modified from the arrangements described above within the scope of the invention. For example, although the objective lens driving device in which coil turns generating the driving force for moving the objective lens in the directions parallel and perpendicular to its optical axis are mounted on a coil bobbin, and a magnet is mounted on a yoke as a stationary portion, the present invention may be applied to an objective lens driving device of the type in which the magnet and the yoke are mounted on the bobbin and the respective coils are mounted on the stationary portion. In such case, the respective coils are formed in plate shape as in the above-described embodiments, and the yoke is formed in a U-shaped cross-section, while magnets are mounted on a pair of upstanding wall sections. The yoke is mounted in this state on the bobbin. In such case, the yoke carrying the magnet is mounted on the bobbin so that the flat-plate-shaped coil is disposed on the centerline of gap defined by a pair of magnets and so that the center of gravity of a movable portion made up of the bobbin, yoke, magnets and the objective lens coincides with the point of operation of the driving force generated by the coils and the pair of magnets.

In the above-described embodiments, the objective lens driving device is constructed so that the bobbin is supported by four elastic supporting members. However, the bobbin supporting mechanism may be of any other construction provided that the bobbin and the stationary portion are connected to each other by a so-called cantilevered structure such as that explained in connection with the above-described embodiments. Although the bobbin is supported in the above-described embodiments by four elastic supporting members, the bobbin may also be supported from both sides using two sets of the elastic supporting members.

What is claimed is:

1. An objective lens driving device, comprising:

an objective lens;

a bobbin on which said objective lens is mounted;

supporting means for supporting said bobbin in at least one of the first direction parallel to the optical axis of the objective lens and the second direction normal to the optical axis of said objective lens;

a coil mounting plate mounted on the bobbin;

at least one coil mounted on said coil mounting plate, said coil being mounted on said coil mounting plate so that at least one of the coil sides is parallel to at least one of the first and second directions; and a magnetic circuit for moving said coil and said objective lens in said first direction or in said second direction, said magnetic circuit having a pair of magnets facing each other with a pre-set gap therebetween;

wherein said coil is arranged on substantially the centerline of said gap and the center of gravity of a movable portion at least including the objective lens and the bobbin is coincident with the point of operation of a driving force generated by the coil and the magnetic circuit.

2. The objective lens driving device as claimed in claim 1 further comprising at least one first coil for moving the objective lens in said first direction and at least one second coil for moving the objective lens in said second direction and wherein said first coil and the second coil are arranged plane-symmetrically with respect to the centerline of said gap.

3. The objective lens driving device as claimed in claim 2 wherein said first and second coils are formed by coils in the form of flat square-shaped plates, with the first coil being arranged with at least its side extending substantially normal to said first direction and with the second coil being arranged with at least its side extending substantially parallel to said first direction.

4. The objective lens driving device as claimed in claim 3 wherein said magnets are sized so that, when said objective lens is moved in said first direction, said magnets face said first coil and, when said objective lens is moved in said second direction, said magnets face said second coil.

5. The objective lens driving device as claimed in claim 3 further comprising a plate-shaped member carrying said first coil and the second coil, wherein said plate-shaped member is mounted on said bobbin so that the major surface of the plate-shaped member is substantially parallel to the first direction.

6. The objective lens driving device as claimed in claim 1 wherein said magnets are provided with magnetic reluctance portions at mutually facing positions.

7. The objective lens driving device as claimed in claim 6 wherein said magnetic reluctance portions are openings formed in said magnets.

8. An objective lens driving device, comprising:
an objective lens;
a bobbin on which said objective lens is mounted;
supporting means for supporting said bobbin in at least one of the first direction parallel to the optical axis of the objective lens and the second direction normal to the optical axis of said objective lens;
a coil mounting plate mounted on the bobbin;
a first coil mounted on said coil mounting plate, said first coil being mounted on said coil mounting plate so that at least one of the coil sides thereof is perpendicular to said first direction;
a second coil mounted on said coil mounting plate, said second coil being mounted on said coil mounting plate so that at least one of the coil sides thereof is substantially parallel to said first direction; and
a magnetic circuit for moving said first and second coils and said objective lens in said first direction or in said second direction, said magnetic circuit having a pair of magnets facing each other with a pre-set gap therebetween;
wherein said first and second coils are arranged in said gap and plane-symmetrically with respect to the centerline of said gap and wherein the center of gravity of a movable portion at least including the objective lens and the bobbin is coincident with the point of operation of a driving force generated by the first and second coils and the magnetic circuit.

9. The objective lens driving device as claimed in claim 8 wherein said first and second coils are formed by coils in the form of flat square-shaped plates, with the first coil being arranged with at least its side extending substantially normal to said first direction and with the second coil being arranged with at least its side extending substantially parallel to said first direction.

10. The objective lens driving device as claimed in claim 8 wherein said magnets are sized so that, when said objective lens is moved in said first direction, said magnets face said first coil and, when said objective lens is moved in said second direction, said magnets face said second coil.

11. The objective lens driving device as claimed in claim 8 further comprising a plate-shaped member carrying said first coil and the second coil, wherein said plate-shaped member is mounted on said bobbin so that the major surface of the plate-shaped member is substantially parallel to the first direction.

12. The objective lens driving device as claimed in claim 11 wherein said magnetic reluctance portions are openings formed in said magnets.

13. The objective lens driving device as claimed in claim 8 wherein said magnets are provided with magnetic reluctance portions at mutually facing positions.

14. An objective lens driving device, comprising:
an objective lens;
a bobbin having said objective lens mounted on one end thereof and having an opening at a mid portion thereof;
supporting means for supporting said bobbin for movement in a first direction parallel to the optical axis of said objective lens and in a second direction perpendicular to said optical axis;
a coil mounting plate mounted on the bobbin;
a first coil having at least one flat square-plate-shaped coil portion provided on said coil mounting plate, said first coil being mounted so that at least one coil side thereof is substantially parallel to said first direction;
a second coil having at least one flat square-plate-shaped coil portion provided on said coil mounting plate, said second coil being mounted so that at least one coil side thereof is substantially parallel to said first direction; and
a magnetic circuit for moving said first and second coils and said objective lens in said first direction or in said second direction, said magnetic circuit having a pair of magnets facing each other with a pre-set gap therebetween, said magnets being inserted in said opening in said bobbin;
wherein said first and second coils are arranged in said gap with the coil portions facing said magnets and running substantially parallel to said first direction, said first and second coils being arranged plane-symmetrically with respect to the centerline of said gap and wherein the center of gravity of a movable portion at least including the objective lens and the bobbin is coincident with the point of operation of a driving force generated by the first and second coils and the magnetic circuit.

15. The objective lens driving device as claimed in claim 14 wherein said first coil is arranged in said gap so that its coil side extends substantially perpendicular to said first direction and wherein said second coil is arranged in said gap so that its coil side extends substantially parallel to said first direction.

16. The objective lens driving device as claimed in claim 15 further comprising a plate-shaped member having said first and second coils and wherein said plate-shaped member is mounted on the bobbin so that the plate-shaped member is substantially parallel to said first direction.

17. The objective lens driving device as claimed in claim 16 wherein said supporting means include a plurality of elastic members arranged parallel to each other in a direction perpendicular to said first direction and wherein each of the elastic members has its one end mounted on said plate-shaped member and has its other end mounted on a stationary portion.

18. The objective lens driving device as claimed in claim 14 wherein said magnets are sized so that, when said objective lens is moved in said first direction, said magnets face said first coil and, when said objective lens is moved in said second direction, said magnets face said second coil.

19. The objective lens driving device as claimed in claim 14 wherein said magnets are provided with magnetic reluctance portions at mutually facing positions.

20. The objective lens driving device as claimed in claim 19 wherein said magnetic reluctance portions are openings formed in said magnets.

21. An optical pickup apparatus, comprising:

a light source;

an objective lens for condensing a light beam radiated from said light source on a sole point on the optical axis;

an objective lens driving device for moving said objective lens in at least one of a direction parallel to an optical axis thereof and a direction perpendicular to said optical axis; an optical system for guiding the light beam radiated by said light source to said objective lens and for separating the light beam radiated from said light source from an incident light beam via said objective lens; and photodetector means for receiving the light beams separated by said optical system;

wherein said objective lens driving device includes a bobbin on which said objective lens is mounted;

supporting means for supporting said bobbin for movement in at least one of the first direction parallel to the optical axis of the objective lens and the second direction normal to the optical axis of said objective lens;

a coil mounting plate mounted on the bobbin;

a first coil mounted on said coil mounting plate so that at least one of the coil sides is perpendicular to said first direction;

a second coil mounted on said coil mounting plate so that at least one of the coil sides is substantially parallel to said first direction; and a magnetic circuit for moving said first and second coils and said objective lens in said first direction or in said second direction, said magnetic circuit having a pair of magnets facing each other with a pre-set gap therebetween;

wherein said first and second coils are arranged in said gap plane-symmetrically with respect to the centerline of said gap and further wherein the center of gravity of a movable portion at least including the objective lens and the bobbin is coincident with the point of operation of a driving force generated by the first and second coils and the magnetic circuit.

22. The objective lens driving device as claimed in claim 21 wherein said first and second coils are formed by coils in the form of flat square-shaped plates, with the first coil being arranged with at least its side extending substantially normal to said first direction and with the second coil being arranged with at least its side extending substantially parallel to said first direction.

23. The objective lens driving device as claimed in claim 22 wherein said magnets are sized so that, when said objective lens is moved in said first direction, said magnets face said first coil and, when said objective lens is moved in said second direction, said magnets face said second coil.

24. The objective lens driving device as claimed in claim 22 further comprising a plate-shaped member carrying said first coil and the second coil, wherein said plate-shaped member is mounted on said bobbin so that the major surface of the plate-shaped member is substantially parallel to the first direction.

25. The objective lens driving device as claimed in claim 22 wherein said magnets are provided with magnetic reluctance portions at mutually facing positions.

26. The objective lens driving device as claimed in claim 25 wherein said magnetic reluctance portions are openings formed in said magnets.

27. The objective lens driving device as claimed in claim 21 wherein said optical system has a light path deflecting element for deflecting the light path of a light beam radiated from said light source for guiding the light beam to said objective lens.

28. An optical pickup apparatus, comprising:

a light source;

an objective lens for condensing a light beam radiated from said light source on a sole point on the optical axis;

an objective lens driving device for moving said objective lens in at least one of a direction parallel to an optical axis thereof and a direction perpendicular to said optical axis;

an optical system for guiding the light beam radiated by said light source to said objective lens and for separating the light beam radiated from said light source from an incident light beam via said objective lens wherein said optical system has an optical element including a hologram for separating a light beam radiated from said light source from light beam incident thereon via said objective lens; and photodetector means for receiving the light beams separated by said optical system; wherein said objective lens driving device includes a bobbin on which said objective lens is mounted;

supporting means for supporting said bobbin for movement in at least one of the first direction parallel to the optical axis of the objective lens and the second direction normal to the optical axis of said objective lens;

a first coil mounted on said bobbin so that at least one of the coil sides is perpendicular to said first direction;

a second coil mounted on said bobbin so that at least one of the coil sides is substantially parallel to said first direction; and a magnetic circuit for moving said first and second coils and said objective lens in said first direction or in said second direction, said magnetic circuit having a pair of magnets facing each other with a pre-set gap therebetween;

wherein said first and second coils are arranged in said gap and plane-symmetrically with respect to the centerline of said gap and further wherein the center of gravity of a movable portion at least including the objective lens and the bobbin is coincident with the point of operation of a driving force generated by the first and second coils and the magnetic circuit.

* * * * *